(12) United States Patent
Toti

(10) Patent No.: US 7,185,691 B2
(45) Date of Patent: Mar. 6, 2007

(54) REVERSIBLE PULL CORD MECHANISM AND SYSTEM

(76) Inventor: Andrew J. Toti, 311 W. River Rd., Modesto, CA (US) 95351-3913

( * ) Notice: Subject to any disclaimer, the term of this patent is extended or adjusted under 35 U.S.C. 154(b) by 0 days.

(21) Appl. No.: 10/679,937

(22) Filed: Oct. 6, 2003

(65) Prior Publication Data

US 2005/0072635 A1     Apr. 7, 2005

(51) Int. Cl.
*E06B 9/30* (2006.01)
(52) U.S. Cl. ............... 160/173 R; 160/170; 160/84.04; 74/354
(58) Field of Classification Search ............. 160/170, 160/171, 168.1 R, 173 R, 319; 74/354, 355
See application file for complete search history.

(56) References Cited

U.S. PATENT DOCUMENTS

| 2,506,562 | A | * | 5/1950 | Bell et al. ...................... 74/12 |
| 2,687,769 | A | * | 8/1954 | Gershuny ................... 160/170 |
| 3,479,895 | A | * | 11/1969 | Wegener ...................... 74/333 |
| 5,394,764 | A | * | 3/1995 | Fini, Jr. ....................... 74/378 |
| 5,890,529 | A | * | 4/1999 | Haarer ........................ 160/319 |
| 6,223,802 | B1 | | 5/2001 | Colson |
| 6,325,131 | B1 | * | 12/2001 | Dekker et al. .............. 160/170 |
| 6,588,480 | B2 | * | 7/2003 | Anderson ................... 160/170 |

* cited by examiner

*Primary Examiner*—Blair M. Johnson
(74) *Attorney, Agent, or Firm*—Philip A. Dalton

(57) ABSTRACT

A reversible pull cord mechanism adapted for rotating a shaft in one direction when the pull cord is pulled in a first direction and rotating the shaft in the opposite direction when the pull cord is pulled in a second direction.

15 Claims, 26 Drawing Sheets

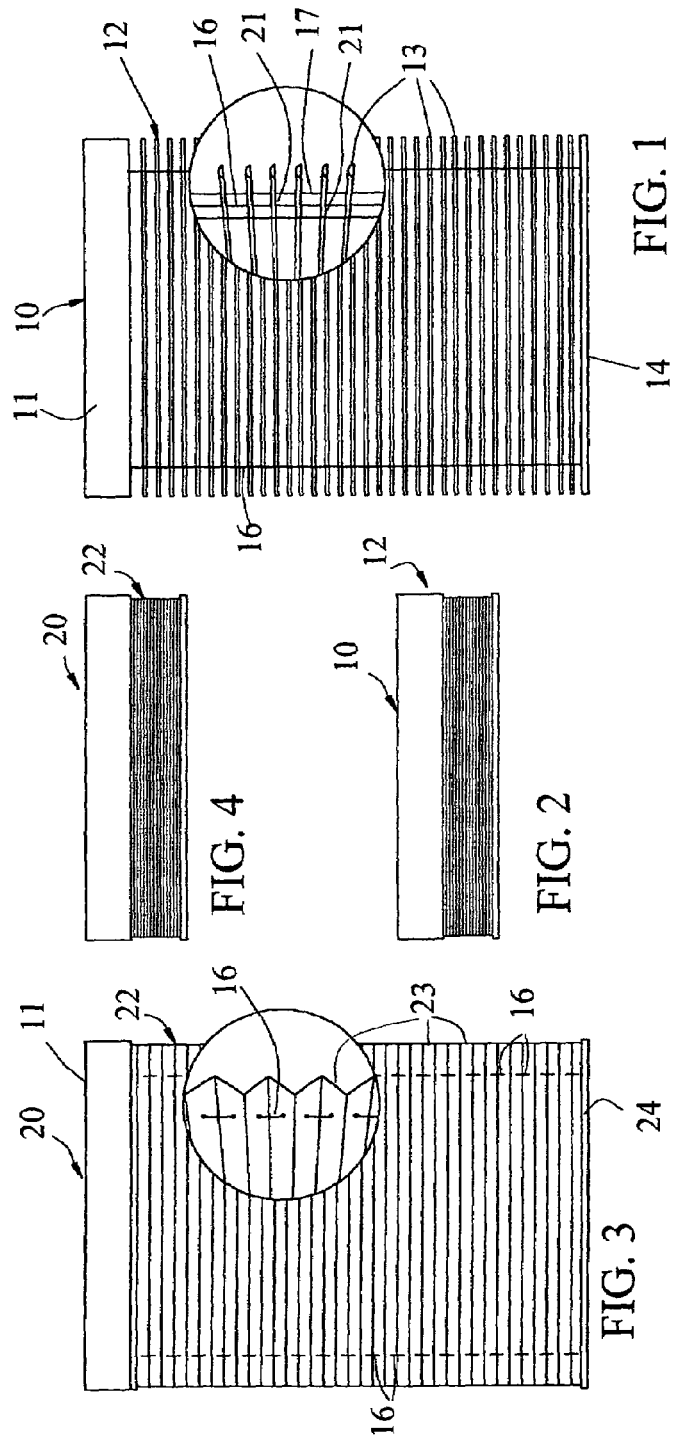
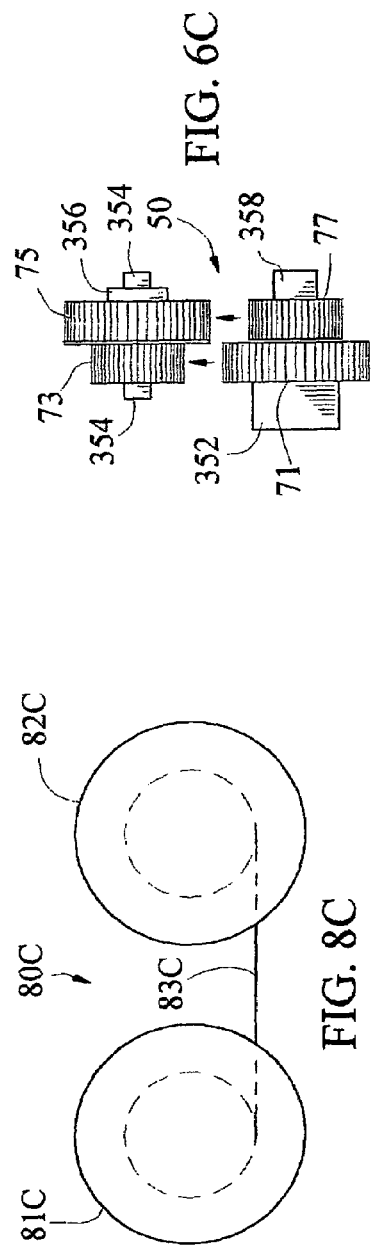

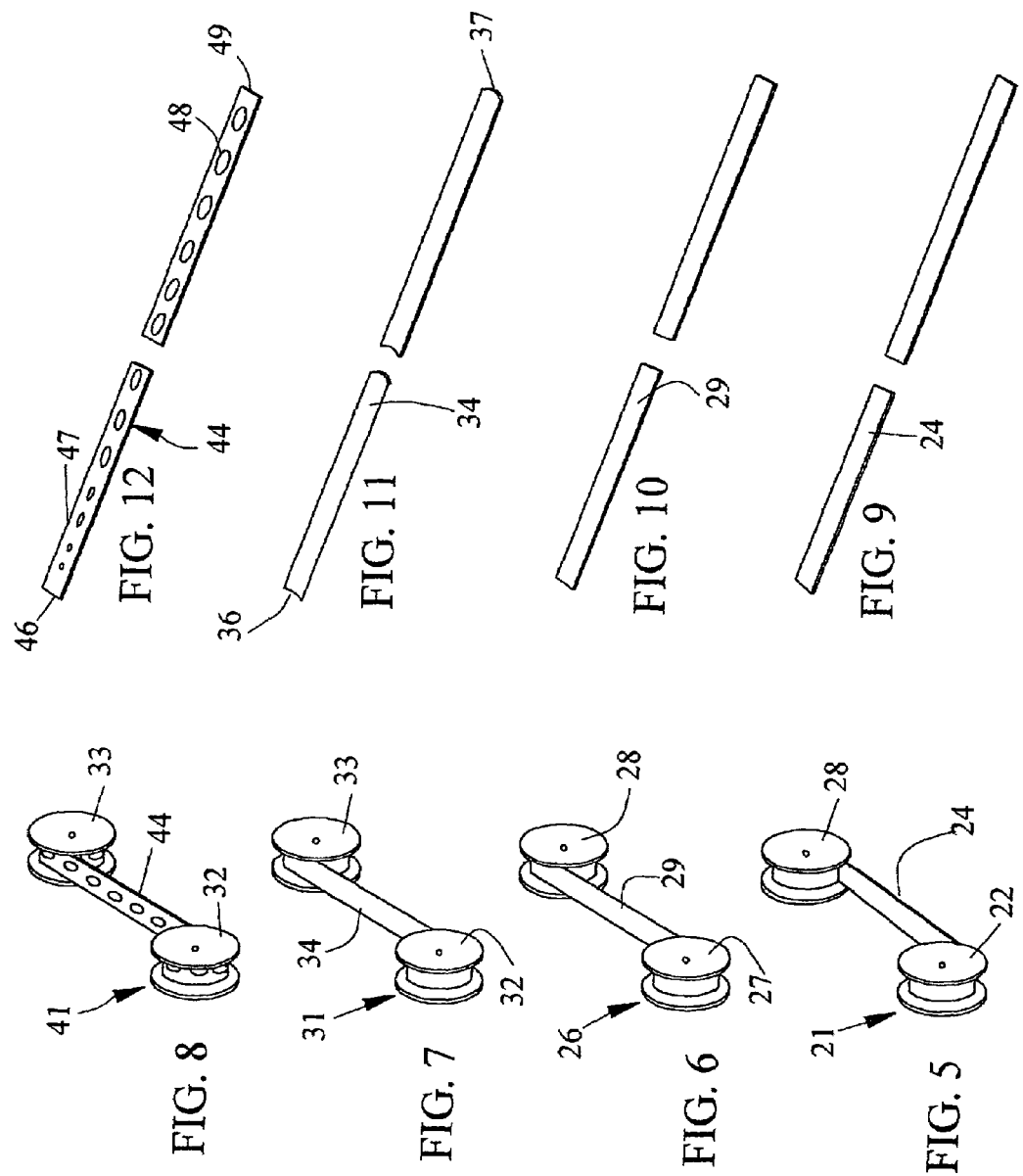

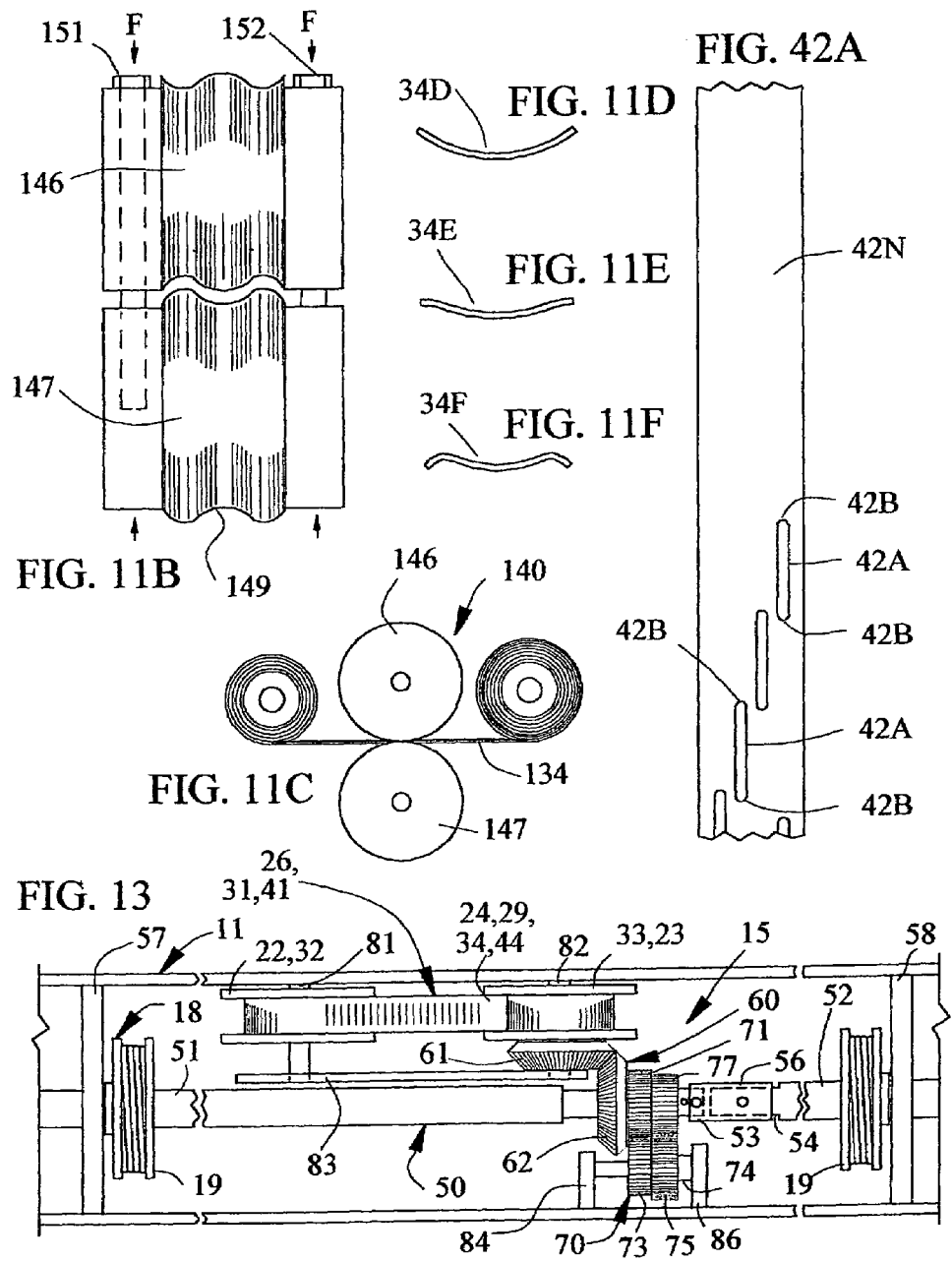

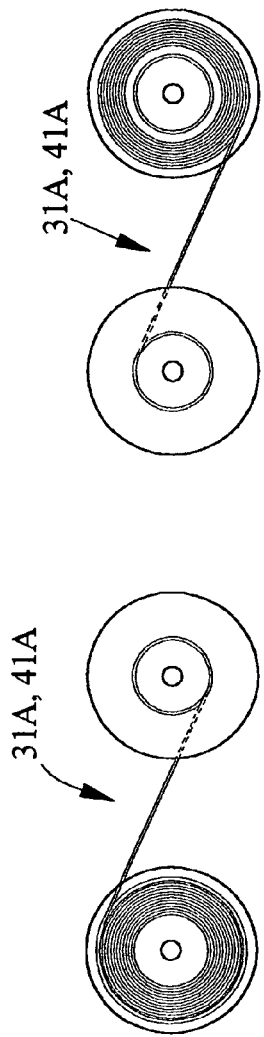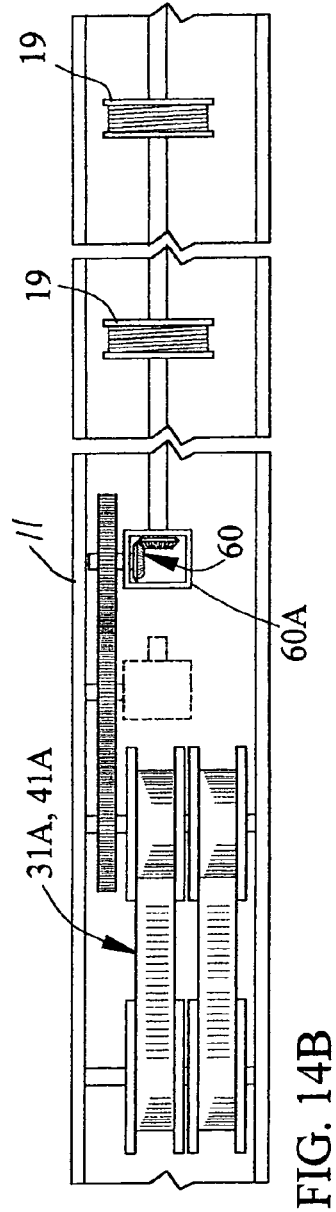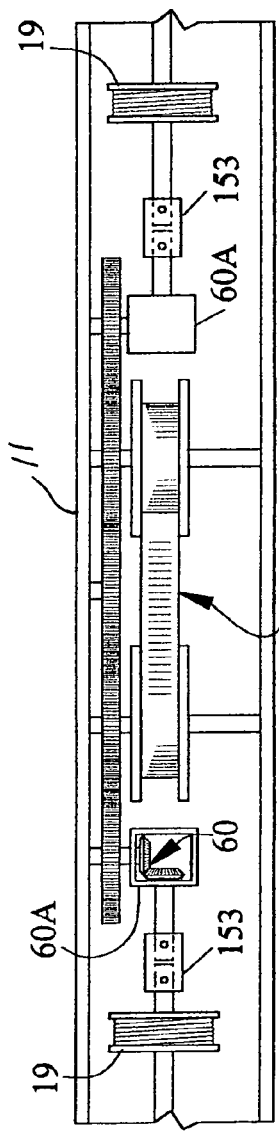

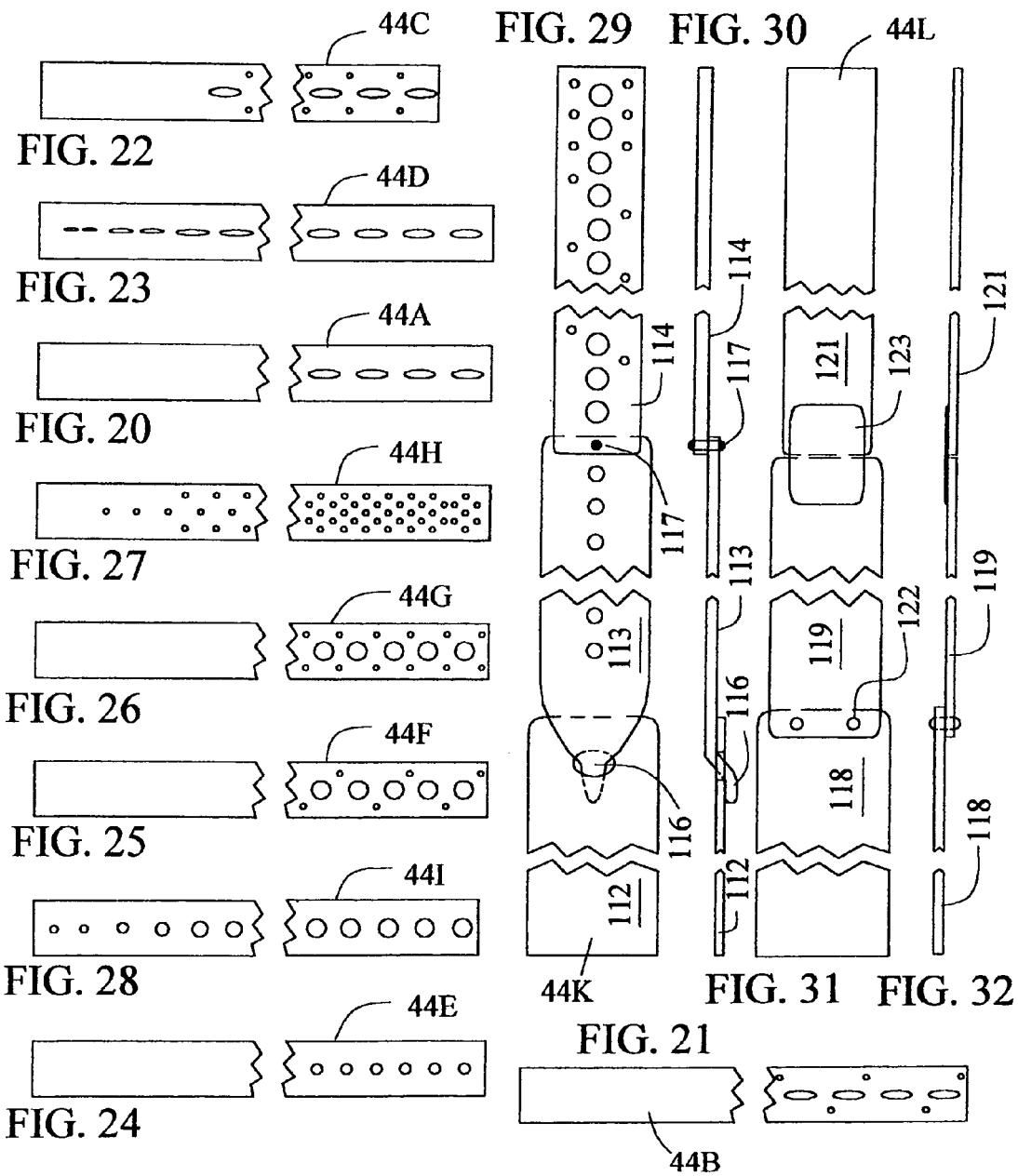

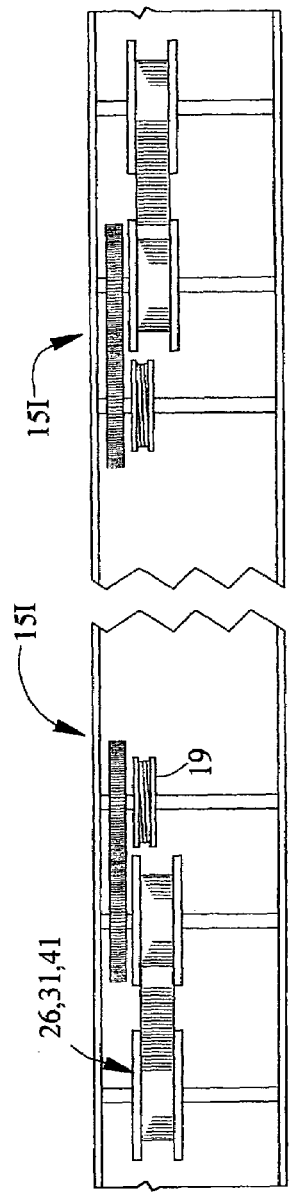

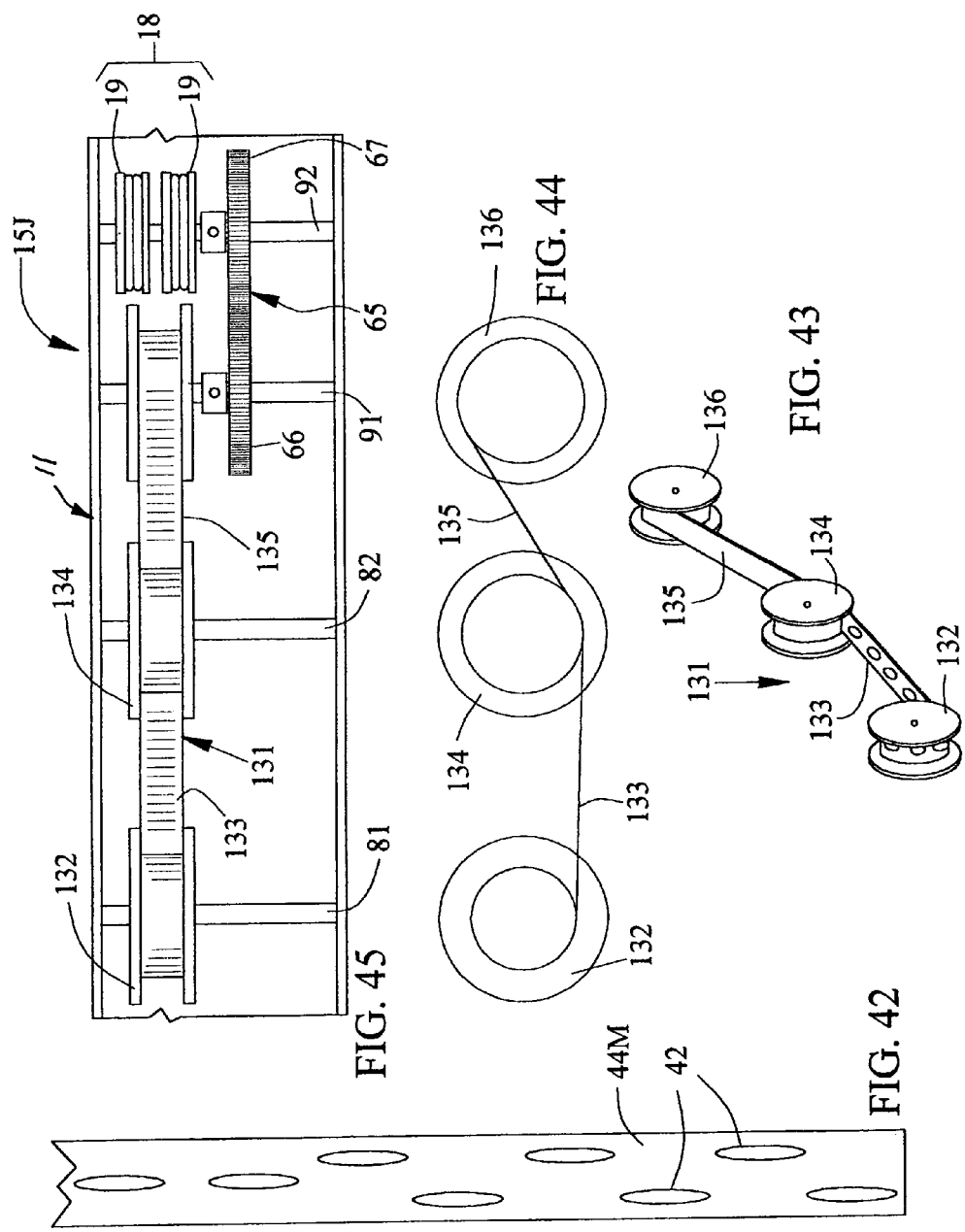

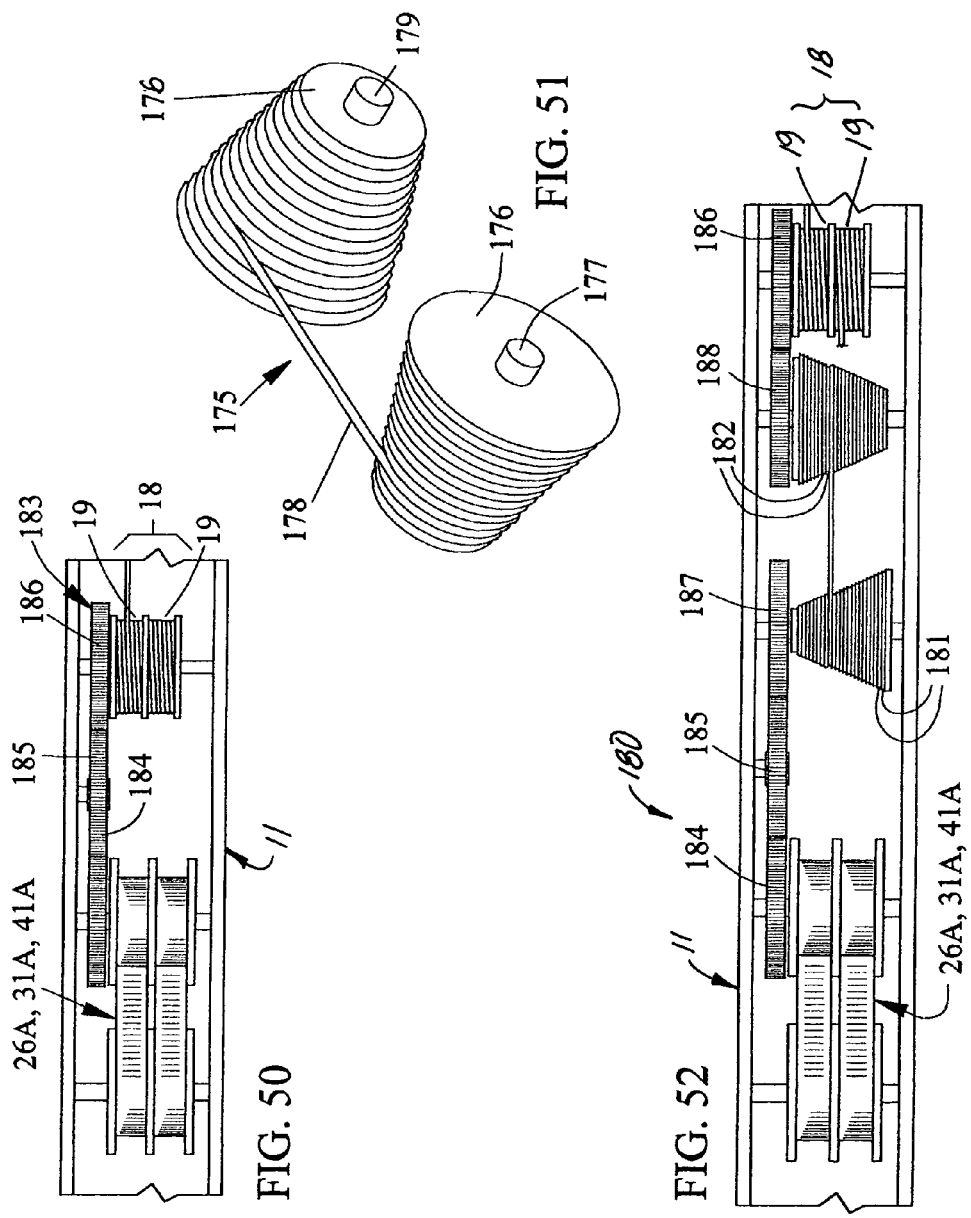

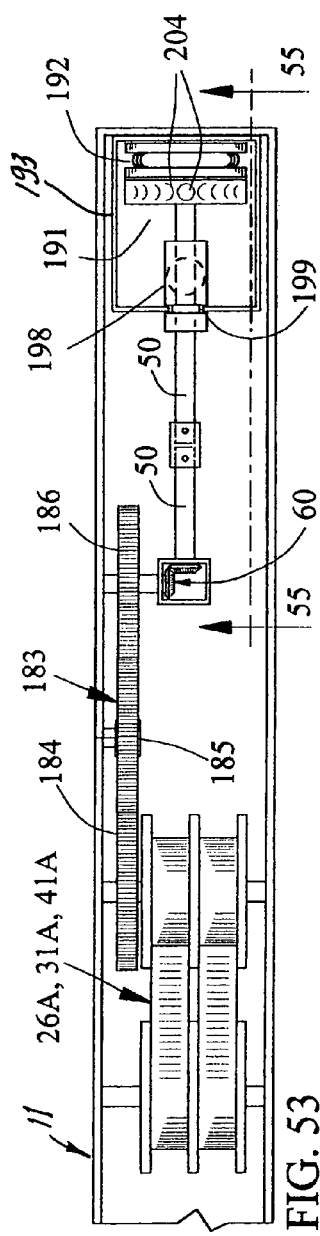
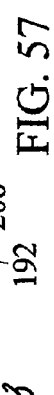
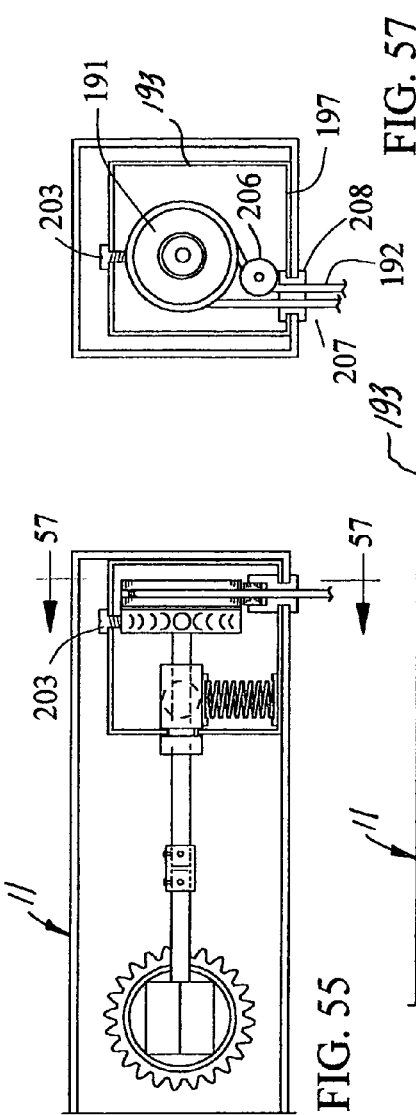
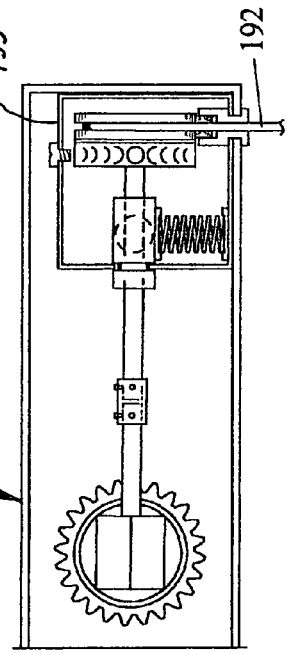
FIG. 53
FIG. 57
FIG. 55
FIG. 56

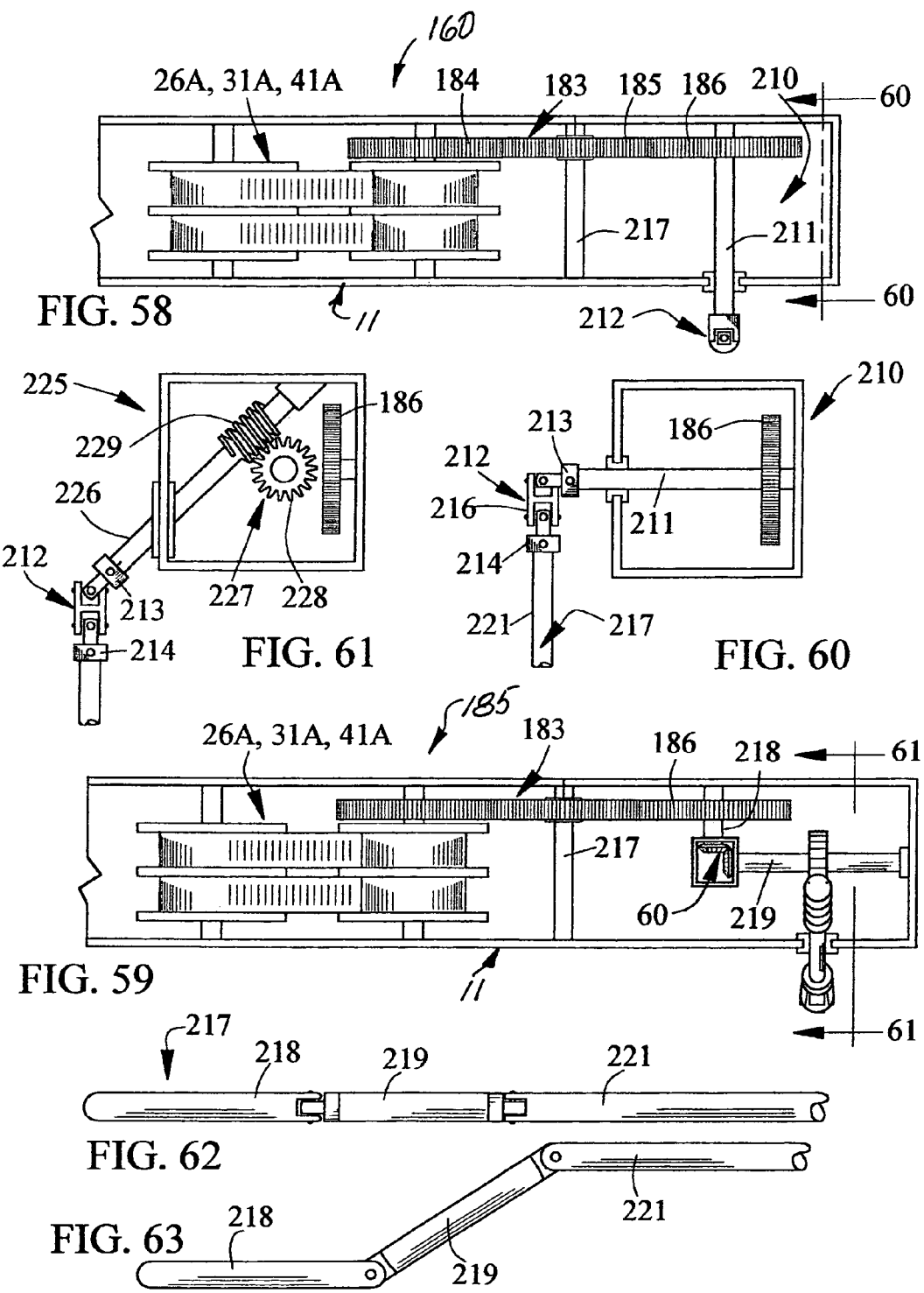

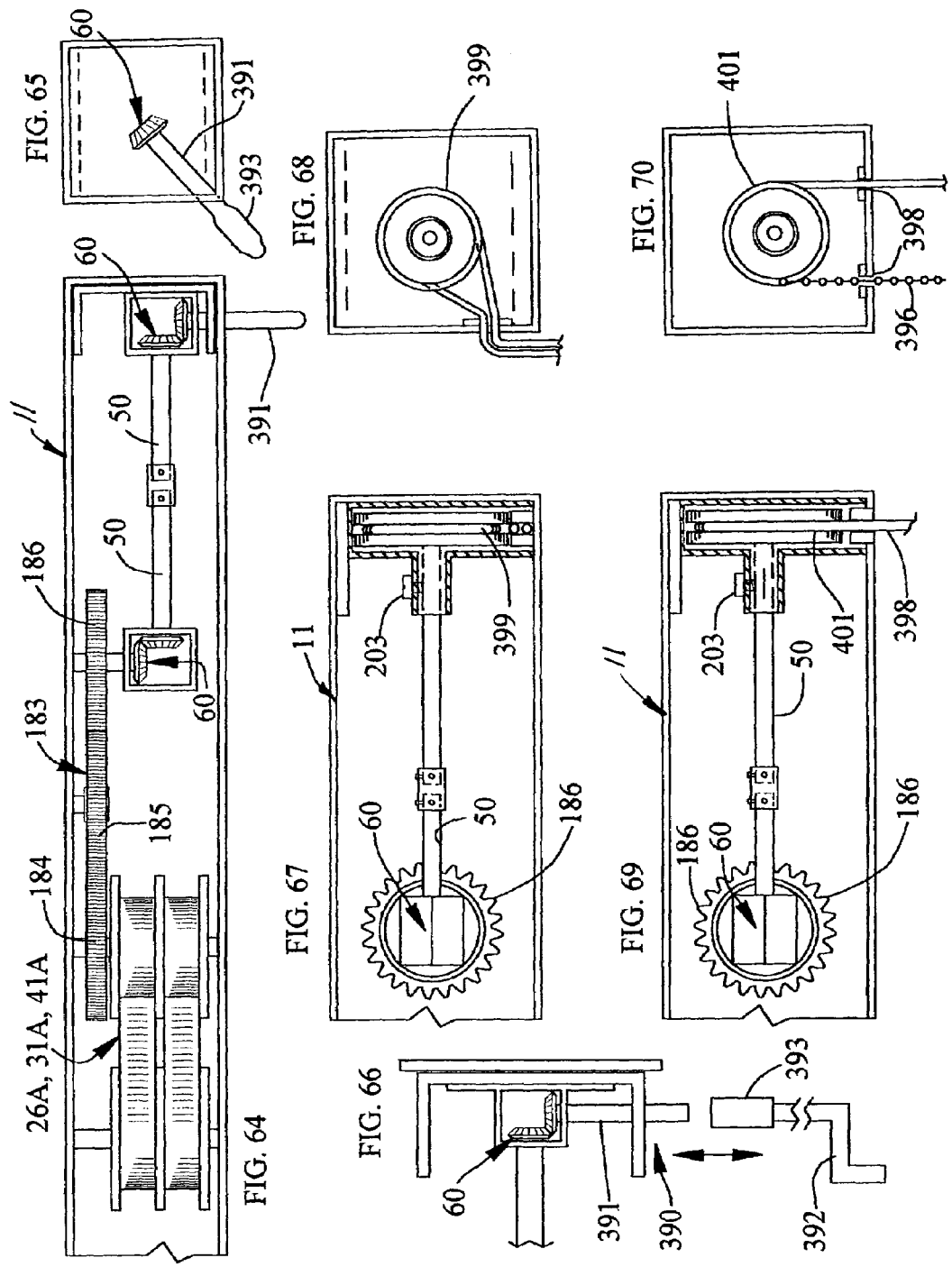

REVERSIBLE PULL CORD MECHANISM AND SYSTEM

A. BACKGROUND OF THE INVENTION

1. Field of the Invention

The present invention relates to pull cords for effecting and controlling the movement of loads such as covers, including but not limited to window covers. The present invention also relates to drive systems such as spring drives or motors, including flat (or spiral coil) and coil spring drives, which are useful in numerous applications for effecting and controlling the movement of loads, including but not limited to covers, including window covers, and to other components which are useful in combination with such spring drives.

2. Definitions and Applicability

Springs of the type shown for example in FIGS. 5C, 7C, 9C and 10C typically are referred to herein as coil springs. Springs of the type shown for example in FIGS. 6–8 typically are referred to herein as flat springs.

Typically, as used herein, the word "cover" refers to expandable or extendible structures such as blinds and drapes. These include slat structures such as so-called venetian or slat blinds and so-called mini-blinds. These structures also include pleated folding structures such as single and plural pleat structures and box, hollow and cellular structures. "Cover" also refers to flat, sheet-type covers such as roller blinds. In this document, "cover" and "blind" are frequently used interchangeably. As applied to such covers, "operate" refers to the process of closing and opening the covers, typically (for horizontally oriented or extending covers with the cover mounted and collected at the top) to lowering and raising the cover.

As used here, "horizontal" window cover refers to horizontally oriented covers such as horizontal slat blinds, horizontal folded-pleat blinds and drapes and horizontal cellular blinds and drapes. The present invention is applicable generally to horizontal window cover systems and to flat window cover systems. It is understood that "window," as used for example in "window cover," includes windows, doorways, openings in general and non-opening areas or regions to which covers are applied for decoration, display, etc.

As used here, the terms "operatively connected," "operatively coupled," "operatively connected or coupled" and the like include both direct connections of one component to another without intervening components and connections via intervening components including gears, transmissions, etc. Also, "plurality" means two or more.

3. Current State of the Relevant Technology a. Pull Cords

Typically, when used to control loads such as a cover or window cover, single pull cords can be used to pull the associated load in a single direction. Endless cords are used to pull the load in opposite directions.

Accordingly, in is one object of the present invention to provide a single pull cord mechanism which has the ability to pull loads such as covers and window covers in opposite directions, for example, to both extend and retract the load.

b. Slat and Resilient ((Pleated) Blinds

Typically a horizontal cover or blind is mounted above the window or space which is to be covered, and is operated using lift cords to extend the cover and lower it across the area, stopping at a selected position at which the blind partially or fully covers the area. For typical horizontal slat blinds, the lift cords are attached to a bottom rail and the "rungs" or cross-members of a separate cord ladder are positioned beneath the slats of the blind. When the blind is fully lowered, each slat is supported by a rung of the blind's cord ladder and relatively little weight is supported by the lift cords. However, as the blind is raised, the slats are "collected" on the bottom rail, and the support of the slats is thus increasingly transferred from the cord ladder to the bottom rail and the weight supported by the rail and the associated lift cords increases.

Many pleated, cellular, box, etc., blinds are formed of resilient material having inherent spring-like characteristics. As the resilient pleated blind is raised toward the fully open position, the blind material is increasingly compressed, and requires increasingly greater force to overcome the compression force and move the blind and hold the blind in position. Conversely, as the blind is extended and lowered toward a closed position, the compression of the pleats decreases. Effectively, then, both the slat blind and the pleated blind require increasingly greater force to open or raise the blind and to maintain the blind open than is required to close or lower the blind and maintain the blind closed.

c. Flat and Coil Spring Drives

The operating characteristics of conventional coil spring drives and conventional constant torque flat spring drives are not ideally suited to assist the opening and closing operation of horizontal and flat blinds, especially long or heavy blinds. As applied to downward-closing embodiments of such blinds, such spring drives usually are mounted at the top of the blind, and are operatively connected or coupled to the shaft about which the blind lift cords are wound. As described above, as the blind is lowered, the slat weight supported by the lift cords decreases and the compression of the pleats decreases.

However, in the case of the constant torque flat spring drive, as the blind is lowered (or raised) the torque force of the spring remains relatively constant as the supported slat weight or compression force of the lowering blind decreases, with the result that the spring torque may overcome the decreasing supported weight or the decreasing compression force, and raise the blind in fast, uncontrolled fashion. Also, it may be difficult to keep the blind at a selected position. Furthermore, if the blind is heavy, and requires a strong spring to maintain the blind open, the blind may be particularly susceptible to instability and uncontrolled raising operation when partially or fully extended (closed).

In the case of the coil spring drive, as the blind is lowered, the spring is wound and the energy stored in the coil spring increases, with the result that the increasing torque or force of the spring may then overcome the decreasing supported weight or the decreasing compression force and raise the blind in fast, uncontrolled fashion. Also, and as stated above regarding flat spring-assisted blinds, it may be difficult to keep coil spring-assisted blinds at a selected position and, if the blind is heavy and requires a strong spring to maintain the blind open, the blind may be particularly susceptible to instability and uncontrolled raising operation when partially or fully extended (closed). Conversely, when the coil spring-connected blind is at or near the upper limit of its travel (i.e., is open), the slat weight supported by the lift cords and the pleat compression are at or near maximum, while the coil spring torque is at or near minimum.

Frequently, prior art coil spring drives use latching mechanisms in an attempt to hold the blind or cover in position.

B. SUMMARY OF THE INVENTION

In one aspect, the present invention is embodied in a method using a pull cord which is operatively connected to a rotatable shaft for reversibly rotating the shaft, and comprising the steps: pulling the pull cord in a first direction, thereby rotating the shaft in a first direction; and pulling the pull cord in a second direction, thereby rotating the shaft in a second direction, opposite the first direction. In another aspect, a method according to the present invention comprises the steps: (a) pulling the pull cord in a direction selected from first and second, different directions, thereby rotating the shaft in a direction selected from first and second, opposite directions, respectively; (b ) returning the pull cord; and (c) repeating steps (a) and (b) as required to move the load to a selected position.

In another aspect, the present invention is embodied in a reversible pull cord mechanism, comprising first and second rotatable shafts; pull cord means for rotating the first shaft in a selected direction when the pull cord means is pulled; means responsive to pulling the pull cord means in different directions for rotating the first shaft in a selected direction; and means responsive to pulling the pull cord in two of said different directions for converting rotation of the first shaft in the selected direction into rotation of the second shaft in two opposite directions.

In a related aspect, the reversible pull cord mechanism comprises: first and second rotatable shafts; pull cord means for rotating the first shaft in a selected direction when the pull cord means is pulled; means for retracting the pull cord means; means for converting rotation of the first shaft in the selected direction into rotation of the second shaft, said converting means being settable in first and second conditions for respectively converting rotation of the first shaft in the selected direction into rotation of the second shaft in first and second directions; and means responsive to pulling movement of the pull cord means in first and second directions for selectively setting the converting means in the first and second conditions as the cord means is pulled.

In another related aspect, the present invention is embodied in a reversible pull cord mechanism, comprising: a retractable pull cord mechanism comprising: a first rotatable shaft; a pulley operatively connected to the first rotatable shaft for rotating the first rotatable shaft; cord means wrapped around the pulley for rotating the pulley and the first rotatable shaft when the cord means is pulled away from the pulley; and means operatively connected to the first rotatable shaft for rewinding the cord means when the cord means is released; a second rotatable shaft operatively connected to the first rotatable shaft for rotating the second rotatable shaft when the first rotatable shaft rotates; shifting means adapted for positioning in first and second positions for converting single direction rotation of the first rotatable shaft into rotation of the second rotatable shaft in first and second directions; and spring means connecting the pull cord means to the shifting means for setting the shifting means in said first and second positions in response to the pull cord means being pulled in first and second directions.

In yet another aspect, the present invention is embodied in a reversible rotation pull cord mechanism, comprising: a retractable pull cord mechanism comprising: a first rotatable shaft; a pulley operatively connected to the first rotatable shaft for rotating the first rotatable shaft; cord means wrapped around the pulley for rotating the pulley and the first rotatable shaft when the cord means is pulled away from the pulley; and means operatively connected to the first rotatable shaft for rewinding the cord means when the cord means is released; a transmission mechanism including a second rotatable shaft operatively connected to the first rotatable shaft for rotating the second shaft when the first shaft rotates; the transmission means further comprising shifting means adapted for being positioned in first and second positions for converting single direction rotation of the first rotatable shaft into rotation of the second rotatable shaft in first and second directions; and spring means connecting the pull cord means to the shifting means for setting the transmission mechanism in said first and second positions in response to the pull cord means being pulled in first and second directions.

The transmission mechanism may comprise a first gear operatively mounted on the first rotatable shaft for rotating therewith in a first direction; a second gear meshed with the first gear for rotating in a second direction, opposite the first direction; and a third, output gea. The shifting means may comprise fourth and fifth gears; a movable shaft mounting the fourth and fifth gears at spaced apart locations along the shaft with the fifth gear maintained meshed with the third, output gear; the movable shaft being mounted for arcuate movement between said first position, at which the fourth gear meshes with the first gear for rotating the fifth gear with the first gear and said second position, at which the fourth gear meshes with the second gear for rotating the fifth gear with the second gear. The spring means may operatively connect the pull cord means to the movable shaft for moving the movable shaft to the said first and second positions.

In another aspect, the spring means comprises a first arm or section mounted proximate the shifting means for rotating movement; a second arm or section mounted proximate one end to and extending from the first arm and mounted proximate a second end to the movable shaft of the shifting means for moving the movable shaft between and to said two positions upon rotation of the first arm; and a third arm mounted to and extending from the first arm for rotating the first arm, thereby pivoting the second arm and moving the movable shaft between and to said two positions.

In still another aspect, the transmission mechanism comprises: a first gear operatively mounted on the first rotatable shaft for rotating therewith in a first direction; a second gear meshed with the first gear for rotating in a second direction, opposite the first direction; a third, output gear; and the shifting means of the transmission means comprises fourth and fifth gears; a movable shaft mounting the fourth and fifth gears at spaced apart locations along the shaft with the fifth gear maintained meshed with the third, output gear; the movable shaft being mounted for arcuate movement among and to said first position, in which the fourth gear meshes with the first gear for rotating the fifth gear with the first gear, said second position, in which the fourth gear meshes with the second gear for rotating the fifth gear with the second gear, and a third, neutral position between said first and second positions in which the fourth gear is disengaged from the first and second gears; and the spring means operatively connects the pull cord means to the movable shaft for moving the movable shaft among and to said first, second and third positions.

In yet another aspect, the means for moving the movable shaft comprises: first spring means comprising a first arm or section mounted proximate the shifting means for rotating movement; a second arm or section mounted proximate one end to and extending from the first arm and mounted proximate a second end to the movable shaft of the shifting means for moving the movable shaft among and to the three positions upon rotation of the first arm; and a third arm mounted to and extending from the first arm for rotating the first arm, thereby pivoting the second arm and moving the movable shaft among and to the three positions; and the third arm having an aperture therein receiving the cord in sliding engagement such that pulling the cord in first and second directions moves the movable shaft to said first and second positions; and second spring means mounted proximate the first spring means and having a detent positioned such that when the cord is released, the detent releasably engages the first spring means and positions the first spring means in said neutral third position, and disengages from the first spring when the cord is pulled in the first or second direction.

In another aspect, the present invention is embodied in a pull cord-operated retractable cover system, comprising: (1) a cover system comprising: a housing; a plurality of rotatable pulleys mounted on or to the housing; a cover; cords wound around the pulleys and connected to the cover for extending the cover from the housing and retracting the cover to the housing; and (2) a reversible pull cord mechanism as described in various aspects and embodiments above.

Other aspects and embodiments of the present invention are described in the specification, drawings and claims. These embodiments include application of the pull cord mechanism according to the present invention to covers and other loads, to effect and control the movement of the associated loads.

C. BRIEF DESCRIPTION OF THE DRAWINGS

The above and other aspects of the invention are described below in conjunction with the following drawings.

FIG. 1 is a front elevation view of a horizontal slat blind window cover system, showing the cover in a fully extended, fully lowered (closed) condition.

FIG. 2 is a front elevation view of the window cover system of FIG. 1, showing the cover in a nearly fully-retracted, nearly fully-raised (nearly open) condition.

FIG. 3 is a front elevation view of a horizontal pleated blind window cover system, showing the cover in a fully extended, fully lowered (closed) condition.

FIG. 4 is a front elevation view of the window cover system of FIG. 3, showing the cover in a nearly fully-retracted, nearly fully-raised (nearly open) condition.

FIG. 6 is a perspective view of a flat spring drive.

FIG. 8 is a perspective view of a varied torque, flat spring drive having holes in accordance with the present invention.

FIG. 8C is a side elevation view of a band or cord transmission in accordance with the present invention.

FIG. 11 is a perspective view of the varied cove spring of FIG. 7.

FIGS. 11A, 11B and 11C are, respectively, a perspective view, an end elevation view sans spring, and a schematicized side elevation view of a roll forming assembly for forming springs of constant or varied cove.

FIGS. 11D, 11E and 11F are transverse cross-section views of springs having, respectively, constant cove, relatively shallow reverse edge curvature, and relatively deep reverse edge curvature.

FIG. 12 is a perspective view of the perforated spring of FIG. 8.

FIGS. 13–19 and FIGS. 5C, 7C, 9C and 10C, etc. are top plan views of spring drive units embodying the present invention.

Figure 5C:
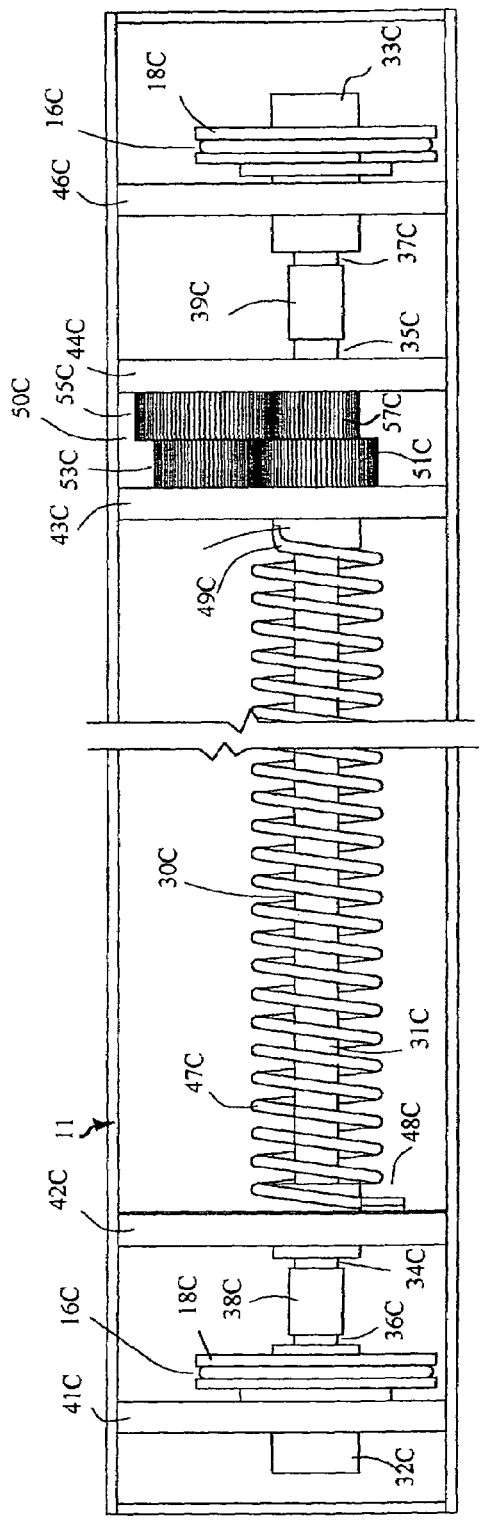
FIG. 5 is a perspective view of a band or cord shift transmission in accordance with the present invention.
Figure 10C:
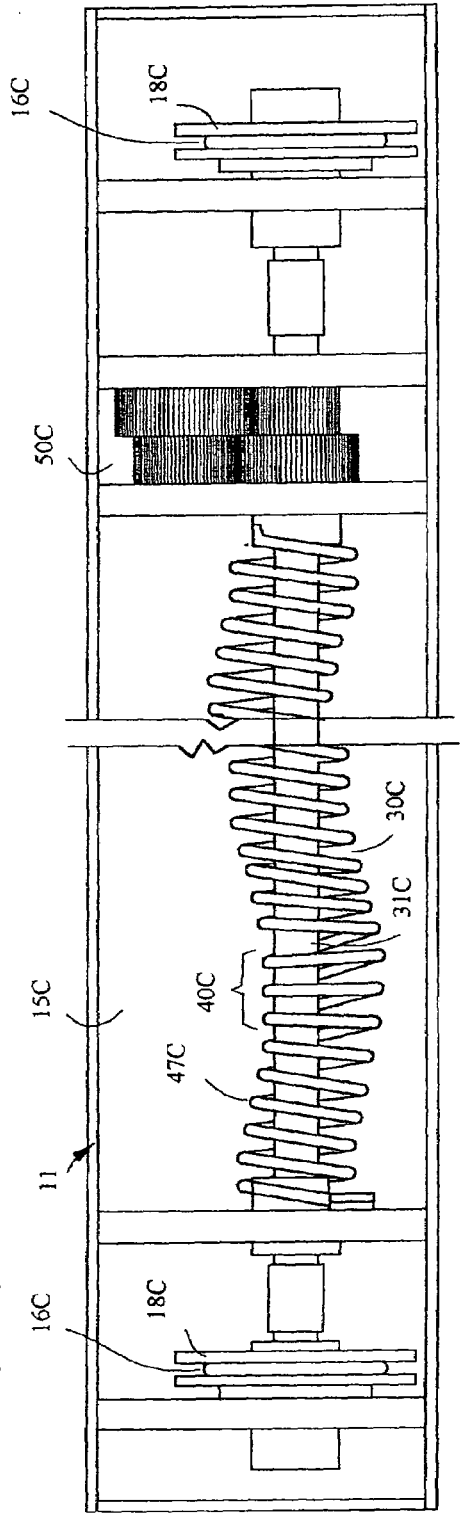
FIG. 10 is a perspective view of the flat spring of FIG. 6.
Figure 18:
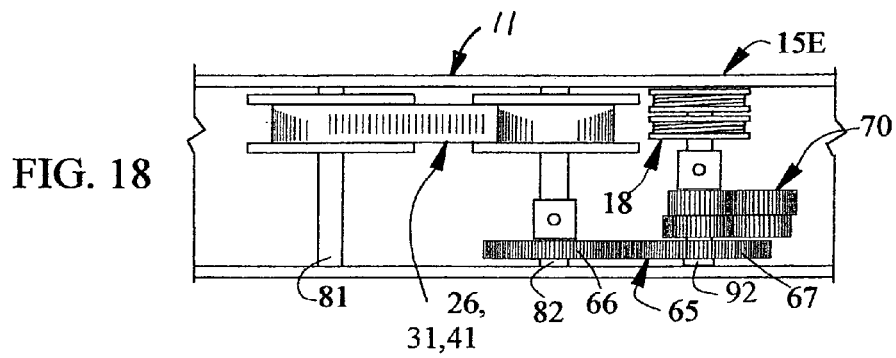
Figure 19:
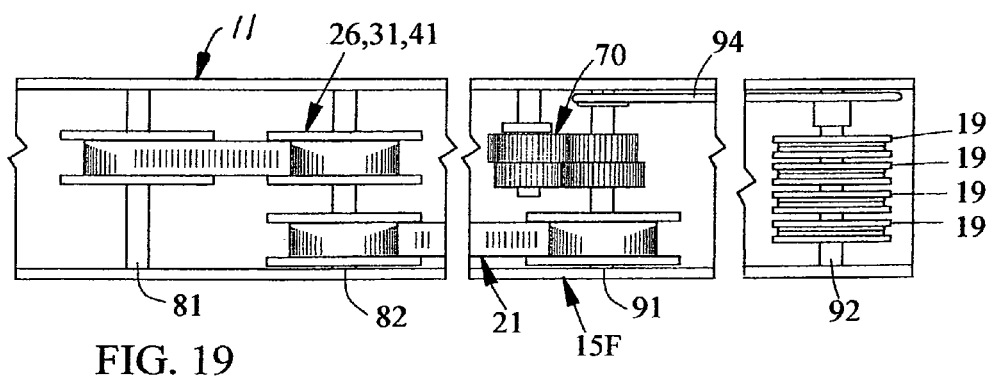

In particular, FIGS. 13, 18 and 19 are simplified top plan views of a flat spring drive unit in accordance with the present invention comprising a flat spring drive and a gear transmission, interconnected by a gear set and adapted for use in window cover systems such as those depicted in FIGS. 1–4. FIG. 5C is a simplified top plan view of a coil spring drive unit in accordance with the present invention, comprising a coil spring drive and a gear transmission, adapted for use in window cover systems such as those depicted in FIGS. 1–4. FIG. 10C is a simplified top plan view of the coil spring drive unit depicted in FIG. 5C, and showing the binding of the spring coils on the shaft when the spring is relatively fully wound and the associated cover is extended at or near the closed condition.

FIG. 6C is an exploded view of the gear transmission of FIGS. 5C, 13, etc.

FIGS. 14–17 are simplified top plan views of flat spring drive units in accordance with the present invention comprising a flat spring drive and an interconnecting gear means and adapted for use in window cover systems such as those depicted in FIGS. 1–4.

Figure 7C:
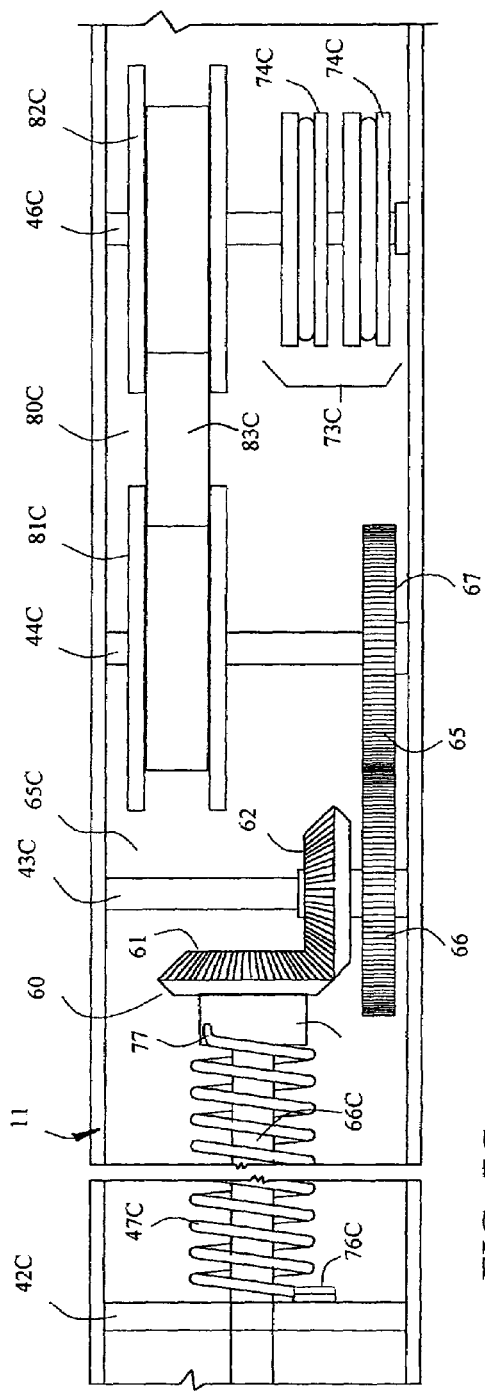
FIG. 7 is a perspective view of a varied torque, flat spring drive having varied cove in accordance with the present invention.
Figure 17:
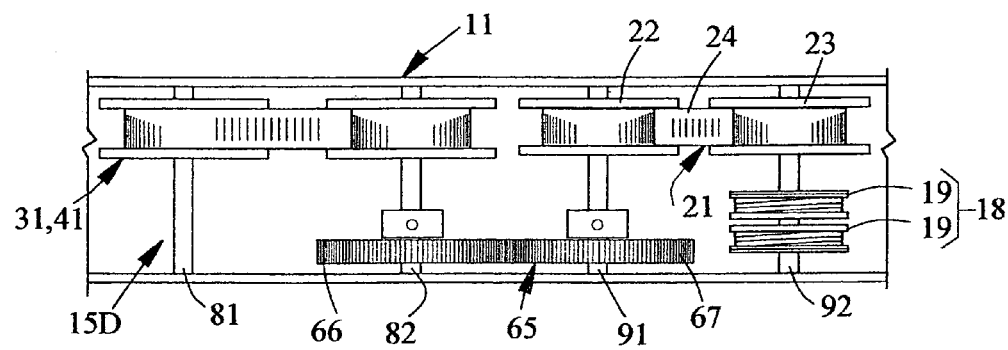

FIG. 17 is a simplified top plan view of a flat spring drive unit in accordance with the present invention comprising a flat spring drive and a band shift transmission, interconnected by a gear set and adapted for use in window cover systems such as those depicted in FIGS. 1–4. FIG. 7C is a simplified top plan view of a coil spring drive unit in accordance with the present invention, comprising a coil spring drive and a band shift transmission, interconnected by a gear set(s) and adapted for use in window cover systems such as those depicted in FIGS. 1–4.

Figure 9C:
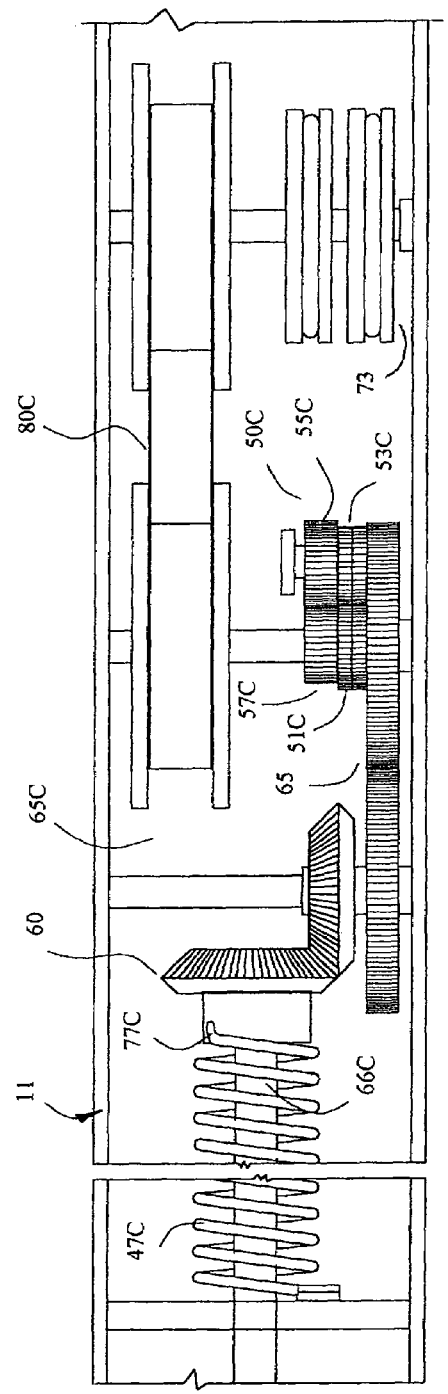
FIG. 9 is a perspective view of the band of FIG. 5.

FIG. 19 is a simplified top plan view of a flat spring drive unit in accordance with the present invention comprising a flat spring drive, a gear transmission, and a band shift transmission, and adapted for use in window cover systems such as those depicted in FIGS. 1–4. FIG. 9C is a simplified top plan view of a coil spring drive unit in accordance with the present invention, comprising a coil spring drive, a gear transmission and a band shift transmission, interconnected by a gear set(s) and adapted for use in window cover systems such as those depicted in FIGS. 1–4.

Please note, the coil springs illustrated in the above drawing figures, FIGS. 5C, 7C, 9C and 10C, are simplified, with enlarged spacing between the coils, to better illustrate the shaft and other components. For example, the individual coils of the actual spring of the type shown in FIGS. 5C and 10C are packed together, and in fact the increased packing of the wound spring is at least partially responsible for the binding illustrated in FIG. 10C.

FIGS. 14A and 14B depict the use of bevel gear sets to interconnect non-parallel components such as the pulley(s) and spring drives FIGS. 14C and 14D depict the wound/unwound condition of a spring drive when the associated cover or blind is in the raised and lowered position, respectively.

Figure 15:
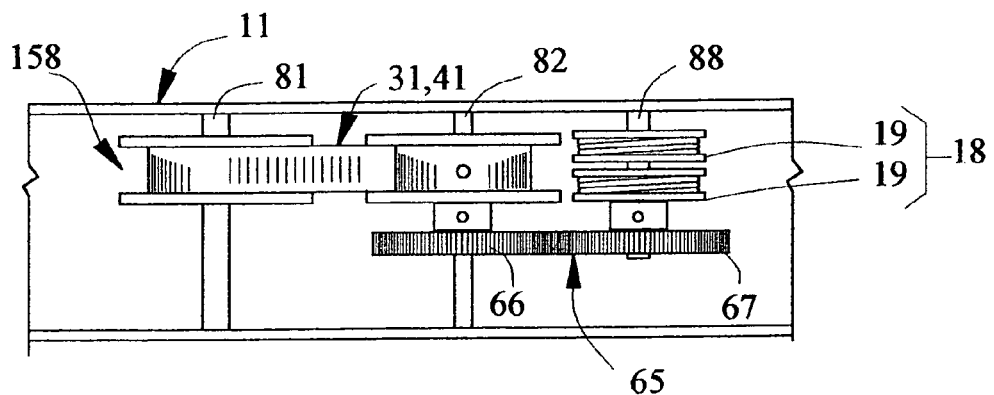
Figure 15A:
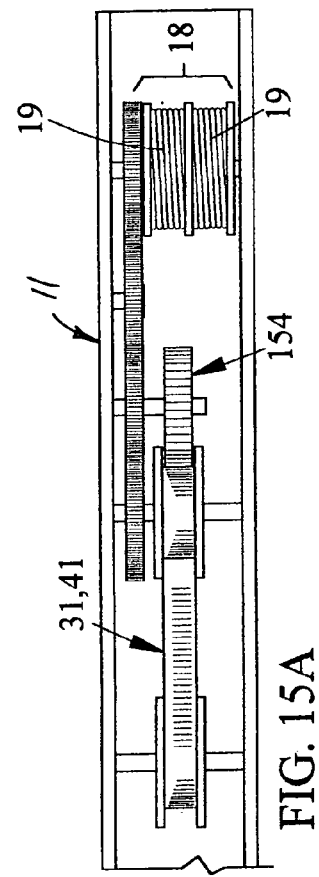

FIG. 15A depicts a spring drive unit which is similar to unit the unit depicted in FIG. 15, and includes a recoil roll.

FIGS. 20–28 and 42 depict additional embodiments of the perforated spring of FIG. 12.

FIGS. 29 and 30 are top and side views, respectively, of a perforated spring comprising separate sections joining by various joining means or members.

FIGS. 31 and 32 are top and side views, respectively, of a sectioned spring.

FIGS. 33–37 depict magnetic and detent brakes and components useful in spring drives.

Figure 33A:
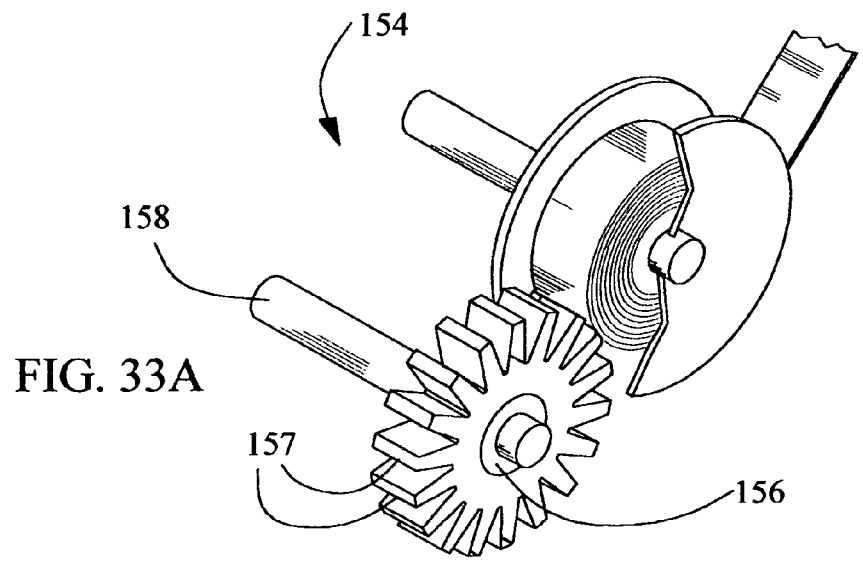
Figure 39A:
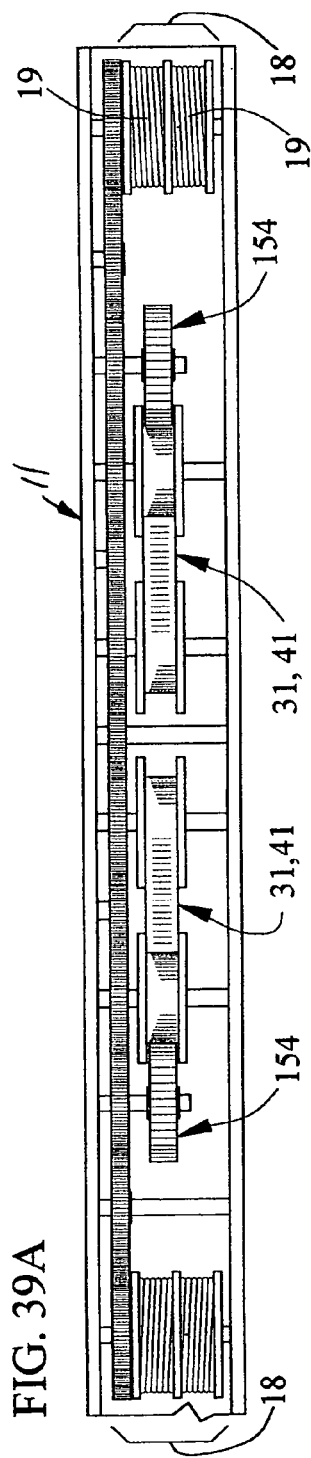

FIG. 33A depicts a braking device embodied in a recoiler roll which is useful with a spring drive unit as shown, for example, in FIGS. 15A and 39A.

Figure 33:
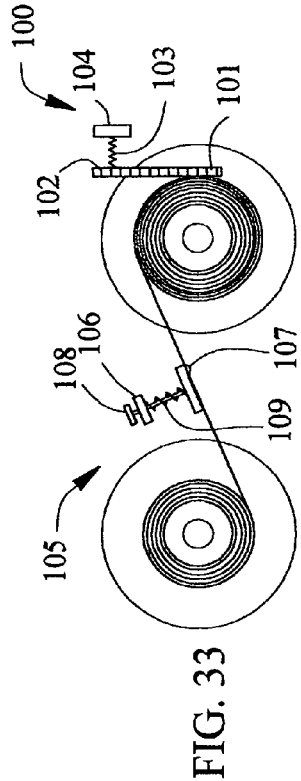
Figure 33B:
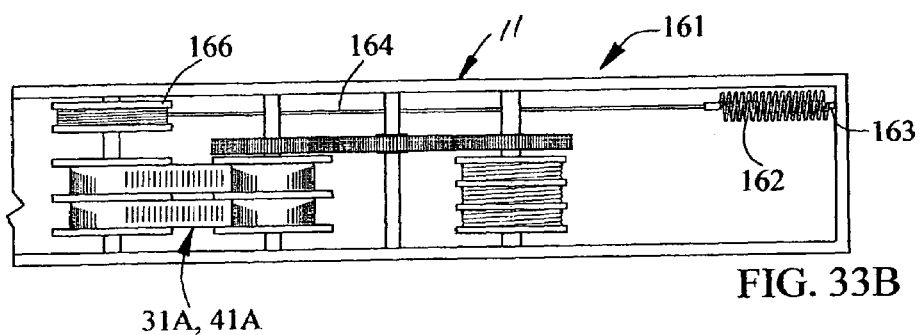

FIG. 33B depicts yet another braking device, one embodied in a coil spring recoiler.

Figure 38:
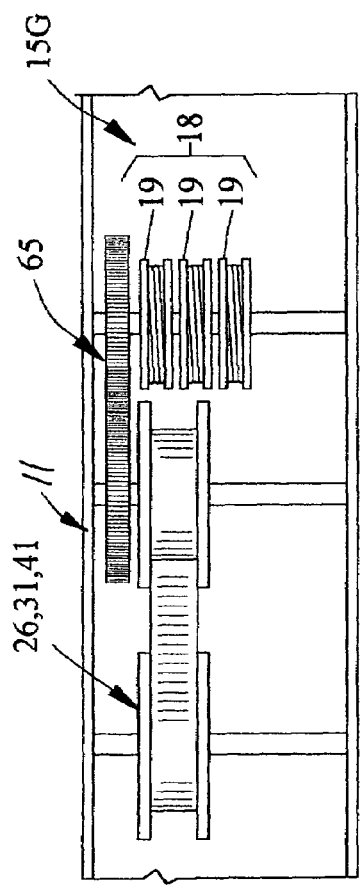

FIG. 38 depicts a single spring drive unit which includes three lift cords and pulleys.

Figure 39:
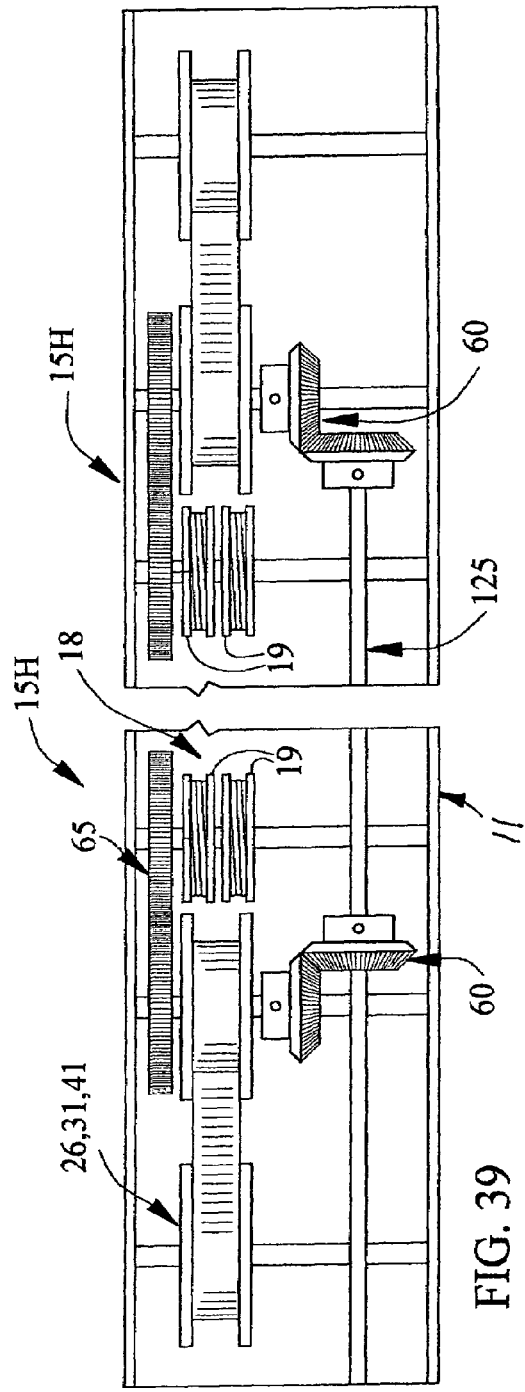

FIG. 39 depicts a window cover which includes a pair of drive units, each of which is similar to that of FIG. 38, but includes two pulleys and associated lift cords.

FIG. 40 depicts a window cover comprising a pair of spring drive units similar to those of FIG. 39 without the power transfer bar and with only one pulley in each drive unit.

Figure 40A:
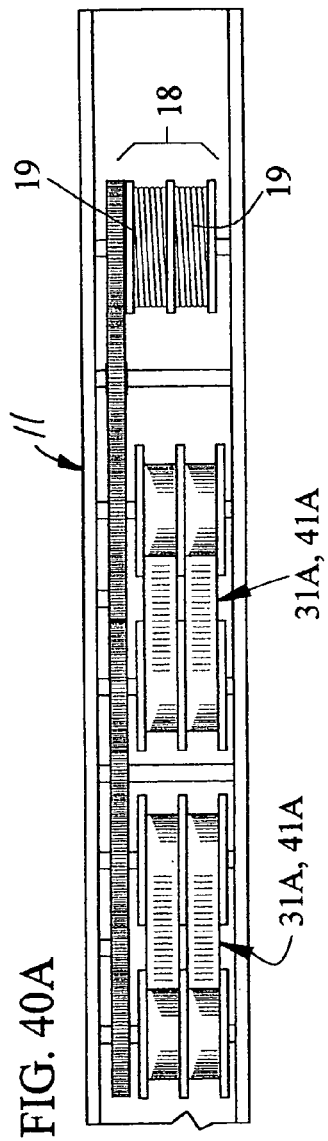

FIG. 40A depicts a window cover drive system comprising multiple spring drive units in which each spring drive unit comprises a pair of springs mounted in parallel.

FIG. 41 depicts a simplified front elevation view of the system of FIG. 40, showing representative examples of the lift cord paths for two and four cord systems.

FIG. 42 depicts another alternative perforated spring, one which comprises two laterally spaced parallel rows of longitudinally spaced, longitudinally elongated slots 42, for providing uniform torque characteristics.

FIG. 42A depicts yet another perforated spring, one comprising longitudinally-overlapping elongated slots having round, semi-circular ends 42B, for providing uniform torque characteristics.

FIG. 43 is a perspective view of a varied torque, torque-multiplying, plural flat spring drive in accordance with the present invention.

FIG. 44 is a simplified front elevation depiction of FIG. 43 illustrating the relationship of the two spring drives and their overlapping springs.

FIG. 45 is a top plan view of a spring drive unit embodying the plural spring drives of FIG. 43.

Figure 46:
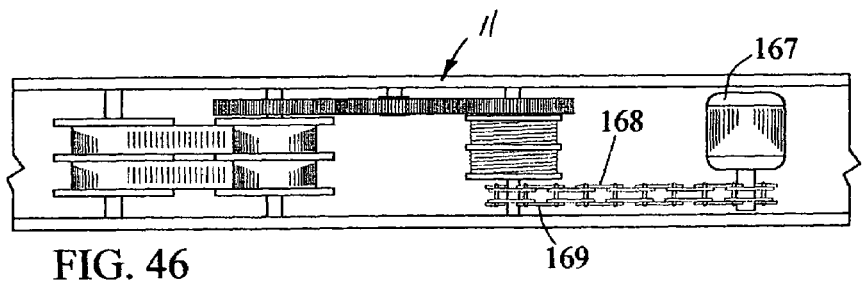
Figure 47:
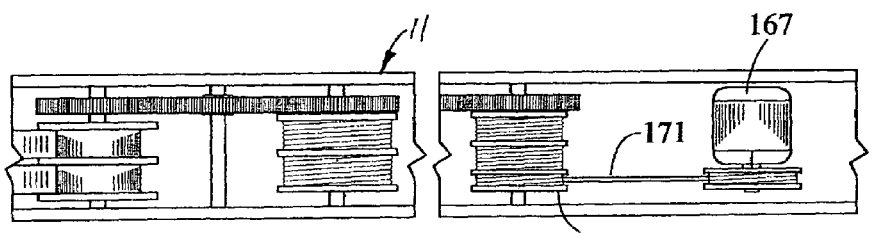
Figure 48:
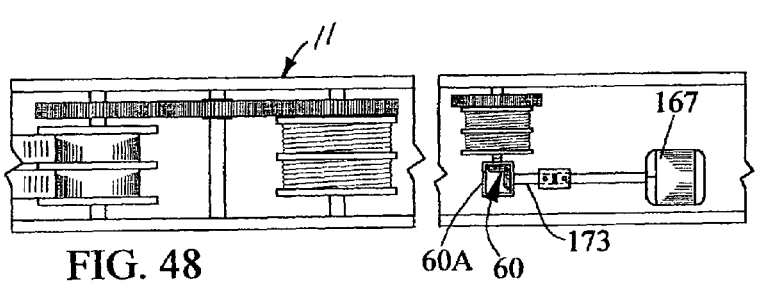

FIGS. 46–48 are top plan view of various embodiments of electric motor-assisted spring drive systems.

Figures 49, 54:
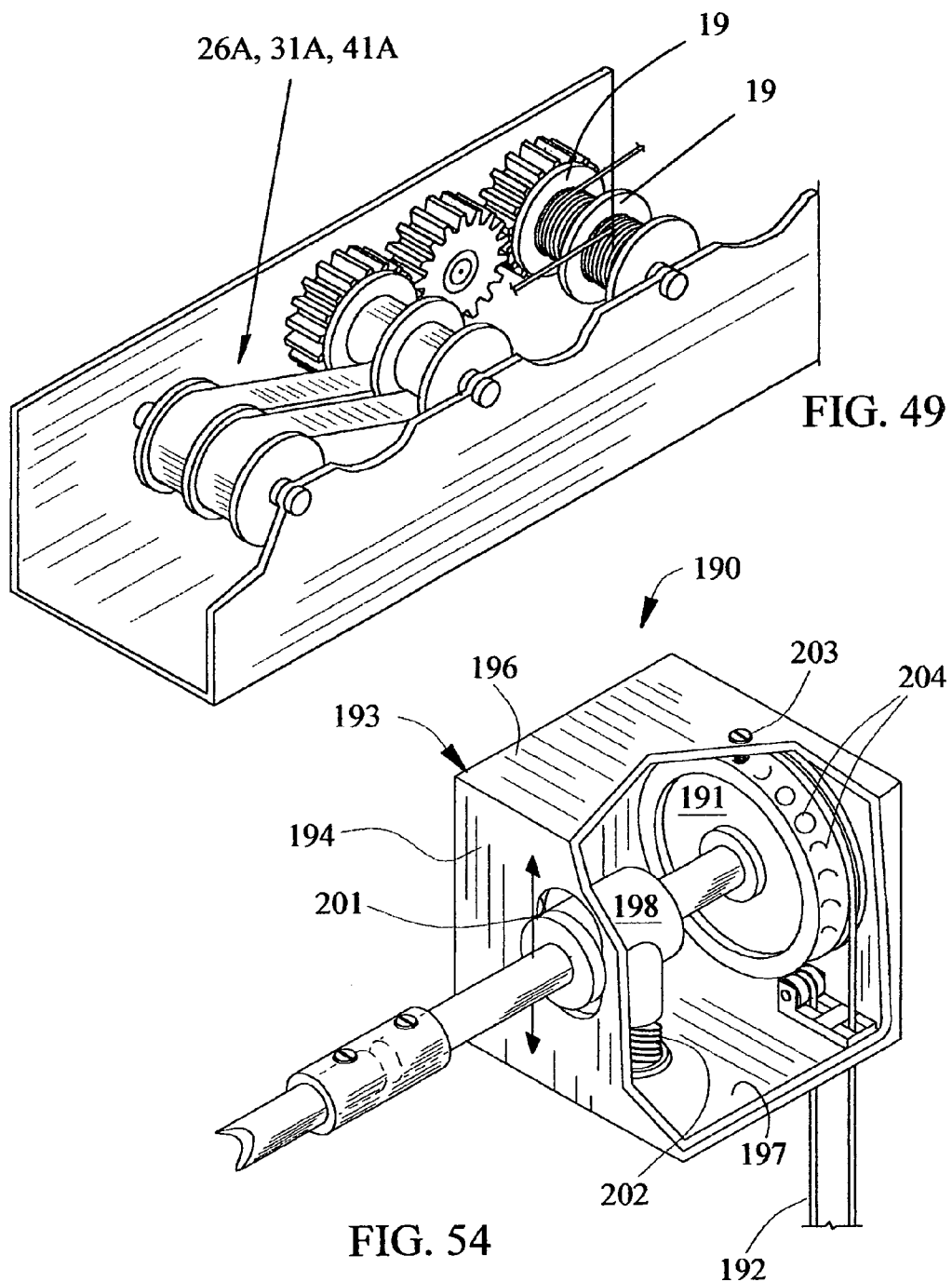

FIGS. 49 and 50 are, respectively, a front perspective view, partially broken away, and a top plan view of a simple compact embodiment of the plural-drive high torque spring drive system.

FIG. 51 is a perspective view of a direct or varied ratio cord pulley (band or cord shift transmission) system.

FIG. 52 is a top plan view of a section of a simple high torque spring drive system similar to the type of system shown in FIGS. 49 and 50, which includes the varied ratio cord pulley of FIG. 51.

FIG. 53 is a top plan view of a section of a simple high torque spring drive system which includes the automatic cord locking mechanism of FIG. 54.

FIG. 54 is a front perspective view, partially cut away, of an automatic cord locking mechanism in accordance with the present invention.

FIGS. 55 and 56 are partial front elevation section views taken along lines 55–55 and 56–56 in FIG. 53 and respectively showing the locking mechanism in the locked position and unlocked position.

FIG. 57 is an end elevation section view taken along line 57—57 in FIG. 53.

FIG. 58 is a top plan view of a section of a simple, crank-operated, multiple spring, high torque spring drive system in accordance with the present invention.

FIG. 59 is an end elevation section view taken along line 59—59 in FIG. 58.

FIG. 60 is a top plan view of a section of an alternative simple, crank-operated, multiple spring, high torque spring drive system in accordance with the present invention.

FIG. 61 is an end elevation section view taken along line 61—61 in FIG. 59.

FIGS. 62 and 63 depict a crank which is suitable for use in the systems disclosed in FIGS. 58–61.

FIG. 64 is a top plan view of a section of an alternative simple, crank-operated spring drive system in accordance with the present invention.

FIG. 65 is an end elevation view of the system of FIG. 64.

FIG. 66 is a front elevation view of the end section depicted in FIG. 65.

FIGS. 67 and 68 are, respectively, a front elevation view and an end elevation view of a front-emergent pull cord and pulley.

FIGS. 69 and 70 are, respectively, a front elevation view and an end elevation view of a bottom-emergent pull cord and pulley.

Figure 71:
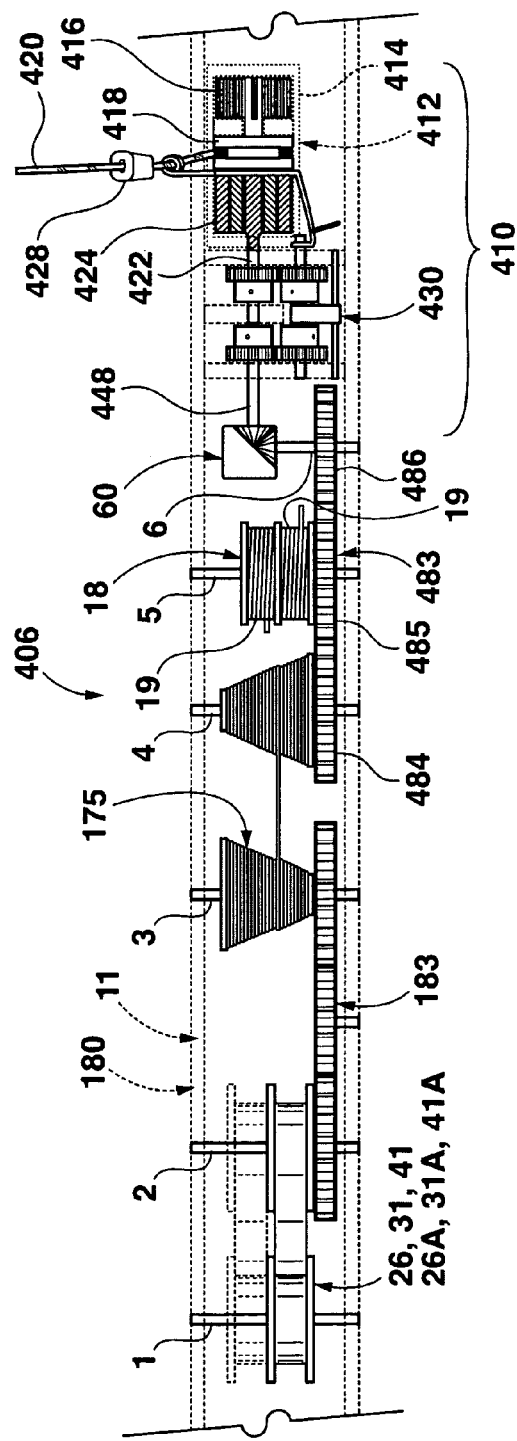

FIG. 71 is a partial bottom view of a head rail housing, shown with the head rail cover and other component covers removed, to better illustrate a pull cord-controlled drive system and a reversible pull cord mechanism, both in accordance with the present invention and which are mounted to the head rail and which are useful, for example, for operating a window blind or other cover.

Figure 72:
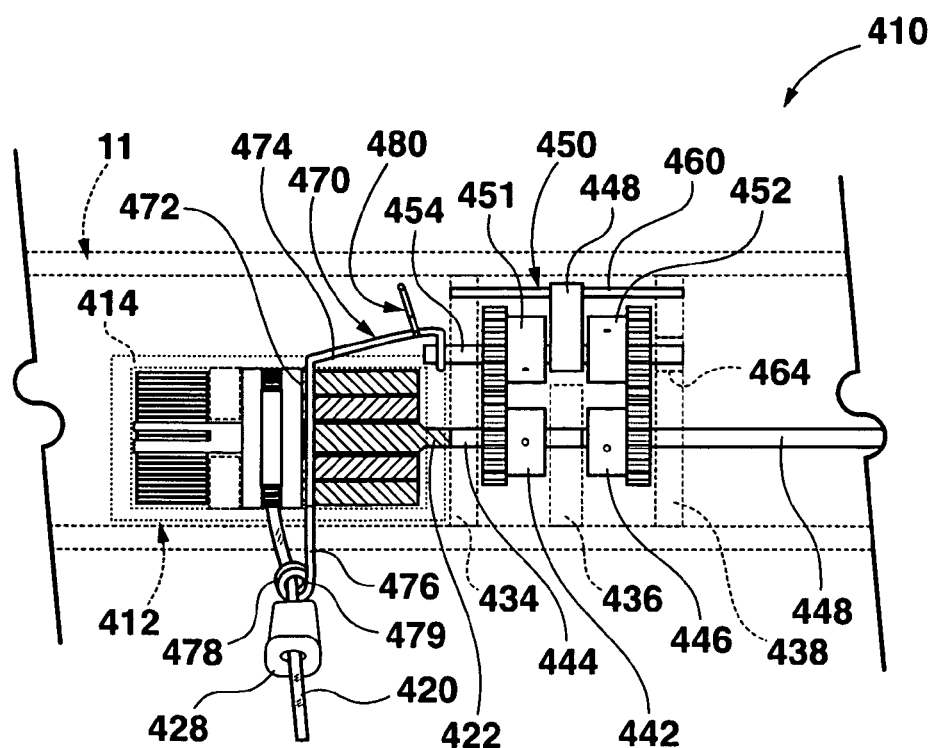

FIG. 72 is an enlarged bottom view of the reversible pull cord mechanism of FIG. 71, depicting the reversible pull cord mechanism in the neutral position in which the system output is disengaged from the system drive.

Figure 73:
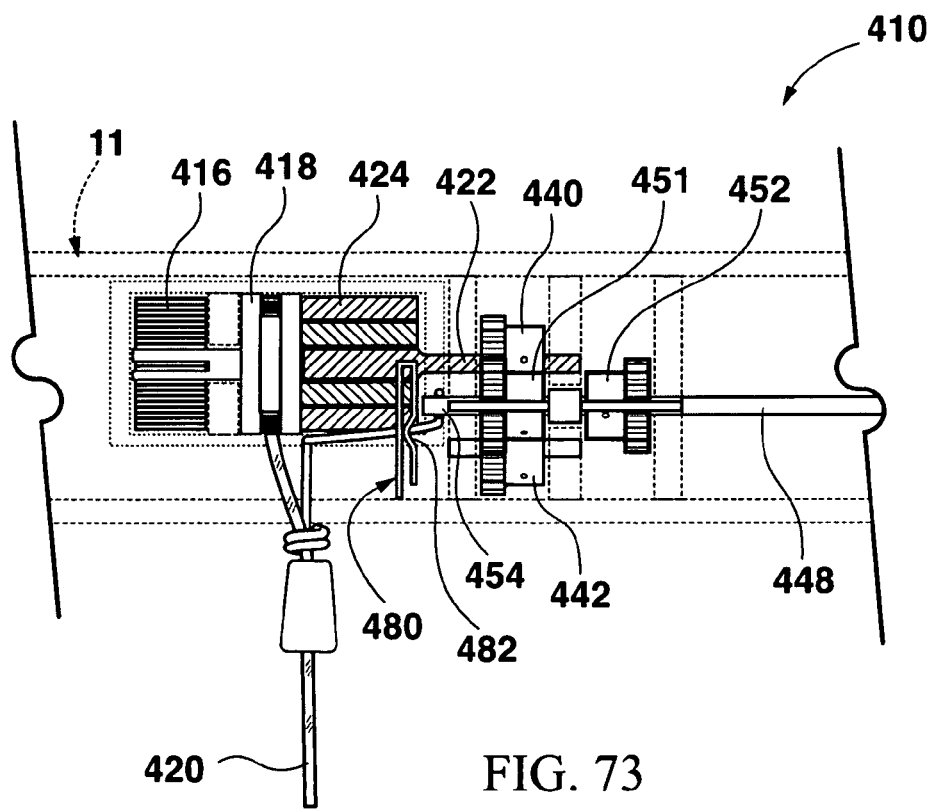

FIG. 73 is a side elevation view of the reversible pull cord mechanism of FIG. 72.

Figure 74:
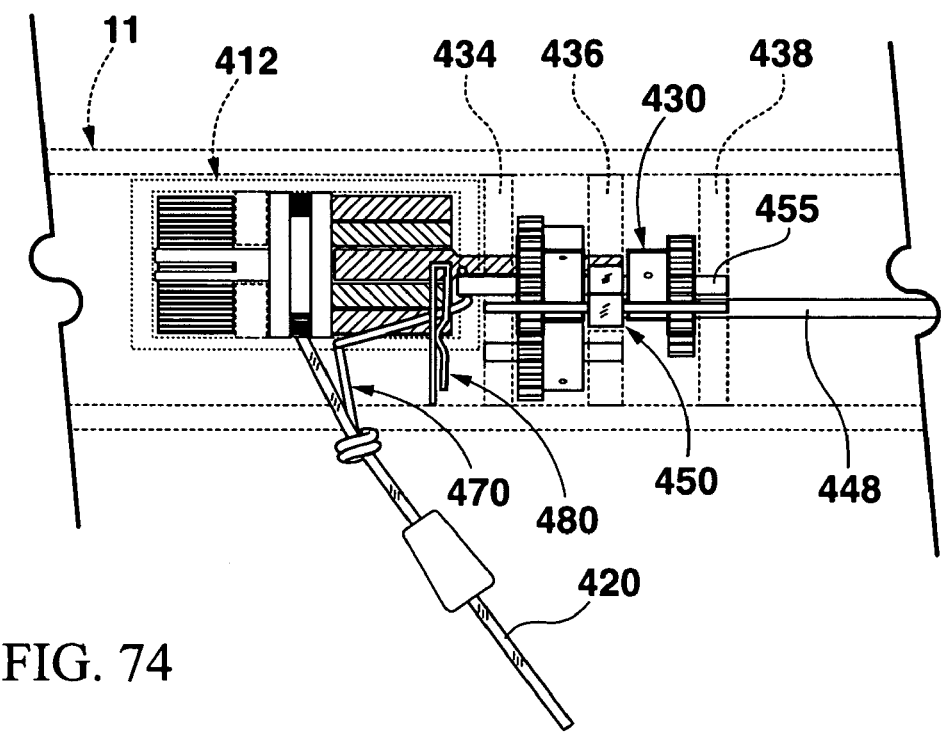
Figure 75:
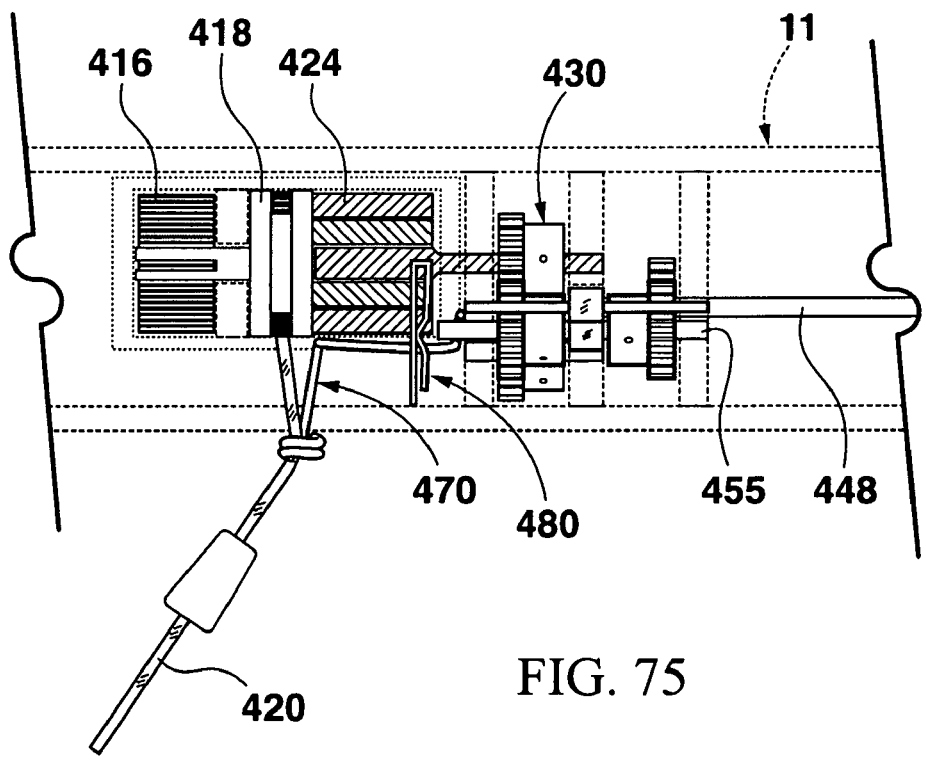

FIGS. 74 and 75 are side elevation views in the manner of FIG. 73, depicting the pull cord in cocked conditions at spaced apart positions, for setting the reversible pull cord mechanism to rotate the system output in opposite directions.

Figure 76:
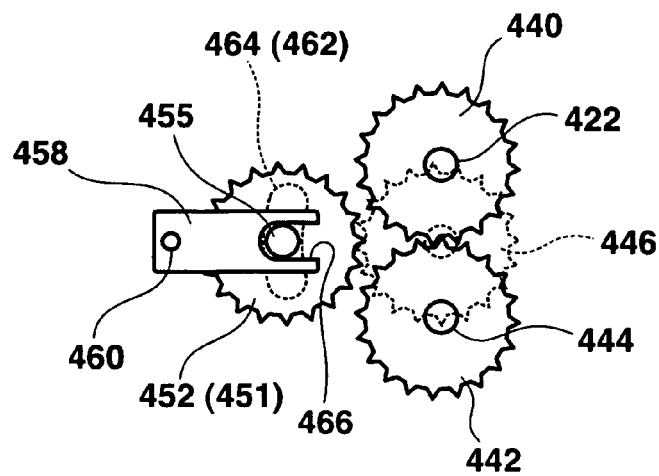

FIG. 76 is a schematic representation of selected gears of a reversible gear transmission system of the reversible pull cord mechanism, which transmission system incorporates a shifting mechanism in accordance with the present invention, and the positioning of the shifting mechanism in a neutral position, for effecting disengagement of the system output from the pull cord-controlled drive system.

Figures 77, 78:
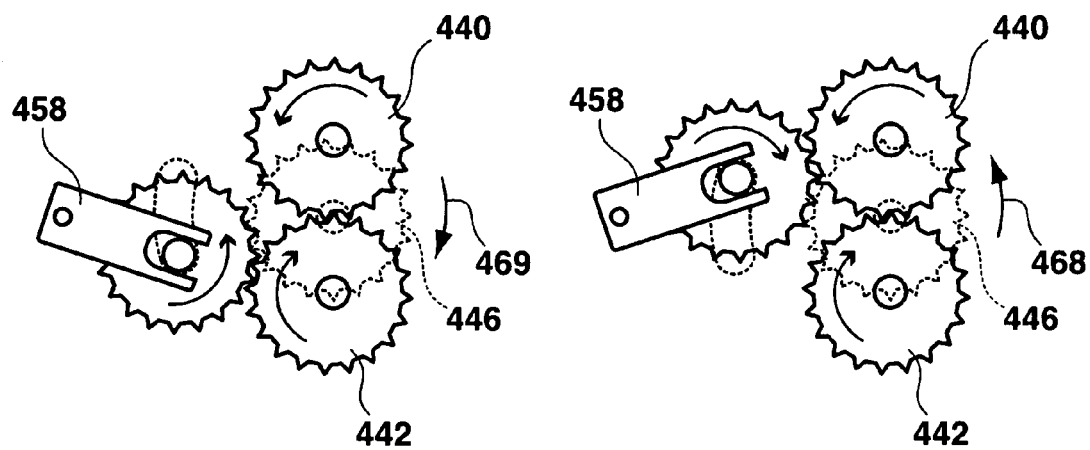

FIGS. 77 and 78 are schematic representations of selected gears of the reversible gear transmission system in accordance with the present invention, and of the positioning of the shifting mechanism to effect rotation of the pull cord-controlled drive system output in opposite directions.

Figure 79:
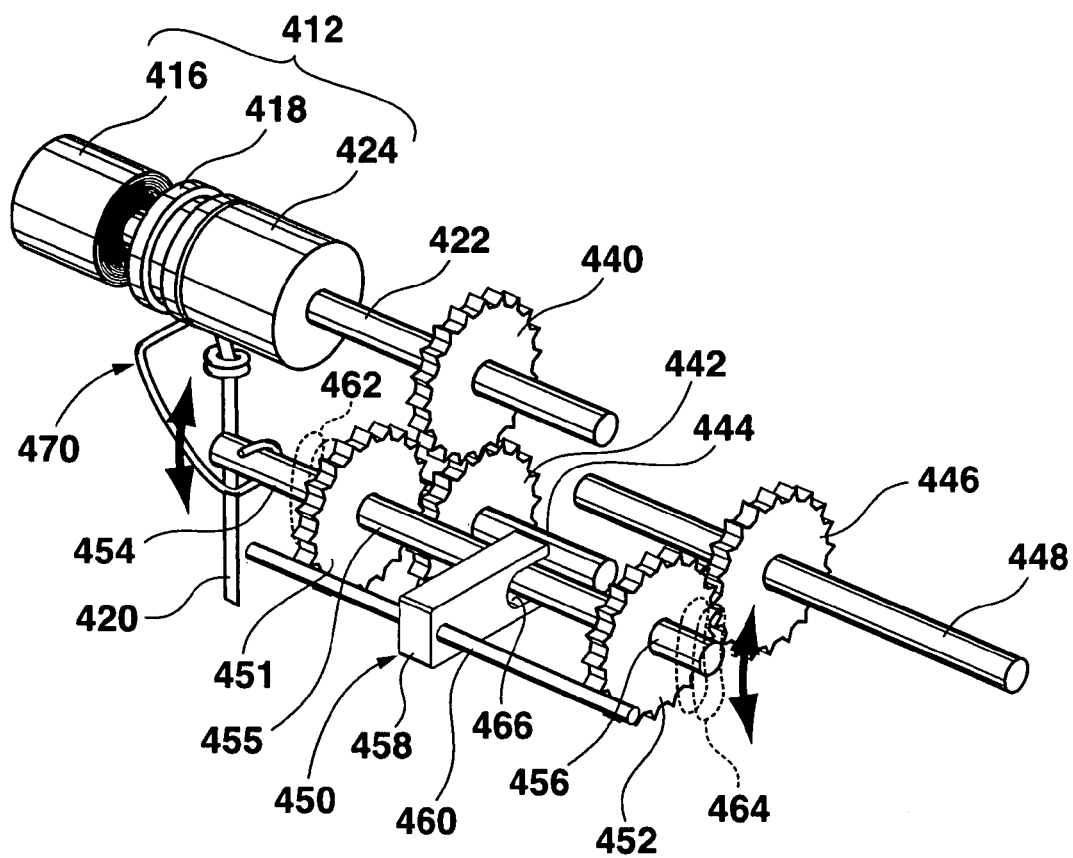

FIG. 79 is a simplified perspective view illustrating the five gears of the reversible gear transmission system and the associated shifting mechanism, with the shifting mechanism in the neutral position.

Figure 80:
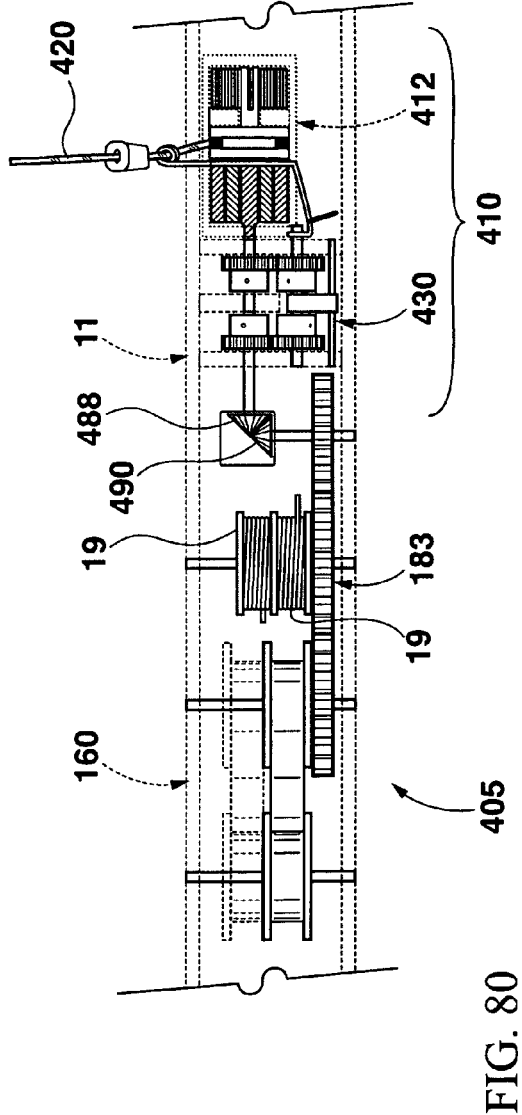

FIG. 80 is a partial bottom view in the manner of FIG. 71, of the head rail of an alternative embodiment, pull cord-controlled drive system in accordance with the present invention.

D. DETAILED DESCRIPTION OF THE PREFERRED EMBODIMENT(S)

1. Examples of Applicable Loads

FIGS. 1 and 2 depict a conventional horizontal slat (Venetian) window cover system 10 in closed (fully lowered) and nearly fully open positions, respectively. The cover system 10 comprises an elongated top housing or support 11 within which a spring drive is mounted. The associated blind or cover 12 comprises horizontal slats 13 and a bottom rail 14 which can be the same as the slats but, preferably, is sufficiently heavy, or weighted to provide stability to the blind 12.

FIGS. 3 and 4 depict a conventional horizontal pleated blind cover system 20 in closed and nearly fully open positions, respectively. The blind cover system 20 comprises housing 11 within which a spring drive unit is mounted. The associated blind or cover 22 typically comprises light weight fabric or other material which is resilient and maintains the shape of horizontal pleats 23. The blind also includes a bottom rail 24 which is sufficiently heavy or weighted, to provide stability to the blind 22.

Regarding slat blind 10, FIGS. 1 and 2, and as is typical of such blinds, spaced cord ladders 17 are suspended from the support 11 and the cross members or rungs 21 of the ladders are routed along and/or attached the underside of the individual slats 13 so that when the ladders are fully extended (lowered) and the blind 12 is thus fully lowered, as depicted in FIG. 1, the weight of each slat is supported by the ladders, with little weight on the lift cords. In contrast, as the blind 12 is raised from the lowermost position, for example to the partially raised/lowered position depicted in FIG. 2, the slats are sequentially "collected" on the bottom rail 14, starting with the bottommost slats, so that an increasing weight is supported on the bottom rail and by the lift cords 16. Thus, and perhaps counter-intuitively, the weight supported by the lift cords is a maximum when the blind is open (raised), and a minimum when the blind is closed (lowered).

As discussed previously, the force requirements of horizontal pleated blinds such as blind 20, FIGS. 3 and 4 are somewhat similar to the slat blind 10 in that the compression of the pleats 23 increasingly opposes compaction/compacting movement of the blind as it is raised, thus increasing the force required to open the blind and to maintain the blind in position. Conversely, the decreasing compression of the material as the blind expands as it is lowered toward the closed position decreases the force requirement.

The following exemplary spring drives and transmissions and other, interconnection components and devices are used in substantially any combination to provide easy-to-use, stable operation of various window coverings including but not limited to those of FIGS. 1–4.

Although the spring drives and transmissions according to the present invention are illustrated here by application to various window cover systems, more generally they are useful wherever spring drives of controlled torque are desirable. The wide applicability of the present invention is illustrated by several exemplary drive units, which include coil springs and flat springs of different cross section configurations, including numerous coved embodiments and numerous perforated embodiments. The drives are used alone, and/or in a combination comprising a plurality of the same drive and/or in combination with one or more of the other drives and/or in combination with one or more of the other components and devices described here. The wide applicability of the present invention is also illustrated by several transmissions of fixed and varying ratio, including gear transmissions and band/cord transmissions. The transmissions are used alone, and/or in a combination comprising a plurality of the same transmissions and/or in combination with one or more of the other transmissions and/or in combination with one or more of the other components and devices described here. The wide applicability of the present invention is further illustrated by several interconnecting devices and components, including bevel and other gear sets, which are used to selectively connect the drives and transmissions to one another and to other components in the associated application, for example, to the shafts and pulleys used in the exemplary window cover systems of FIGS. 1–4.

2. Spring Drives and Transmissions a. Band Shift Transmission

FIGS. 5, 9 and 51 depict direct or varied ratio cord or band shift transmission/cord pulley system/gear units such as 21 and 175. Unit 21 comprises a pair of drums or spools 22, 23, about which is wound a cord or band 24. Unit 175 comprises a pair of conical drums or spools 176—176 about which is wound a cord or band 178. The band 24 is an elongated strip of thin cloth or thin steel having a flat rectangular cross-section. However, other suitable materials can be used, and other cross-section shapes can be used which provide controlled variation in the radii on the drums. For example, an arcuate cross-section including a circular or oval cross-section cord-type band can be used, such as band or cord 178, FIG. 51. Thus, as used here, the term "band" includes, in accordance with the preferred embodiment, a thin, flat rectangular shape, but also includes other suitable cross-section shapes as well, including but not limited to the arcuate embodiment 178.

The cord or band shift transmission (also, simply "band transmission" or "shift transmission") provides a preferably varying drive ratio which is used to increase or diminish the torque or force of the spring drive unit. The band shift transmission applies the varying drive ratio between the spring drive and the lift cord pulleys. The ratio of the band transmission is determined by the radius of the band stored on each drum and the radius of the underlying drum. The radii vary as the band winds and unwinds, varying the associated gear ratio. Thus, increasing (decreasing) the thickness of the band, increases the rate at which the radii increase and decrease, and increases the gear ratio provided by the transmission. By way of example but not limitation, a band thickness of 0.014 inches has given satisfactory results.

The manner of mounting the band can be used to decrease or increase the ratio of the speed of the spring output drum relative to that of the lift cord pulleys as the blind is lowered. Preferably, the band 24 of transmission 21 is mounted so the band radius on output drum 23 increases relative to the band radius on storage drum 22 as the blind is lowered, and decreases as the blind is raised, thus offsetting or decreasing the power with which the spring would otherwise oppose the blind, enhancing or increasing somewhat the lifting power of the spring during raising of the blind, increasing the distance traveled by the blind relative to the spring drive, and increasing the maximum operational length of the blind (the distance between the fully raised and fully lowered positions).

The conical drums or spools 176, 176 of transmission 175, FIG. 51, are reverse oriented and the cord 178 moves longitudinally along the cones as the drums rotate, so that he output drum radius decreases relative to the storage drum radius as the blind is lowered and increases relative to the storage drum radius as the blind is raised, thereby increasing the force during lowering of the blind, decreasing the force during raising of the blind and decreasing blind length. Spiral grooves may be provided along the surface of the cones to control precise positioning of the cord at the desired radii of the cones.

b. Flat Spring Drives

Referring now to FIGS. 6 and 10, conventional "flat" spring drive unit 26 comprises a pair of drums or spools 27, 28, about which is wound a flat metal spring 29 that provides nearly constant torque regardless of its wound position on the drums.

Referring next to FIGS. 7 and 11, varied torque flat spring drive unit 31 comprises a flat metal spring 34 of varying cove, which is wound around drums or spools 32, 33. One drum, such as left drum 32 is a storage drum; the other drum 33 is the output drum. The torque or force of the spring 34 is directly proportional to the degree of cove or transverse curvature of the spring. Thus, for example, and in one preferred embodiment, the cove varies from a relatively small degree of transverse curvature (nearly flat, small cove) at end 36 to a relatively large degree of curvature (large cove) at the opposite end 37. Examples, representative, but by no means limiting, are ⅜ W×¹⁄₁₆ R of curvature or "coveness" at the shallow coved end and ⅜ W×⅜ R highly coved end (W and R are, respectively, width and radius in inches.).

Figure 11A:
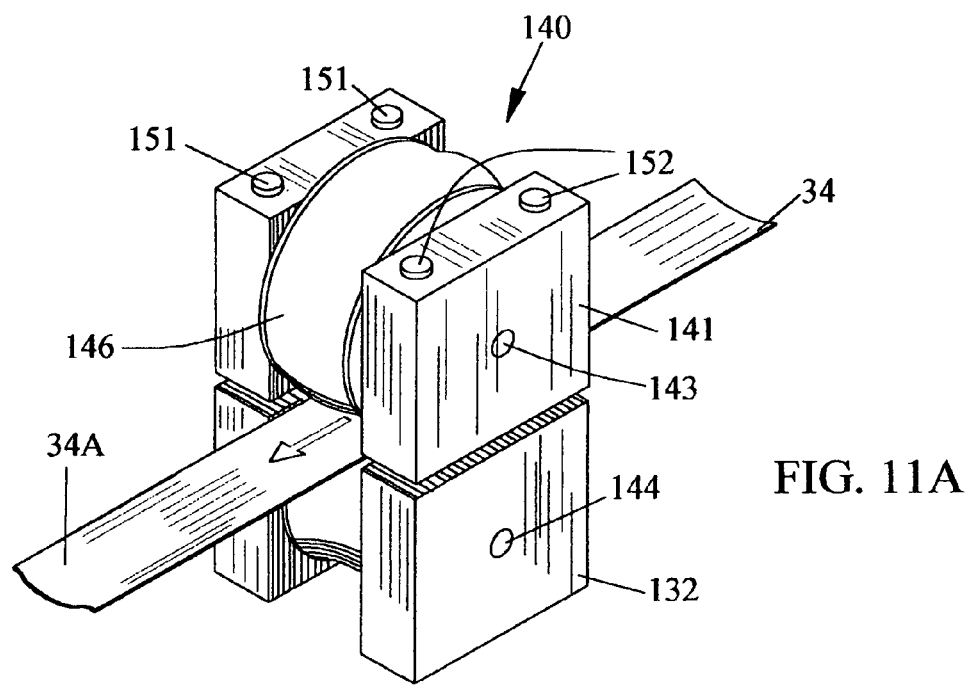

FIGS. 11A, 11B and 11C are, respectively, a perspective view, an end elevation view sans spring, and a schematicized side elevation view of a roll form assembly 140 for forming springs of constant or varied cove. As illustrated, the forming assembly 140 is used to form a non-coved or coved spring 34 into a spring 34A having a cove configuration having at least a section thereof which varies longitudinally, along the length of the spring, and/or transversely, along the width of the spring. In a preferred embodiment, at least a longitudinal section of the spring 34A comprises a reverse curvature or cove, FIGS. 11E and 11F, in which the configuration of one or both edges is different from the cove of the intermediate transverse region of the spring. That is, one or both edges (1) has a smaller curvature than the intermediate region, (2) is flat (no curvature), or (3) has a curvature opposite to that of the intermediate region, All three cases provide decreased torque, torque of smaller magnitude than would be available from a spring having the curvature of the intermediate region edge-to-edge. Specifically, a spring of configuration (1) or (2) provides lesser torque than is provided by a spring having the intermediate curvature edge-to-edge and, opposite curvature, configuration (3), actually provides a net spring torque which is less than the magnitude of the torque provided by the intermediate region.

Illustratively, the forming assembly 140 comprises upper and lower support block assemblies 141 and 142 which include shafts 143 and 144 mounting upper and lower rolls or wheels 146 and 147. The rolls 146 and 147 have oppositely configured, generally flattened "w" shaped, convex and concave surfaces 148 and 149, best depicted in FIG. 11B. The illustrated assemblies 141 and 142 are mounted on shafts 151 and 152 for movement relative to one another. Preferably, a computer-controlled drive system (not shown) moves the upper (and/or the lower) assembly and roll bidirectionally vertically relative to the other assembly to increase and decrease the force applied by the spring, thereby to control the configuration of the spring cove as the spring is passed through the forming assembly 140, as shown in FIG. 11A. The drive may be, for example, a screw drive which is connected to and moves the assemblies 141 and 142 and rolls in precisely controlled increments relative to one another. Many other drive arrangements are possible. For example, the shafts 151 and 152 may be screw drives which are mounted within threaded bores in the assemblies 141 and 142 and by rotation move the assemblies 141 and 142 relative to one another.

As alluded to above, a given spring 34 can have a constant cove or flat (non-coved) configuration along its length, can have a cove that varies continuously along its length, or can have sections selected from flat (non-coved), constant cove, and varied cove. The constant and varied cove sections can be selected from numerous configurations, including a single cove configuration 34D, FIG. 11D; and a double or reverse cove configuration 34E and 34F, FIGS. 11E and 11F. This allows the torque of the spring and of the resulting spring drive to be tailored to the supported weight of the associated blind at different positions between and including the fully closed and fully opened positions. For example, the coved spring configuration 34D may be used to provide a high (maximum value) torque for a given cove curvature for supporting a fully raised (open) blind; whereas configuration 34E, which has a similar central curvature but relatively shallow reverse-curved edge sections provides lower (intermediate value) torque than cove 34D, corresponding to a blind position intermediate the fully raised and lowered positions; and configuration 34F comprising similar central curvature but relatively deeply-curved edge sections effects even lower (minimum value) net torque, corresponding to the decreased supported weight at or near the lowered (closed) window cover position. Please note, typically the curvature in the drawings is exaggerated, to aid understanding.

Referring next to FIGS. 8 and 12, varied torque flat spring drive 41 comprises a perforated spring 44 which is wound around wheels or spools 32, 33. Again drum 32 is the storage drum and drum 33 is the output drum. The torque or force of the spring 44 is directly proportional to the amount of spring material at a given point or region. The number, location, size and/or shape of the perforations or holes can be tailored to provide many different force curves, including constantly varying (decreasing or increasing), intermittent or discrete variations such as sawtooth or spiked force patterns, cyclical or sinusoidal patterns, etc. Thus, for example, and in one preferred embodiment, a line of spaced holes is formed generally along the center line of the spring 44, increasing in diameter from holes 47 of relatively small diameter near end 46 to relatively large diameter holes 48 near opposite end 49. As a result, the torque or force effected by the spring 44 decreases from a relatively large magnitude at end 46 to a relatively small magnitude at end 49, thereby decreasing the transverse cross section area and the associated torque of the spring. The hole size and spacing is selected to provide a drive force which varies in direct proportion to the lift cord-supported weight or the compression of the blind or cover 12, 22. That is, the force decreases as the spring is unwound toward the blind-fully-down position shown in FIGS. 1 and 3 and, conversely, increases as the spring is wound or rewound as shown in FIGS. 2 and 4 toward the blind-fully-up position. (This is in direct contrast to the operation of coil springs, whose spring force varies inversely to the variation of the cord-supported weight of the blind, and constant torque flat springs, whose force is approximately constant as the spring unwinds and winds.)

In general, the spring drive units 31 and 41 are configured so that contrary to the usual coil spring or flat spring operating characteristics, (1) as the spring unwinds or winds as the blind is lowered or raised, the spring torque or force decreases or increases in direct proportion to, and remains closely matched to, the supported weight or compressive force of the blind; (2) from a fully or partially open position, the blind is easily lowered to any selected position by a slight downward pull on the blind; (3) from a fully or partially closed position, a slight upward push by hand is sufficient to raise the blind to any selected position; and (4) the stability of the blind is enhanced in that the tendency of the blind to move from the selected positions is suppressed.

c. Coil Spring Drive 15 (FIGS. 5C and 10C)

Referring to FIGS. 5C and 10C, there is shown an exemplary embodiment 15 of a coil spring drive, and an application thereof to a window cover system. The illustrated spring drive unit 15 includes transverse frame members 341/41C, 342/42C, 343/43C, 344/44C and 346/46C. Cord pulleys 18C are mounted on the shaft 30/30C adjacent supports 341 and 346/46C. Spaced blind lift cords 16 are a shaft 30/30C comprising middle shaft or section 35/31C and left and right end shafts or sections 332/32C and 333/33C. Adjacent ends 334/34C, 336/36C of the middle and left shafts and adjacent ends 335/35C, 337/37C of the middle and right shafts have reduced radius or size and are joined by collars 338/38C and 339/39C. The separate shaft sections facilitate removal of the shaft 30/30C and installation and replacement of the drive components mounted on the shaft. The shaft 30/30C is rotatably journaled in and attached to bottom rail 14 (blind 10, FIG. 1), or to bottom rail 24 (blind 20, FIG. 3), or to other blinds/covers and are wound about the pulleys 18 for raising and lowering the attached bottom slat or rail and thus the blind 10 or 20.

d. Transmission 70 (Coil, FIGS. 5C, 10C; Flat, FIG. 13)

(1). Coil Spring Applications

Referring again to FIG. 5C, coil spring 40 is positioned between supports 342/42C and 343/43C, and is positioned around middle shaft section 331 (that is, the shaft 331/35/31C is inside the spring coils), for independent rotation around the shaft 30/30C. A first end of the coil spring 40 is attached by fastener 348/48C to support 342/42C so that the first end (illustratively, the left end) does not rotate. The opposite (right) end of the coil spring is attached by fastener 349/49C to gear sleeve 352/52C of transmission 70/50C. As described in detail below, that sleeve is connected to transmission idler gear 71/51C, so that the right end of the spring 40 rotates with the idler gear 71/51C of the transmission 70/50C and vice versa. The transmission 70/50C is designed to offset the normal operating characteristics of the coil spring 40. The stored energy of the spring increases as the spring is wound when the blind 10 or 20 is lowered and thus the increasing torque of the spring increasingly opposes lowering the blind. In short, the spring torque increases as the blind is lowered, while the lift cord-supported slat weight or the pleat compression is decreasing. Conversely, when the blind is raised, under the impetus or assistance of the spring, the stored spring energy and associated spring torque decrease, while the supported slat weight or the pleat compression of the raising blind is increasing.

Referring to FIGS. 5C and 6C, in one illustrated exemplary embodiment, the transmission 70/50C comprises an array of gears 71/51C, 73/53C, 75/55C and 77/57C, in which idler gears 71/51C and 73/53C are intermeshed and idler gear 75/55C and power gear 77/57C are intermeshed. Idler gear 71/51C and integral sleeve or collar 352/52C are mounted on and free to rotate about shaft section 335/35C. Gears 73/53C and 75/55C are joined, forming a gear set. This exemplary gear set and integral collar 356/56C are mounted on shaft 354/54C, which is mounted to and between supports 343/43C and 344/44C. The gear set and the collar rotate around shaft 354/54C and/or the shaft 354/54C itself is mounted for rotation. Power gear 77/57C and integral collar 358/58C are mounted on and fastened to shaft section 335/35C. Power gear 77 meshes with gear 75 of the two-gear set, the other gear 73 of which meshes with idler gear 71.

As mentioned, shaft end section 335/35C is part of the interconnected shafts (or shaft sections) 331/31C, 332/32C, 333/33C. Thus, at one end of the transmission gear train, power gear 77/57C is joined to and rotates at the same rate as the shaft 30/30C. At the opposite end of the transmission gear train, idler gear 71/51C rotates freely about the shaft 30/30C and is fastened to the free spring end by fastener 349/49C, so that the idler gear 71/51C and coil spring 40 rotate at the same rate. As the result of this arrangement, the pulleys 18 and lift cords 16 rotate at one rate, the same rate as gear 77/57C and shaft 30/30C, and the coil spring 40 rotates at another rate, the same rate as gear 71/51C. The transmission gear ratio is selected so that the idler gear 71/51C and coil spring 40 preferably rotate at a slower rate than the power gear 77/57C and the lift cord pulleys 18. For example in one application, the fixed drive ratio of transmission 70/50C is 1:3 to 1:8 so that gear 77/57C and pulleys 18 rotate 3–8 revolutions for each revolution of the gear 71/51C and coil spring 40.

The above transmission gear ratios and the different rotation rates diminish proportionately the wind up of the spring 40 and the rate at which the torque exerted by the spring 40 increases as it is wound and the blind is lowered. This permits the use of a powerful spring to hold a large, heavy blind in position at the uppermost position, where the supported weight (or the pleat compression force) is the greatest, and diminishes the inherent rate of increase of the torque exerted by the spring as the blind is moved toward the lowermost, closed condition where the supported weight (the pleat compression force) is a minimum. Also, and referring to FIG. 10C, as the spring 40 winds up, it buckles in serpentine fashion along the shaft 35/31C, and contacts the shaft at a multiplicity of locations 45/40C (only one such location 45/40 is shown), exerting pressure on the shaft and preventing the shaft from turning on its own, thereby providing braking action against shaft rotation. The braking helps keep the shaft and pull cord from moving when at rest but does not impede raising and lowering movement. Furthermore, the transmission 70/50C has inherent friction which acts as a brake and helps retain the blind at the selected position(s) between and including fully opened and fully closed.

As a result of the above factors, the spring does not overpower the weight of the blind and does not uncontrollably raise the blind. The transmission gear ratio also increases the length of travel available to the blind for a given spring, permitting a longer blind for a given spring or a given spring travel. The combination of the coil spring, transmission fixed gear ratio, gear friction and the spring buckling braking action allows the spring drive unit 15 to hold the blind 10, 20 in position at even the "heaviest" (uppermost) blind positions, prevents the spring from overpowering the blind, especially when the spring is wound (at the lower blind positions), and allows the blind to be pulled downward to any selected position by gently pulling the blind to that position and, conversely, to be pushed upward to any selected position by gently pushing upward to that position. Little force is required to move the blind up and down, the blind stops accurately at any selected position between and including the fully opened and fully closed positions, and the blind remains at the selected positions.

As an example of the improved operation resulting from the use of a spring drive 15, when a standard coil spring was used in a 3'×4' DUETTE hollow pleat blind, near the end of the 4' travel of the blind, the increasing spring torque became too great for stable operation and overpowered the weight of the blind, retracting the blind. The use of spring unit 15 comprising the same standard coil spring as before and the gear transmission, in a 4'×6' DUETTE hollow pleat blind provided smooth stable operation in which the blind stayed in position, even in the 6' fully extended, fully closed position. The 6' travel effected sufficient buckling to provide braking action which assisted in keeping the blind at rest. In contrast, the 4' travel of the smaller 3'×4' blind did not cause enough buckling to noticeably effect buckling braking.

(2). Flat Spring Applications

The spring drive unit such as 26, 31, 41 is operatively connected by bevel gear set 60 to shaft 50, FIG. 13, and transmission 70. The bevel gear sets permit compact arrangements for transferring power/rotation when interconnected components such as the pulley(s) and the spring drive(s) are mounted on shafts which are non-parallel. As described in detail below, the shaft 50 is connected to transmission idler gear 71, so that the right side, output drum rotates with the idler gear 71 of the transmission 70 and vice versa. The transmission 70 is designed to increase or reduce the torque of the spring drive unit, as desired.

In one illustrated exemplary embodiment, the transmission 70 comprises an array of gears 71, 73, 75 and 77, in which idler gears 71 and 73 are intermeshed and idler gear 75 and power gear 77 are intermeshed. Idler gear 71 and an integral sleeve or collar are mounted on and rotate with shaft section 53 and vice versa. Gears 73 and 75 are joined, forming a gear set. This gear set and an integral collar are mounted on and fastened to shaft 74, which is mounted to and between supports 84 and 86. Power gear 77 and an integral collar are mounted on and fastened to shaft section 53. Power gear 77 meshes with gear 75 of the two-gear set, the other gear 73 of which meshes with idler gear 71.

As mentioned, shaft end section 53 is part of the interconnected shafts (or shaft sections). Thus, at one end of the transmission gear train, power gear 77 is joined to and rotates at the same rate as the shaft 53 and lift cord pulleys 19—19. At the opposite end of the transmission gear train, idler gear 71 and interconnected bevel gear 62 rotate freely about the shaft 50 and are connected via bevel gear 61 to the right side drum 33 of the spring drive. As the result of this arrangement, the pulleys 19—19 and the lift cords 16, 17 rotate at one rate, the same rate as gear 77; and shaft 50, the right side output drum 33, the idler gear 71 and the bevel gears 60 rotate at a second rate.

Preferably the transmission gear ratio is selected so that the idler gear 71 and spring drive 26, 31, 41 rotate at a slower rate than the power gear 77, the pulleys 19—19, and the lift cords 16, 17. For example in one application, the fixed drive ratio of the transmission 70 is 1:3 to 1:8 so that gear 77 and lift cord pulleys 19—19 rotate 3–8 revolutions for each revolution of the right side output drum 33 of the spring drive. Obviously, however, in applications where such is advantageous, the drive ratio of the transmission can be selected to rotate the spring drive faster than the lift cord pulleys.

The above transmission gear ratios and the different rotation rates diminish proportionately the torque exerted by the spring 29, 34, 44 as it is wound in one direction and the blind is lowered. This permits the use of a powerful spring to hold a large, heavy blind in position at the uppermost position, where the supported weight and the pleat compression is the greatest, and diminishes the force otherwise exerted by the spring at the lowermost, closed condition where the supported weight and the pleat compression is a minimum. As a result, a powerful spring does not overpower the weight of the blind and does not uncontrollably raise the blind. The transmission gear ratio also increases the length of travel available to the blind for a given spring, permitting a longer blind for a given spring or a given spring travel. Furthermore, the transmission 70 has inherent friction which acts as a brake and retains the blind at selected positions between and including fully open and fully closed. The combination of the preferably varying torque/force provided by the flat spring drive directly proportional to the supported weight/compression of the blind; the transmission gear ratio; and the gear friction allows the spring drive unit to hold the blind 10, 20 in position at even the "heaviest" (uppermost) blind positions, and allows the blind to be pulled downward to any selected position by gently pulling the blind to that position and, conversely, to be pushed upward to any selected position by gently pushing upward to that position. Little force is required to move the blind up and down, the blind stops accurately at any selected position between and including the fully open and fully closed positions, and the blind remains at the selected positions.

3. Coil and Flat Spring Drive Window Covers a. Spring Drive and Transmission (FIG. 13)

Referring further to FIG. 13, there is shown spring drive unit 15 which embodies the present invention. The spring drive unit is mounted inside housing 11 and includes shaft 50 comprising left shaft or section 51 and right shaft or section 52. Adjacent ends 53, 54 of the shafts 51, 52 have reduced radius or size and are joined by collar 56. The separate shaft sections facilitate the removal of shaft 50 and the installation and replacement of the drive components mounted on the shaft. The shaft 50 is rotatably journaled within transverse walls or support members 57, 58. Two lift cord pulleys 19 and 19 are mounted on the shaft 50 adjacent the transverse walls 57 and 58. The spaced lift cords 16 and 17 are attached to bottom rail 14 (FIG. 1), 24 (FIG. 3) and are wound about the pulleys 19—19 for raising and lowering the bottom rail and thus the blind 10 or 20.

Referring further to FIG. 13, flat spring drive 26, 31 or 41 is mounted on transverse shafts 81, 82. The outer end of each shaft is mounted to the housing 11 and the opposite, inner end is mounted to longitudinal wall or support member 83. Of these spring drives, unit 26 is a conventional constant force or torque drive. However, spring drives 31 and 41 are unique variable force or torque units in accordance with the present invention, which preferably are specially adapted to provide a drive force which varies in direct proportion to the lift cord-supported blind weight or the pleat compressive force. That is, the spring force changes, preferably decreases, as the spring is unwound and the blind is extended toward the fully-down position and, conversely, increases as the spring is wound and the blind is retracted toward the fully-up position. (This is in direct contrast to the operation of coil springs, in which the spring force varies inversely to the variation of the cord-supported weight or compression of the blind.)

The output of the spring drive 26, 31, 41 is connected via power transfer bevel gear set 60 and transmission 70 to the cord pulleys 19—19. One gear 61 of bevel gear set 60 is mounted on drum mounting shaft 82 and meshes with the second gear 62, which is mounted on section 53 of shaft 50. The second bevel gear 62 is connected to the transmission 70, which is mounted on shaft section 53. The transmission varies the rate at which the cord pulleys 19 and 19 rotate relative to the rotating drum of the spring drive.

Illustratively, in one application, the transmission gear ratio is 3:1 to 8:1 so that lift cord pulleys 19—19 rotate 3–8 revolutions for each revolution of the rotating spring drive spool.

As alluded to, preferably, a varied force spring drive unit is used, one which exerts diminished force as the blind is lowered, and preferably one which tracks the decreasing supported weight or compression force of the blind 10, 20 as the blind is lowered. The above transmission gear ratios and the different pulley and spring rotation rates diminish proportionately the force exerted by the spring as it is wound and the blind is lowered. This permits the use of a more powerful spring to hold a large, heavy blind in position at the uppermost position, where the cord-supported weight is the greatest, and proportionately diminishes the force exerted by the spring at the lowermost, closed condition when the supported weight is a minimum, so that the powerful spring does not overpower the weight of the blind and does not uncontrollably raise the blind. The gear ratio also increases the length of travel available to the blind for a given spring, permitting a longer blind for a given spring or a given spring travel. (For example, for the described 3:1 ratio, the possible blind length is 3 times the maximum spring rotation.) Furthermore, the transmission 70 and the bevel gear set 60 have inherent friction which individually and collectively act as a brake and retain the blind at any selected position between and including fully open and fully closed. The combination of the preferably varied force spring drive, the transmission gear ratio and the gear friction allow the spring to hold the blind in position at even the "heaviest" (uppermost) blind positions, and allow the blind to be pulled downward to any selected position by gently pulling the blind to that position and, conversely, to be pushed upward to any selected position by gently pushing upward to that position. Little force is required to move the blind up and down, the blind stops accurately at any selected position between and including the fully open and fully closed positions, and the blind remains at the selected positions.

b. Spring Drive and Bevel Gears (FIG. 14)

Figure 14:
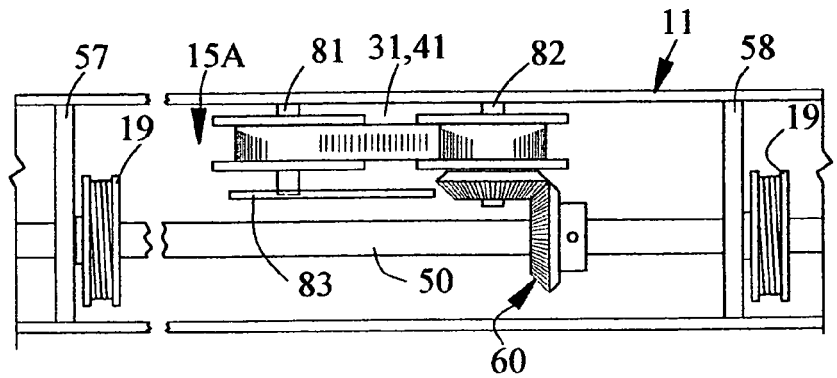

FIG. 14 depicts a spring drive unit 15A which is essentially unit 15, FIG. 13 without the transmission 70. Also, the shaft 50 depicted in the figure is of one-piece construction. A constant or varied force spring drive 26, 31, 41 is mounted on the transverse shafts 81 and 82, with shaft 82 also mounting bevel gear 61. Mating bevel gear 62 is mounted on the shaft 50 and, as a result, the shaft 82 and associated rotating spring drum are connected by the bevel gear set 60 directly to shaft 50 and the lift cord pulleys 19—19, and rotate at the same rate as the pulleys. Although a constant force spring drive can be used, a varied force drive is much preferred, to tailor the spring force to the blind weight or compression, as described above relative to FIG. 13. In addition, the bevel gear set 60 provides friction which assists the constant or the varied force spring drive in maintaining the blind at the selected positions. The bevel gear set 60 can be a 1:1 direct drive or a non-direct drive.

FIGS. 14A and 14B depict other applications of bevel gear sets 60 for transferring power/rotation when interconnected window lift components such as the pulley(s) and spring drive(s) are mounted on shafts which are non-parallel. FIG. 14A illustrates a spring drive such as 31 or 41 positioned intermediate spaced-apart end pulleys 19—19. The shafts at the opposite ends of the gear train are oriented 90° to the associated pulley shafts and are connected at each end to the associated pulley shaft by a bevel gear set 60 located in housing 60A. Illustratively, the pulley shafts comprise sections which are interconnected by removable connectors 153, thereby facilitating removal of the pulley(s) or the spring drive unit(s) without removing the other components.

FIG. 14B illustrates a spring drive such as 31A or 41A located on one side or end of the associated blind, and two spaced pulleys 19—19 mounted on the opposite side or end. The gear train shaft is oriented 90° to the associated pulley shaft and is connected to that pulley shaft by bevel gear set 60. The illustrated spring drive 31A, 41A comprises a pair of springs mounted in parallel on integral or joined storage spools and output spools, thereby providing increased torque.

FIG. 14C depicts the spring of drive 31A, 41A substantially fully wound on the storage (left) spool when the associated blind is at its topmost, fully raised (open) position, whereas FIG. 14D depicts the spring substantially fully wound on the output (right) spool when the associated blind is fully lowered (closed).

c. Spring Drive and Transfer Gears (FIG. 15)

FIG. 15 depicts a spring drive unit 15B which is yet another alternative to the drive unit 15, FIG. 13. A constant or a varied force spring drive 26, 31, 41 is mounted on shafts 81, 82, which extend the entire width of the housing 11 and are supported by the longitudinal (front and rear) housing walls. Cord pulley set 18 comprises two pulleys 19—19 mounted adjacent the spring drive unit on shaft 88. The spring drive unit is directly connected to the cord pulley unit 18 by a power transfer spur gear set 65 comprising gear 66 which is mounted on spring drive drum shaft 82 and meshes with gear 67, which is mounted on cord pulley shaft 88. When a constant force spring drive is used, obviously the spring force does not track the blind weight or compression. However, the power transfer gear set (1) permits tailoring the spring drive unit to the blind operation in that the gear set 65 can be (a) a 1:1 direct drive so that the unit transmits power directly with only frictional loss, or (b) can have a selected non-direct gear ratio for varying the spring force as described above, and thus assisting in tailoring the spring force to the varying blind weight or compression, and (2) has inherent friction which assists retaining the blind at the selected positions. When a varied force spring drive unit is used, (1) preferably the varied force is tailored to the variation in the supported weight of the blind, (2) the power transfer gear set friction assists in retaining the blind at the selected positions, and (3) the power transfer gear set may be direct drive or have a gear ratio which assists in tailoring the spring force to the varied supported weight or compression characteristics of the blind.

FIG. 15A depicts a spring drive unit which is similar to unit 15B, FIG. 15, and includes a recoil roll or wheel or simply recoiler 154, FIG. 33A, mounted adjacent and in contact with the output spool of the spring drive 31, 41, for facilitating recoil of the spring when needed, preventing "explosion" of the spring, and providing braking action for supplementing the inertia of the unit to maintain the spring and associated window cover in the desired position. It is thought that springs having holes, slots, etc. are more likely to "explode" that are non-perforated springs and thus the recoiler is especially useful with perforated springs.

d. Spring Drive and Transfer Gears (FIG. 16)

Figure 16:
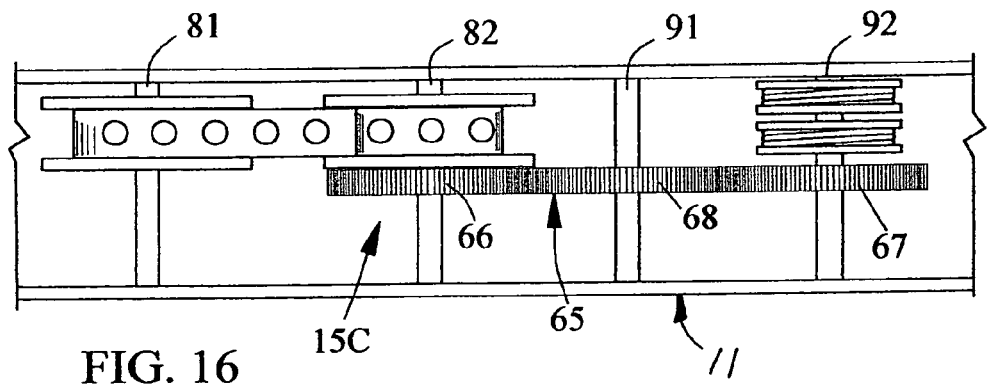

FIG. 16 depicts an alternative embodiment 15C to the spring drive unit 15B, FIG. 15. The compact unit 15C comprises the spring drive 26, 31, 41; the cord pulley unit, and power transfer spur gear set 65. The difference is that the housing 11 contains four shafts 81, 82, 91 and 92, and the power transfer gear set 65 comprises three gears 66, 67, 68. Gear 66 is mounted on shaft 82 as in FIG. 15, and gear 67 is mounted on shaft 92 with pulley set 18. However, middle gear 68 is mounted on shaft 91. The three gear unit 65 operates differently from the two gear unit in that it is a power transfer and/or ratio unit. Otherwise, the unit 15C operates the same as unit 15B, FIG. 15, and the components function as described above with regard to unit 15B.

e. Spring Drive. Band Shift Transmission and Transfer Gears (Coil. FIG. 7C: Flat. FIG. 17)

(1). Coil Spring Applications

FIG. 7C depicts an alternative spring coil drive unit 65C which comprises a coil drive spring 40, fixed ratio gear sets or transmissions 60 and 65, and a continuously varying, varied ratio, cord or band shift transmission 80C. Preferably transmissions 60 and 65 are direct drive but can be other ratios as well. Illustratively, the support or housing 11 includes transverse supports including support, and transverse shafts 43C, 44C and 46C. The spring 40 is mounted along and freely rotatable around a longitudinal shaft 66C, which is journal mounted to spaced transverse supports (only one of these two supports is shown). One end of coil spring 40 is mounted to support by fastener 76C, and the opposite end of the spring is attached by fastener 77C to the collar 78C of gear 61 of bevel gear set 60. Mating bevel gear 62 is mounted on transverse shaft 43C, interconnected to gear 66 of preferably direct drive transmission 65. Adjacent gear 67 of the transmission 65 is mounted on transverse shaft 44C and meshes with gear 66.

Referring also to FIG. 8C, band shift transmission 80C comprises output drum 81C (or spool) and storage drum 82C (or spool) about which a band 83C is wrapped. Preferably, the cord or band 83C is an elongated strip of thin cloth or thin steel having a flat rectangular cross-section. However, other suitable materials can be used, and other cross-section shapes can be used which provide controlled variation in the radii on the drums. Hereafter the term "band" will be used in accordance with the preferred embodiment of a thin, flat rectangular, but with the understanding that "bands" of other suitable cross-section shape can be used as well. The band shift transmission (hereafter band transmission) provides a varying drive ratio which is used to increase or diminish the torque or force of the spring drive unit. The cord or band transmission applies the varying drive ratio between the spring drive and the lift cord pulleys. The ratio of the band transmission is determined by the radius of the band stored on each drum. The radii vary as the band winds and unwinds, varying the associated gear ratio. Thus, increasing (decreasing) the thickness of the band, increases the rate at which the radii increase and decrease, and increases the gear ratio provided by the transmission. By way of example but not limitation, a band thickness of 0.014 inches has given satisfactory results. The manner of mounting the band can be used to decrease or increase the ratio of the speed of the spring output drum relative to that of the lift cord pulleys as the blind is lowered.

Referring further to FIG. 8C, output drum 81C is mounted on the shaft 44C with gear 72C and take-up drum 82C is mounted on transverse shaft 46C along with cord pulley unit 73C. This is a conventional pulley unit, about whose pulley(s) 74C are wound the spaced lift cords 16 which support the blind, such as blind 10, 20. Structurally, the pulley unit 73C differs from pulleys 18 in that pulleys 74C and 75C are mounted together on a transverse shaft near the right end of the blind, necessitating that one of the cords be routed to the left side of the blind. The pulleys 74C operate the same as pulleys 18.

As shown in FIG. 7C, the direct drive transmission 65 and the pulley unit 73C are mounted parallel to the band shift transmission 80C, reducing the overall length of the spring drive unit 65C. The ratio of the band shift transmission is determined by the radius of the band stored on each drum. The radii vary as the spring 40 winds and unwinds, continuously varying the associated gear ratio. As mentioned, the band mounting can be used to decrease or increase the ratio of the winding or rotational velocity of the spring relative to that of the pulleys as the blind is lowered. Preferably, the band 83C is mounted so the band radius on output drum 82C increases (alternatively, decreases) relative to the band radius on storage drum 81C as the blind is lowered (raised) and the cord-supported weight decreases (increases), thus offsetting somewhat or decreasing the increasing power with which the spring opposes the blind during lowering operation, and offsetting or decreasing somewhat the decreasing lifting power of the spring during raising of the blind, and increasing the distance traveled by the blind relative to the spring drive and thereby increasing the maximum operational length of the blind (the distance between the fully raised and fully lowered positions.

In short, the continuously varying ratio, band shift transmission 80C continuously alters (preferably decreases) the rate at which the spring winds up and the torque increases as the blind is extended lower and alters (preferably increases) the operating length of the blind.

As mentioned, the operationally fixed ratios of bevel gear set 60 and gear set 65 can be direct drive, that is 1:1. Alternatively, the ratios can be smaller or greater than 1:1, to alter the overall ratio of the drive unit such as 65C. The ratios also alter the maximum possible length of the blind and the distance between the open and closed positions of the blind for a given rotational distance traveled by the coil spring. For example, the ratio of at least one of these gear sets can be smaller than 1:1, as described for transmission 50C, FIG. 5, and with similar results. Where the ratios of both bevel gear set 60 and gear set 65 are approximately 1:1, stopping the blind at any of selected positions and keeping the blind at the selected positions are effected by both (1) the continuously varying ratio of the band unit 83C which decreases the change in power of the coil spring as it winds and unwinds, (2) the friction of the bevel gear set 60 and the gear transmissions 50C and 70, and (3) the "buckling" braking action of the spring 66C.

(2). Flat Spring Applications

FIG. 17 depicts a compact spring drive unit 15D which is yet another alternative to the drive unit 15, FIG. 13. The housing 11 contains transverse shafts 81, 82, 91 and 92. Spring drive 26, 31 or 41 is mounted on shafts 81 and 82 and is connected to cord pulley unit 18 by a power transfer gear unit 65 and a band shift transmission or gear unit 21. The power transfer gear unit 65 comprises gear 66 which is mounted on drum shaft 82 and meshes with gear 67, which is mounted on shaft 91. One drum 22 of the band shift transmission 21 is also mounted on the shaft 91 and the second drum 23 is mounted on shaft 92 along with the cord pulley unit 18, which comprises two cord pulleys 19—19 for the lift cords 16 and 17.

When a constant force flat spring drive 26 is used, the unit 15D has several features which improve the operation of the blind despite the limitation of constant spring drive force: (1) the band shift transmission 21 varies the spring force, preferably directly proportional to the varying weight or compression of the blind, (2) the power transfer gear unit 65 may be direct drive or may have a selected gear ratio for additionally varying the spring force as described above, and (3) the power transfer gear unit also provides friction which assists in retaining the blind at the selected positions. Alternatively, when a varied force flat spring drive unit is used, (1) the varied force of the spring drive preferably is directly proportional to the varying weight or compression of the blind, (2) the band transmission provides additional variation of the spring force, preferably directly proportional to the weight or compression of the blind, (3) the power transfer gear unit may be direct drive or may have a selected gear ratio for additionally varying the spring force and (4) the power transfer gear unit also provides friction which assists retaining the blind at the selected positions.

f. Spring Drive, Transmission and Transfer Gears (FIG. 18)

FIG. 18 depicts a compact spring drive unit 1 SE which is another embodiment of the present invention. The unit 15E comprises a flat spring drive 26, 31 or 41 which is operatively connected to a two-gear power transfer unit 65, which in turn transmits force via transmission 70 to the pulley unit 18, and vice versa. Specifically, the spring drive is mounted on transverse shafts 81, 82; one gear 66 of the set 65 is mounted on the shaft 82 with the associated drum and meshes with the gear 67, which is mounted on shaft 92. Transmission 70 is also mounted on the shaft 92 in the manner described relative to the mounting on shaft 50, FIG. 13, along with the pulley unit 18. As a result, the power transfer gear unit 65 and the transmission 70 transfer force from the spring drive to the pulley unit, and vice versa.

Preferably, a varied force spring drive unit is used, one which exerts diminished force as the blind is lowered, and preferably one which tracks the decreasing supported weight or compression force of the blind 10, 20 as the blind is lowered. The above transmission gear ratios and the different pulley and spring rotation rates diminish proportionately the force exerted by the spring as it is wound and the blind is lowered. The gear ratio also increases the length of travel available to the blind for a given spring, permitting a longer blind for a given spring or a given spring travel. As discussed previously, the power transfer gear unit may be direct drive or may have a selected gear ratio for additionally varying the spring force. Furthermore, the transmission and the power transfer gear set have inherent friction which individually and collectively act as a brake and retain the blind at any selected position between and including fully open and fully closed.

g. Spring Drive. Gear Transmission, Band Shift Transmission and Transfer Gears (FIG. 19)

(1) Coil Spring Applications

FIG. 9C depicts an alternative window spring coil drive unit 95C which adds the transmission 50C to drive unit 65C. That is, coil spring drive unit 95C includes the drive components and functions of the drive unit 65C and the transmission 50C provides an additional fixed gear ratio for use in determining the overall ratio of the drive unit and for providing an additional frictional component which increases the stability of the blind at the selected rest positions.

The various components—gear transmission, shifting flat band transmission, gear set 60 and gear set 65—can be used alone or in essentially any combination to accommodate the weight and operational length of a given bind or cover.

(2). Flat Spring Applications

FIG. 19 depicts an embodiment 15F of the spring drive unit which includes a chain drive for the purpose of transferring power and/or ratio. Illustratively, spring drive 26, 31 or 41 is mounted on shafts 81 and 82; band shift transmission 21 is mounted on shafts 82 and 91; chain drive 94 is mounted on shafts 91 and 92; two pulley units 18, 18 are mounted on shaft 92 for the purpose of powering the cord pulleys; and transmission 70 is mounted on shaft 91 between unit 21 and chain drive 94. The unit 15F features the combination of varied drive force from the spring drive, varied gear ratio from unit 21, constant gear ratio from transmission 70, and frictional holding force from transmission 70.

h. Additional Perforated Spring Embodiments (FIGS. 20–32)

FIGS. 20–32 depict several of the many possible additional embodiments of the perforated spring 44, FIGS. 8 and 12.

In FIG. 20, spring 44A comprises an array of elongated slots of generally uniform size positioned along the longitudinal center axis of the spring.

The spring 44B of FIG. 21 comprises a similar array of uniform elongated slots, flanked by a line of alternating holes along each outside edges of the spring, with the holes in each line being spaced one hole per two slots.

The spring 44C of FIG. 22 has a similar array of uniform elongated slots, flanked by two lines of holes along the outside edges of the spring, with a hole at each end of the individual slots.

FIG. 23 depicts a spring 44D comprising an array of elongated slots of increasing length positioned along the longitudinal center axis of the spring.

In FIG. 24, spring 44E comprises an array of generally circular holes of the same size positioned along the longitudinal center axis of the spring.

The spring 44F of FIG. 25 comprises an array of generally circular, like-sized holes positioned along the longitudinal center axis of the spring, flanked by lines of alternating holes along the outside edges of the spring, with the holes in each line spaced one hole per two slots.

The spring 44G of FIG. 26 comprises an array of generally circular holes of uniform size positioned along the longitudinal center axis of the spring, flanked by a line of alternating holes along each outside edge of the spring, with the holes in each line being spaced one hole per slot.

In FIG. 27, spring 44H comprises five longitudinal lines of generally circular holes of like size, with the holes of adjacent lines positioned at alternating positions along the spring.

FIG. 28 depicts a spring 44I comprising an array of generally circular holes of increasing radii positioned along the longitudinal center axis of the spring.

In FIGS. 20–22 and 24–26, one end of the spring does not have slots, so that the spring torque or force maintains a relatively constant maximum along the slot-free end.

FIGS. 29 and 30 depict a perforated spring 44K illustratively comprising three sections 112, 113 and 114 which are joined by a tongue-in-groove arrangement 116 (sections 112 and 113) and rivet 117 (sections 113 and 114). The spring torque is controlled by the different cross-sectional dimensions of the sections as well as the size and spacing of the perforations.

FIGS. 31 and 32 depict an alternative, non-perforated sectioned spring 44L, illustratively comprising three sections 118, 119 and 121 which are joined by rivets 122 (sections 118 and 119) and a link 123 (sections 119 and 121). The spring torque is controlled by the cross-sectional dimensions of the sections.

FIG. 42 depicts yet another alternative perforated spring 44M which, illustratively, comprises two laterally spaced parallel rows of longitudinally spaced, longitudinally elongated slots 42. The length of the slots and the spacing between the slots are selected to vary the torque output of the spring along the length of the spring. Slots are preferred to holes because the elongation of the slots has a more uniform cross-section along the width of the spring than circular holes and thus more uniform torque along the length of the slots. FIG. 42A depicts still another perforated spring, an embodiment 44N comprising longitudinally-overlapping elongated slots 42A having round, semi-circular ends 42B.

The long, rounded end, overlapping slots enhance the uniformity of the spring cross-section along its width and thus provide uniform (uniformly constant or uniformly varied) torque.

(I). Brake Mechanisms, including Magnetic and Detent Brake Embodiments (FIGS. 33–37)

(1). Magnetic and Detent Brake Embodiments (FIGS. 33–37)

Figure 34:
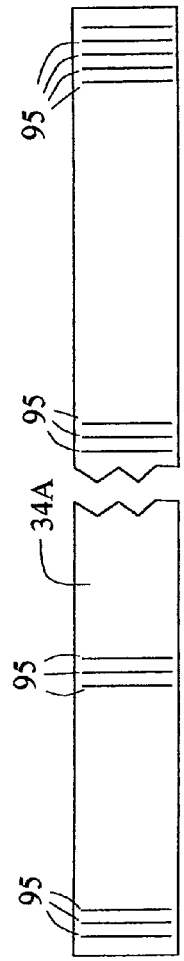
Figure 35:
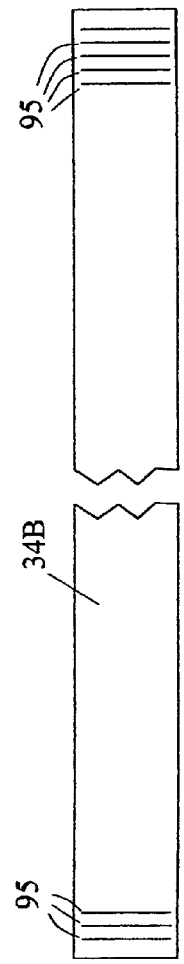
Figure 36:
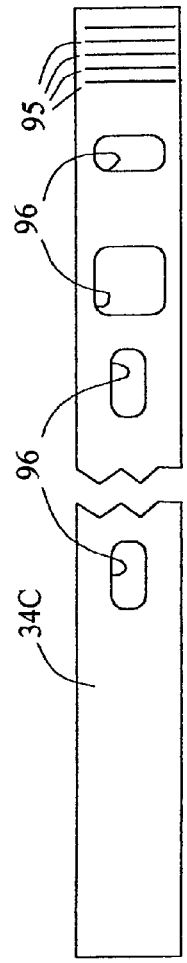
Figure 37:
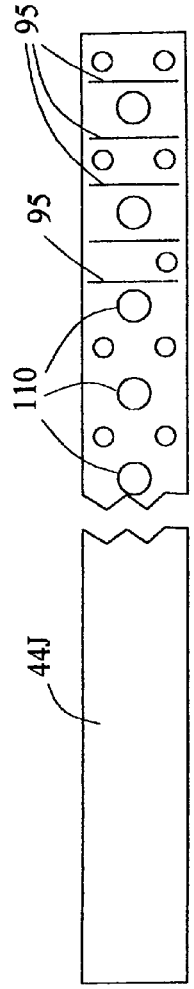

FIGS. 33–37 illustrate the use of magnetic and detent brakes in spring drives. FIG. 33 depicts a spring drive which incorporates two brake devices, a magnet brake 100 and a detent brake 105. Both devices are shown in one figure, although either one or both devices can be used. Regarding magnet brake 100 and referring also to FIGS. 34–37, the spring contains thin magnetic or magnetized sections 95 which in the illustrated embodiment extend transverse (side-to-side) on the spring. Preferably, several of the sections are placed closely adjacent one another at locations of the spring where it is desired to stop the spring, for example at spring positions corresponding to blind fully open and fully closed positions and intermediate positions, including a large number of closely spaced intermediate stop positions. For example, FIG. 34 depicts a varied-cove spring embodiment 34A having magnet strip 95—defined stop positions at a multiplicity of positions. FIG. 35 depicts an embodiment 34B having magnet strip 95—defined stop positions proximate the ends of the spring. FIGS. 36 and 37 illustrate springs 34C and 44J, respectively, having magnet strip 95—defined stop positions at one end of the spring.

Referring now to FIG. 33, the exemplary magnet brake 100 comprises a magnet bar 101 mounted for pivotal movement by pin or shaft 102 which is mounted to the housing 11. Spring 103 is mounted to bar or rod 104 extending from the housing and biases the magnet bar lightly closely adjacent the outside surface of spring such as spring 34A, 34B, 34C and 44J wound on associated drum such as 28. The magnet bar 101 rides lightly along or in close proximity to the spring with no effect on the operation of the spring drive until the bar reaches the magnet sections 95, which are attracted to the bar. Preferably, the magnetic force is sufficient to maintain the spring drive and blind at the given position when the blind is brought to rest at that position, and is sufficient to stop a very slowly moving blind at that position (that is, to stop the blind as a person slows movement of the blind to stop it proximate the position of the magnet strips), but is insufficient to stop the blind as it is raised and lowered at a normal speed.

The detent brake 105 shown in FIG. 33 comprises a bar 106 extending in a transverse direction from the housing 11 adjacent the spring between the associated drums, a detent 107 mounted on a pin 108 projecting downward through a hole in the bar 106, and a spring 109 between the bar 106 and the detent 107 for biasing the detent lightly against the spring. As shown in FIG. 36, the spring 34C may comprise one or a plurality of holes 96 which accept the detent 107. Alternatively, referring to FIG. 37, holes at selected positions in the perforation-derived varied force spring may be of suitable size to accept the detent. The detent 107 has a sloping tip which engages the selected holes with force which is sufficiently great to maintain the spring drive and blind at the given position when the blind is brought to rest at that position, and is sufficiently great to stop a very slowly moving blind at that position (that is, to stop the blind as a person slows movement of the blind to stop it proximate the position of the magnet strips), but is sufficiently small (that is, the detent is sufficiently easy to dislodge from the selected holes) to stop the blind as it is raised and lowered at a normal speed.

(2). Recoilers (FIGS. 33A, 33B)

FIG. 33A depicts a braking device in the form of a recoiler roll or recoiler wheel or simply recoiler 154 comprising a hub 156 and a multiplicity of fins 157—157 which extend from the hub, illustratively generally radially. The hub 156 and fins 157 can be formed as an integral unit. Preferably at least the fins (or the fins and the hub) are formed of resilient material such as rubber. The recoil hub is mounted on a shaft 158. The recoiler 154 is mounted adjacent and in contact with an associated spool of a spring drive such as 31, 41, for facilitating recoil of the spring when needed, preventing uncontrolled expansion or "explosion" of the spring, and providing braking action for supplementing the inertia of the spring drive unit to maintain the spring and associated window cover in desired positions.

FIG. 33B depicts another recoiler, embodied in a coil spring recoiler 161 comprising a coil spring 162 attached at one end 163 to the wall of the blind housing and connected at the opposite end to a cord or wire 164 which is wound on a spool 166 mounted coaxially with the storage spool of an associated spring drive such as 31A, 41A. The coil spring recoiler 161 opposes the unwinding of the spring and facilitates recoiling of the spring when needed, preventing uncontrolled expansion or "explosion" of the spring, and provides braking action for supplementing the torque and inertia of the spring drive unit to maintain the spring and associated window cover in desired positions.

j. Large Dimension and Heavy Window Cover Systems (FIGS. 38–41)

FIGS. 38–41 illustrate examples of the use of spring drive units embodying the present invention in large window covers, for example, heavy covers or wide covers.

FIG. 38 depicts a single spring drive unit 15G which includes three lift cords and pulleys. The illustrated drive unit includes a spring drive such as 26, 31, 41 which is connected by a gear set 65 to the shaft on which the three lift cord pulleys 19 are mounted. Typically, the associated cords are routed along vertical paths which are spaced along the width of the wide and/or heavy cover, for uniform raising and lowering of the cover.

FIG. 39 depicts a plural (two or more) drive unit, spring drive window cover system which includes a pair of drive units 15H, each of which is similar to that of FIG. 38, but includes two pulleys 19 and associated lift cords. The spring drives are connected by a power transfer bar unit 125 having bevel gear units 65 on the opposite ends which are connected to the rotating shaft of each spring drive, so that the drives, pulleys, and cords operate precisely in unison. The four illustrated pulleys 19 can be used to route four lift cords along vertical paths which are spaced along the width of the cover, for uniformly raising and lowering the wide and/or heavy cover (See FIG. 41).

FIG. 39A depicts a plural drive unit, spring drive window cover system which is similar to that of FIG. 39, in that the spring drive system includes two single-spring, spring drive units 31 or 41 and two pair of outer pulleys. The illustrated spring drive units 31 (41) are connected in series by a drive train to two-pulley units 18—18 mounted on either side of the spring drive units. The arrangement is well suited to placing plural spring drive units in the interior or middle of the window cover between left and right end pulleys. The window cover drive system also includes a pair of recoilers 154—154, one mounted adjacent and in contact with the farthest left and farthest right spools of the spring drive units. The recoilers 154—154 facilitate recoil of the associated spring when needed, prevent "explosion" of that spring, and provide braking action for supplementing the inertia of the spring drive units to maintain the springs and associated window cover in desired positions.

FIG. 40 depicts a plural drive unit, spring drive system comprising a pair of spring drive units 15I similar to the units 15G of FIG. 38, but with only one pulley 19 in each unit. This system is used for a two lift cord system, typically for heavy covers.

FIG. 40A depicts a plural drive unit, spring drive system which includes two spring drive units and a two pulley unit 18 on one side of the spring drives. A gear train is connected between the output spool of each drive unit and the associated pulley unit. Each spring drive 31A or 41A comprises a pair of springs mounted in parallel on a single storage spool (or integral/joined storage spools) and a single output spool (or integral/joined output spools).

At this point, a note regarding spring drive terminology may be helpful. First, herein the phrases "plural drives," "plural drive units," "plural drive unit, spring drive system" and the like refer to a system comprising two or more spring drive units. See, for example, FIGS. 39, 39A, and 40, which depict different arrangements of window cover systems, each of which includes two spring drive units such as 26, 31 or 41. Second, the phrases "plural-spring unit," "plural-spring drive unit," "plural-spring, spring drive unit" and the like refer to an individual spring drive unit which comprises two or more springs. See, for example, FIGS. 45 and 52, wherein each of the spring drive units 26A, 31A, 41A and 131 comprises two springs. In FIG. 45, the two springs of the spring drive unit 131 have separate storage spools 132 and 134 and a common output spool 136. In FIG. 52, the spring drive unit 26A (or 31A or 41A) comprises two springs mounted in parallel on a single storage spool (or integral/joined storage spools) and a single output spool (or integral/joined output spools). Finally, please note that systems can comprise plural drive units, of which one or more is a plural-spring drive unit. See, for example, FIG. 40A. The plural-spring drive unit; plural drive unit systems; and combinations thereof are used to increase the torque/force available for operating heavy coverings and to provide separate drive units near the cord pulleys in wide coverings.

FIG. 41 depicts representative examples of the lift cord paths for two and four cord systems.

FIGS. 49 and 50 are a front perspective view, partially broken away, and a top plan view of a compact, simple high torque spring drive system. A varied torque spring drive 31A or 41A or, preferably, a constant torque drive unit 21A is used which comprises a pair of springs mounted in parallel on integral or joined storage spools and output spools, and thereby provides increased torque for positioning heavy blinds. The spring drive is connected via a direct drive or varied transfer gear train 183 comprising gear wheels or sprockets 184, 185, 186 to a pulley unit 18 comprising pulleys 19—19 mounted on a shaft which is parallel to the shafts of the output and storage spools and transverse to the housing.

As mentioned, FIG. 51 is a perspective view of an embodiment of direct or varied ratio cord pulley system 175, comprising a pair of pulleys or spools 176 and 178 having selected diameters at different axial positions for precisely controlling their ratio. Illustratively, the pulleys 176 and 178 are reverse oriented, conical pulleys or spools 176 and 178. The spools are mounted for rotation on shafts 177 and 179 which correspond to the spool axes and have continuous grooves 181 and 182, FIG. 52, which wind axially around the spools for receiving cord 178 and preferably winding cord as a single layer. The pulley system 175 operates similarly to the flat band transmission system 21, except that the diameter of each of the spools 176 and 178 can be varied with respect to their longitudinal axes so that as the spools are wound and unwound, their ratio at a given covering/blind position is determined by the spool diameters at the axial cord position corresponding to the covering/blind position, not by the diameter of the wound cord layers, and thus their ratio can be varied precisely over a wide range of values.

It is to be emphasized that the pulley system 175 is not limited to conical shapes. Rather, the shape is that which provides the desired diameter ratios axially along the spools. The force requirements for a given system may best be accommodated by decidedly non-conical configurations. Generally, the output-controlled configuration of the spools is an elongated cylinder of controlled and selectively varying axial diameter.

FIG. 52 depicts an alternative embodiment 180 to the embodiment of the compact drive system of FIGS. 49 and 50, which is modified by the inclusion of a varied ratio cord pulley system 175. In this embodiment, the pulley system shafts 177 and 179 are mounted to sprockets 187 and 188 which are inserted between the pulley sprocket 186 of the gear train and the intermediate sprocket 185 of the gear train. The result is a compact drive system which nonetheless has high maximum torque that can be varied over a wide range of values to accommodate the changing supported weight of a heavy window cover.

k. Plural Spring, Spring Drive System (FIGS. 43–45, 53–57)

FIGS. 43–45 depict a compact spring drive system 15J embodying the present invention and comprising integrally formed plural spring drives. The spring drive system comprises plural (two or more) spring drives which share components and are aligned along the width of the associated blind. This integrated alignment provides force multiplication without increasing the size of the associated housing 11 and, specifically, without requiring a taller housing 11. Referring specifically to FIGS. 43 and 44, the illustrated two spring, spring drive system 131 comprises a first spring drive comprising storage drum or spool 132, common output or power drum or spool 136 and spring 133. The second spring drive comprises storage drum or spool 134, common output or power drum or spool 136 and spring 135. As perhaps best shown in FIG. 44, the spring 133 is routed from its storage drum 132 beneath the drum 134, from which point the two springs are routed together, with spring 133 under spring 135, over and around common output or power drum 136. In effect, the individual torques of the plural springs are added together. The two storage spools are mounted for independent rotation so that outer spool 132 can rotate faster than inner spool 134. This is because the diameter of spring 133 on spool 136 is greater than the diameter of spring 135 and thus spring 133 rotates faster on its spool 132 than does spring 135 on its spool 134. Different types of springs can be used. For example, illustrated spring 135 is a conventional flat spring which provides substantially constant torque, and spring 133 is perforated so that the torque varies along the length of the spring proportional to the operational characteristics of the associated blind, as discussed previously. The combined springs provide a combined increased, varying torque sufficient for supporting heavy blinds, yet tailored to the different force requirements as the blind is raised and lowered.

FIG. 45 depicts one embodiment 15J of a spring drive unit which uses the two spring, spring drive 131. The three spools 132, 134 and 136 are mounted on transverse shafts 81, 82, 91, respectively, spaced along the width (horizontally) of the associated housing 11. Gear 66 of gear set 65 is mounted on shaft 91 with the output or power spool 136 and meshes with gear 67, which is mounted on shaft 92 along with the cord pulley set 18 comprising right and left side cord pulleys 19, 19. Of course, the other components such as transmissions 50 and 70 and bevel gear set 60 can be used for transferring power from the spring drive to the cord pulleys and controlling the applied power, the travel of the blind relative to that of the spring drive, and the inherent, braking action. Furthermore, three or more springs can be used by the simple expedient of providing additional storage drums or spools and routing their associated springs together over and around the common output or power spool 136. For example, a third spring can be added to the drive 131, FIGS. 43 and 44 by adding a third storage spool spaced generally horizontally to the left of spool 132, and routing the third spring beneath spring 133. Please note, as alluded to previously, this presents the opportunity to multiply the torque without increasing the size of the spools and the height of the housing 11. In contrast, in the plural spring system, the torque is increased by substantially a factor of two simply by adding a second spring the same size as the first spring. In effect, the increased spring mass required to multiply the torque can be provided by adding additional springs positioned along the horizontal axis of the spring drive, rather than by increasing the spring mass and spool diameter (and thus the height of the spool and the housing), as is the case where a single spring, spring drive is used.

In the embodiment shown in FIG. 45, the storage drums are arranged in a horizontal straight line, or approximately a straight line. In addition, both the output drum and the storage drums are arranged along the horizontal straight line. Alternatively, the storage drums or both the output drum and the storage drums can be positioned along a vertical line. Alternatively, the storage drums can be arranged in a cluster, or both the output drum and the storage drums can be arranged in a cluster.

FIG. 53 is a top plan view of a section of a simple high torque spring drive system. A varied torque spring drive 31A or 41A or, preferably, a constant torque drive unit 26A is used which comprises a pair of springs mounted in parallel on integral/joined storage spools and output spools. The spools are mounted on shafts which are oriented transverse to the housing. The plural spring, drive system provides increased torque for operating heavy blinds. The spring drive is connected via a direct drive or varied ratio transfer gear train 183 comprising gear wheels or sprockets 184, 185, 186 to an automatic locking pulley cord unit 190, FIG. 54, which includes a pulley 191 and raise/lower cord 192 wrapped around the pulley. In the exemplary drive system, the pulley shaft 50 is oriented transverse to, 90° relative to, the spring drive shafts and the shafts of the transfer gears 183, and is connected to the shaft 186 of the output pulley by a 90° bevel gear unit 60. The pulley cord unit 190 is used to operate the associated window cover or blind, that is, to raise and lower the window cover, and incorporates an automatic locking mechanism that prevents accidental movement of the blind, yet is easily and automatically overridden when the pulley cord system is operated. Although the locking pulley cord draw system 190 is desirable in heavy and/or high torque window cover systems, it is applicable in general to window cover and other systems where a shaft is rotated by a pulley cord system.

Referring also to FIG. 54, in the illustrated exemplary arrangement, the pulley cord pulley unit 190 includes and is mounted within a housing 193 comprising front wall 194, top wall 196 and bottom wall 197. The pulley 191 is mounted on and rotates together with shaft 50, which extends through a bushing 198 having a circumferential groove 199 that is received by vertically elongated slot 201 in front wall 194, thereby mounting the bushing in the slot and allowing the bushing, shaft 50 and pulley 191 to move up and down.

The automatic locking mechanism includes a compression spring 202 which is positioned between the bottom wall 197 and the bushing 198 and biases the bushing 198 against the top of the slot 201. A threaded adjustable screw or pin 203 is mounted through the top wall 196 of the housing and mates with a series of slots 204 in the periphery of the pulley 191. Referring also to FIG. 55, the spring 202 normally biases the pulley 191 against the screw 203, locking the screw in one of the slots 204, preventing rotation of the pulley and preventing raising or lowering movement of the cover or blind. In short, the locking mechanism prevents the blind from moving from its selected position. Referring also to FIG. 56, when the front or back section of the cord is pulled downward to raise or lower the blind (alternatively, to lower or raise the blind), the spring 202 is overcome and the pulley 191 is moved downward and out of engagement with the locking screw 203, allowing the pulley to rotate and the blind to move/be moved as desired. When a desired position is reached, the cord 192 is released, allowing the spring 202 to automatically lock the pulley 191 on the screw 203.

As shown in FIG. 57, the pull cord 192 is routed over the pulley 191 and the section of the cord which extends downward from the rear of the pulley can be routed by a guide pulley 206 to a position adjacent the front section of the cord, and from there both sections are routed by close-spaced bushings 207 and 208 through apertures in the bottom wall 197 of the housing and exit the housing. As alluded to above, when one of the cord sections is pulled, the locking mechanism is released, and the pulley 191 can be rotated to raise or lower the blind. After the blind is positioned as desired, the cord is released, allowing the anti-rotation locking mechanism to automatically re-engage and to maintain the blind in the selected position.

The locking cord system 190 provides access to coverings (and their associated housings) from a distance and thus is useful for coverings which are difficult or awkward to reach, for example, a covering which is located high on a wall, and a covering access to which is obstructed, for example, by furniture. Also, the use of the various spring drives, transmissions, etc. and combinations thereof contemplated herein result in little effort being required to operate a covering using the cord.

FIGS. 58 and 59 are top plan views of a section of simple high torque spring drive systems 160 and 185, respectively, according to the present invention. The systems incorporate wand or crank units according to the present invention which operate, that is, raise and lower the associated cover or other load. Each exemplary system 160, 185 includes one or a plurality of constant and/or varied torque spring drives selected from 26A, 31A and 41A or, preferably, constant torque spring drive 26A, which illustratively comprises a pair of springs mounted in parallel on integral/joined storage spools and output spools. The spools are mounted on shafts which are oriented transverse to the housing. The plural spring drive system provides increased torque for operating heavy blinds. The spring drive 160, FIG. 58, or 185, FIG. 59, is connected via a direct drive or varied ratio transfer gear train or transmission 183 comprising gear wheels or sprockets 184, 185, 186 to crank unit 210, FIG. 60, or to crank unit 225, FIG. 61. Crank unit 210 has relatively greater automatic braking action, whereas embodiment 225 is a relatively free-running crank unit of relatively lesser braking action. Both units incorporate a crank such as 217, FIGS. 62 and 63, which comprises hinged sections 218, 219 and 221 that permit operating the crank unit from a position beneath the spring drive housing.

Referring to FIGS. 58 and 60, crank unit 210 comprises transverse, horizontal shaft 211, on one end of which is mounted output sprocket 186 of gear train 183. The shaft 211 extends through a bushing to the front exterior of the spring drive housing. A universal joint 212 pivotally mounts crank 217, FIGS. 62 and 63, to the second end of the shaft 211. The universal joint 212 comprises a connector 213 mounted to the external end of shaft 211, a connector 214 mounted to the upper end of the crank, and an H-shaped connector 216 pivotally mounted to and between the other connectors. Typically, the bent crank, FIG. 63, can be used to raise and lower the blind by rotating the crank end 218 about the axis of the crank upper section 221, so long as the crank upper section 221 is oriented at an acute angle, typically less that 45° to the axis of shaft 211. However, when the crank 217 is released, gravity causes it to assume the near-vertical orientation shown in FIG. 60, and rotation of the crank about its near vertical longitudinal axis does not rotate the shaft 211 about its longitudinal axis, and vice versa. This is because rotation of shaft 211 would cause the transverse-oriented crank 217 to rotate much like a propeller. As the result of the torque which is required for this rotation, the crank acts as a brake against rotation of the shaft 211 and unwanted movement of the associated blind.

Referring now to FIGS. 59 and 61, crank unit 225 comprises a shaft 226 which is journaled diagonally from the top of the drive housing through a bushing in the front wall. One gear 229 of a worm gear unit 227 is formed on the shaft 226 and the other gear 228 is mounted or formed on shaft 219, FIG. 59, which is connected by bevel gear unit 60 to the output sprocket 186. Universal joint 212 pivotally mounts crank 217 to the external end of the shaft 226. The universal joint 212 comprises connector 213 mounted to the external end of shaft 226, connector 214 mounted to the upper end of the crank, and H-shaped connector 216 pivotally mounted to and between the other connectors. As mentioned above, typically, the bent crank, FIG. 63, can be used to raise and lower the blind by rotating the crank end 218 about the longitudinal axis of crank upper section 221, so long as the crank upper section is oriented at an acute angle, typically less that 45°, to the longitudinal axis of shaft 226. Unlike unit 210, at rest shaft 217 hangs at an angle of less than 45° to the angled shaft 226. As a result crank 217 itself is relatively free-running, that is, without propeller rotation, in the release or rest position: rotation of the crank 217 about its longitudinal axis is translated into rotation of the permanently angled shaft 226 about its longitudinal axis. To raise or lower the associated blind, the bent crank is rotated as described above, and the rotation is translated into rotation of shaft 219, the spring drive, and the associated cord pulleys (not shown), and movement of the cover.

As alluded to above, when in the release position, crank 217 rotates the worm gear unit 227 and moves the cover or other load without difficulty. In contrast, when at the release position, the gear 228 of the worm gear unit is "locked" by gear 229, that is, it is difficult to use gear 228 to move gear 229, and as a result the worm gear unit opposes movement of the cover, for example, after the crank is used to move the cover to a selected position and the crank is released. Please note, and as explained elsewhere, the gear train or transmission 183 and the spring drives (and other components such as transmissions and gears) which are used for both systems 160 and 185, as well as the worm gear unit 227 which is used in system 160, provide inertia and friction which facilitates keeping the associated load(s) at the desired position.

FIG. 60 illustrates an anti-rotation brake in the form of a bracket 234—supported bolt 231 having a pad 233 at its outer end which is biased by spring 232 against axle 219 to provide frictional braking which suppresses unwanted movement when the crank is released, but is easily overcome by rotation of the crank when it is desired to raise or lower the blind.

Similar to the cord system 190, the crank systems 210 and 225 are especially useful in systems having coverings which are awkward or difficult to reach for extending and retracting, for example, because the covering is located high on a wall, or because access to the covering is obstructed, for example, by furniture. Also, the use of the various spring drives, transmissions, etc. and combinations thereof contemplated herein result in little effort being required to operate the covering using the crank. In addition, the combination of the various spring drives, transmissions, gears, etc., in combination with a cord or crank system provides ease of operation, stability against unwanted movement, and accessibility. The crank systems may be preferred to the cord system for accessibility, because the cord typically has to be pulled taut for operation and frequently is anchored at its bottom end to the wall, whereas the crank is inherently rigid and can be pulled away from the wall for operation, thereby more easily circumventing obstacles and more easily providing access from a distance in such circumstances.

1. Non-locking Crank (FIGS. 64–70)

The spring drive units and systems described herein are designed to offset or counteract (1) the differences or variations in the supported weight of blinds at different positions and/or the inherently opposite variation of the torque of spring drives; (2) the increased differences in supported weight for heavy blinds; and (3) the inherent difficulty in using spring drives with long window covers, that is, window covers that traverse a long distance between the open and closed positions. Regarding (1) for example, a cover having a supported weight of ten pounds at the top, open position may have a supported weight of one pound at the bottom, closed position.

Above-described FIGS. 58–63 depict crank-assisted systems which use cranks to provide a torque or motive force supplemental to that of the spring drive unit(s) or system(s). Although the cranks of FIGS. 58–63 can be used in balanced systems according to the present invention in which the spring torque is approximately equal to (balanced with) the supported blind weight during extension and retraction, they are especially applicable to unbalanced systems, in which the torque of the spring unit(s) or system(s) does not balance the supported weight of the cover and/or where a separate brake is necessary to maintain the position of the cover at some even if not all positions.

In balanced systems according to the present invention, the cover can be extended and retracted using a crank as described herein; using a pull cord or chain; and manually, that is, by manually pulling and pushing the cover itself, typically by grasping the bottom rail. Other motive forces and components described herein such as motors can be used if desired.

FIGS. 64–70 depict other embodiments of crank-assisted spring drive unit(s) and system(s) according to the present invention, which are useful in unbalanced systems, but are especially adapted to the balanced systems according to the present invention in which the torque of the spring drive system and the supported cover weight are approximately equal throughout the path of travel between the extended and closed positions. These embodiments are simple and easy to operate and, although the crank is easily detached, the crank need not be detached for spring-, powered- or manually-assisted operation (for example, for opening or closing a cover after gripping it by hand typically most conveniently proximate the center.

Please note, because the crank of FIGS. 64–70 does not interfere with the operation of the cover, the crank can be mounted to the cover system without interfering with other components and modes of operation such as cord, chain or manual. In a preferred embodiment, the crank uses connecting gears such as bevel gears which don't act as a brake so that the cover can be operated by crank, cord or pulley, or by hand. In contrast, the worm gears such as gear 227, FIGS. 60 and 61, act as a brake and impede operation of the cover unless the crank is disconnected.

Referring now to the crank-assisted embodiments of FIGS. 64–70, FIG. 64 is a top plan view of a section of a simple high torque spring drive system shown with the cover removed. A varied torque spring drive 31A or 41A or a constant torque drive unit 26A is used which comprises a pair of springs mounted in parallel on integral/joined storage spools and output spools. The illustrated spools are mounted on shafts which are oriented transverse to the housing. The plural spring, drive system provides increased torque for operating heavy blinds. The spring drive is connected to a direct drive or varied ratio transfer gear train 183 comprising gear wheels or sprockets 184, 185, 186. Sprocket 186 is connected by a 90° bevel gear unit 60 to shaft 50 which is oriented transverse to, 90° relative to, the spring drive shafts and the shafts of the transfer gears 183. Shaft 50 is connected by another 90° bevel gear unit to shaft 391 of crank unit 390.

The crank 390 can be one piece or can be a hinged unit such as crank 217 shown in FIGS. 62 and 63. In addition, whether one piece or hinged, the crank can be removably attached to the drive system and window cover. Referring also to FIGS. 65 and 66, in a preferred embodiment, the crank unit 390 comprises shaft 391, crank 392 and a sleeve 393 which joins the shaft 391 and crank 392 at adjacent ends thereof. The sleeve 393 preferably is flexible material such as plastic which provides a friction fit with the shaft 391 and/or crank 392, yet is easily removed by pulling. As shown, in one embodiment the sleeve 393 is mounted over the upper end of the crank 392 by joining means such as glue, screw(s), etc. and can be removably attached over the lower end of shaft 391. As a result, the crank 390 can be attached to the shaft 391 for extending or retracting the cover, and is easily removed from the shaft 391 for storage and to avoid the appearance of a depending crank. Of course, numerous other joining techniques will be applied by those of skill in the art.

As mentioned, a crank such as crank unit 391 can be used in non-balanced systems as well as in balanced systems. The crank is useful in hard-to-reach applications, for example (1) window covers which are positioned behind furniture or other obstacles so the end of the window cover (where the pull cord typically is positioned) is difficult to reach and/or the middle of the cover (a cover typically is gripped in the middle for manual operation) is difficult to reach, or (2) window covers which are too tall for manual operation.

FIGS. 67 and 68 are, respectively, a partial front section view and an end section view of a spring drive/window cover system which has a front-emergent pull cord or chain (hereafter pull cord). That is, pull cord 394 enters the housing 11 via one or more holes 397 in the front of the housing. FIGS. 69 and 70 are, respectively, a partial front section view and an end section view of a spring drive/window cover system which has a similar, but bottom-emergent, pull cord or chain (pull cord). That is, pull cord 396 enters the housing via one or more holes 398 in the bottom of the housing. As illustrated, in one exemplary approach, both pull cords 394, 396 are connected to the cover drive by means of associated pulleys 399, 401 mounted on shaft 50 which is connected by a 90° bevel gear unit to gear sprocket 186 of gear train 183. Optionally, a brake can be applied to each pull cord. For example and as shown in FIGS. 67 and 69, a threaded adjustable screw or pin 203 is mounted through the pulley housing wall and engages the pulley shaft 50. The associated frictional force is adjusted by tightening and loosening the screw.

As alluded to above, disengagement of the pull cord (or chain) 394, 396 or the crank 391 is unnecessary, because the associated cover can include both the pull cord and the crank and can be operated by either one independent of the other. In such a system, for the crank positioning depicted in FIG. 64, the pull cord typically would be at a location spaced from the crank, such as at the opposite end of the housing 11. In this arrangement, the pull cords would be moved to the opposite end of the housing 11 and the associated drawing would be the mirror image of the views depicted in FIGS. 67 and 69.

m. Battery Assisted Spring Drive System (FIGS. 46–48)

FIGS. 46–48 depict several embodiments of battery-assisted systems in accordance with the present invention. A DC battery-powered electric motor 167 of a type known in the art is connected to the pulley 19 or pulley unit 18 by various drive systems, including a chain drive connection 170, FIG. 46, comprising a sprocket 169 and chain 168; a belt drive connection 175, FIG. 47, comprising a pulley 172 and cord or belt 171; and a shaft drive connection 180, FIG. 48, comprising a shaft 173 connected to the pulley shaft via bevel gear set 60. Aided by the spring drive(s), transmission(s), etc. a small electric motor 167 easily raises and lowers the cover/blind, and can be operated at the blind, for example, by a wall switch, or remotely, by stationary and/or portable controls.

Similar to the single spring drive systems, in one embodiment, at least one of the flat springs is adapted for imparting a torque component to the system torque which varies along the length of that spring. In a specific embodiment, the said spring has a cove or transverse curvature which selectively varies along the length of the spring for providing the torque which varies proportional to the transverse curvature of that spring at a position closely adjacent the output drum. Alternatively, the said spring has at least one hole therein for providing a torque proportional to the transverse size of the hole and the resulting effective width of that spring when the hole is positioned closely adjacent the output drum. In another alternative embodiment, the said spring has holes along its length for providing a torque which varies proportional to the transverse size of the holes and the resulting effective width of the spring when one or more holes is positioned closely adjacent the output drum.

It should be noted that the cover or blind housing which mounts the blind and the spring drive can be mounted along the bottom of the window or other surface to be covered, so that the blind extends upward for closing and retracts downward for opening. For convenience, in this document we describe the operation of top mounted, downward opening blinds and spring drives. However, it is understood that the invention is applicable to upwardly closing blinds, which typically have a bottom-mounted spring drive unit mount. The versatility of the spring drive system according to the present invention in adapting the spring torque characteristics to the operational characteristics of a given cover or blind as well as the braking action of the, make the system applicable to blinds of any operating orientation (top, bottom, lateral, etc.), weight and length.

4. Reversible Pull Cord-Controlled Mechanism and Associated System a. Pull Cord-Controlled System 406

FIG. 71 is a bottom view of an alternative embodiment 406, in accordance with the present invention, of the cover system 180 depicted in FIG. 52. In cover system 406, a reversible pull cord mechanism 410, in accordance with the present invention, is added to the spring-driven, band transmission-controlled cover system 180. The reversible cord pull mechanism 410 comprises a retractable pull cord mechanism 412 having an associated pull cord 420 and pull 428 for use in effecting movement of the associated cover and a reversible gear transmission system 430 for reversing the operation of the pull cord device. That is, under control of the cover pull cord 420, the reversible gear transmission 430 reverses the direction of movement of the cover and thereby permits the single pull cord to both extend and retract the associated cover. Exemplary covers include slat blind cover 12, FIGS. 1 and 2, and pleated fabric cover 22, FIGS. 3 and 4. Also, the cover system 180 depicts one of the two illustrated springs of spring system 26A, 31A, 41A in phantom, to emphasize that the system can comprise one or two or other pluralities of springs. In general in this document, disclosed single springs systems can comprise plural springs, and disclosed plural springs can be single springs.

More specifically, the overall cover system 406 comprises (1) the retractable pull cord mechanism 412, which comprises a housing or compartment 414 mounted to or within the cover housing 11, a preferably constant force rewind spring 416, a pulley 418 on which the pull cord 420 is wound, a pull cord input/power shaft 422, and a one-way bearing 424; and (2) the reversible gear transmission system 430 which comprises an arrangement of a plurality of gears specifically arranged to translate single-direction motion of the pulley cord device's power shaft 422 into bidirectional motion of the reversible gear transmission's power/output shaft 448.

As depicted, the pull cord-controlled cover system 406 also comprises connecting means 60 for operatively connecting the reversible cord pull mechanism 410 to the cover system 180. This reversible pull cord apparatus reversibly extends and retracts the system cover based solely on the pulling direction of the single cord 420. That is, the single pull cord 420 both selects the direction of movement and effects the direction of movement of the cover, thereby extending and retracting (lowering and raising) the associated cover.

Illustratively, the connecting means is a bevel gear set 60 comprising a pair of meshed bevel gears 488 and 490. Gear 488 is mounted on the output shaft 448 of the reversible gear transmission system and gear 490 is mounted on the shaft 6 of gear 486 of the gear train 483 associated with the cover system 180, so that rotation of the output shaft 448 rotates the gear train 486 and the cover cord pulleys 19—19 (and the associated band transmission and spring drive), and vice versa.

b. Reversible Gear Transmission System 430

Referring in particular to FIGS. 72–75, the reversible gear transmission 430 is operatively connected to the pull cord device 412 such that when the pull cord 420 or the pull 428 thereon is pulled in a first direction, FIG. 74 (FIG. 75), the output shaft 448 is rotated in a first rotational direction, whereas pulling the cord in a second direction, FIG. 75 (FIG. 74), oriented at an appropriate angle to the first cord pull direction, rotates the output shaft 448 in the opposite, or second rotational direction. This bidirectional rotation of the output shaft extends and retracts the cover.

Exemplary reversible gear transmission 430 comprises a housing or compartment which contains five gears mounted between three spaced walls 434, 436, 328 which in the illustrated embodiment are oriented transverse to the length of the head rail housing 11. Upper power gear 440 is mounted on the power shaft 422. Lower power gear 442, which is mounted on a shaft 444 that itself is mounted between walls 434 and 436, is positioned approximately beneath and is meshed with the upper power gear 440, such that gear 440 rotates in one direction and gear 442 rotates in the opposite direction.

Output drive gear 446 is mounted on output shaft 448, which is mounted between walls 436 and 438. Output drive gear 446 is operatively connected to the cover cord pulleys. In this document, "operatively" encompasses both direct connection and connection by interconnecting components. An exemplary group of interconnecting components includes the bevel gear set 60 and the gear train 483 depicted in FIG. 71.

The output drive gear 446 is aligned horizontally with the two power gears 440 and 442, FIGS. 76–78, and is positioned vertically approximately midway between the positions of the two power gears. This horizontal and vertical alignment facilitates transfer of power from the power gears 440 and 442 to the output gear 446.

Shifting mechanism/shifting gear set 450 comprises a first shifting gear 451 and a second shifting gear 452, which are mounted for rotation in unison on shaft sections 454 and 456 of shaft 455 that extend from opposite sides of a supporting pivot arm 458. The shaft 455 (sections 454, 456) is itself mounted on one end of the pivot arm 458. The opposite end of the pivot arm 458 is mounted on a shaft 460 which extends between walls 434 and 438 such that the pivot arm rotates about and/or with the shaft 460.

As is perhaps shown most clearly in FIGS. 76–78, pivot arm 458 is pivotable among (1) a first position in which the first shifting gear 451 meshes with upper power gear 440 and the second shifting gear 452 meshes with the output gear 446, thereby rotating the output shaft 448 in a first direction; (2) a spaced second position in which the first shifting gear 451 meshes with lower power gear 442 and the second shifting gear 452 meshes with output gear 446, thereby rotating the output shaft 448 in a second direction, opposite to the first direction; and (3) a neutral, third position, described more below, in which the shifting gear 451 is positioned between and disengaged from both of the power gears 440 and 442. In the orientations and positions illustrated in these figures, the first and second positions are depicted as up and down positions and the associated directions of rotation of the output gear 446 and the output shaft 448 are counterclockwise (indicated by arrow 468, FIG. 77) and clockwise (indicated by arrow 469, FIG. 78).

The mounting shaft 455 for the gears 451 and 452 rides along arcuate slots 462 and 464 in the walls 434 and 438, respectively. The curve of the slots is such that in its up and down positions gear 451 is positioned in engagement with the upper and lower gears 440 and 442, respectively. The mounting shaft 460 is mounted in, and rides along, a slot 466 in the pivot arm 458 which accommodates movement of the shaft along the arcuate slots 462, 464 during rotation of the pair of shifting gears, that is, the slot allows the mounting shaft 455, specifically sections 454 and 456 thereof to be guided along the arcuate slots as the pivot arm is pivoted about the mounting shaft 460.

c. Operation of Control Springs 470 and 480

Referring to FIGS. 72–75 and 79, control spring 470 comprises arms or arm sections 472, 474 and 476. Intermediate arm 472 is mounted for rotating movement and is proximate the shifting mechanism 450. Outer arm 474 is mounted proximate one end thereof to arm 472 and is mounted proximate the opposite end thereof to the movable shaft 455 (at section 454 of the shaft 455) of the shifting mechanism 450. The other outer arm 476 is mounted to and extends from the arm 472. A spiral section 478 proximate the outer end of arm 476 forms an opening 479 through which cord 420 is routed. As the result of this arrangement, pivoting pull cord as shown for example in FIGS. 74 and 75 pivots arm and rotates arm 472 which, in turn, pivots arm 476 and attached shaft 455, thereby pivoting the mechanism 450 to selected positions. Three important positions are depicted in FIGS. 76–78.

A second control spring 480 is mounted to housing 11, extends adjacent leg 474 of spring 470, and has a detent 482 formed therein which receives and normally holds leg 474 in a position such that shifting gear 451 is in a "neutral" position (see FIGS. 72, 73 and 76) between and disengaged from both the upper and the lower power gears 440 and 442. In this neutral position, the window cover system is disengaged from the power shaft 444 and is thus free to operate, to the extent the overall system is designed to operate without the assistance of the pull cord. The touch-operated cover system 180 and the cord-controlled reversible cord pull mechanism 410 illustrated in FIG. 71 are designed to operate separately or together and thus, when the reversible cord pull mechanism is in the neutral, disengaged position, the associated cover can be extended and retracted by touching or holding the cover, preferably along the bottom rail, and pushing the cover upward or pulling it downward. During this movement, the band transmission and the spring drive depicted in FIG. 71 counterbalance the weight of the cover and as a result only a small force is required to move the cover up or down to different positions. Please note, when power shaft 444 is disengaged, the reversible gear transmission 430 remains engaged and exerts frictional drag and inertia which assists the touch-operated cover control system in maintaining the associated cover in the selected position.

d. Summary of Operation

When the pull cord 420 is cocked to the right (FIG. 74), the shifting gear pair 450 is pivoted upward into engagement with the upper power gear 440 and the output gear 446. When the pull cord 420 is pulled or cocked to the left (FIG. 75), the shifting gear pair 450 is pivoted downward into engagement with the lower power gear 442 and the output gear 446. Pulling the rightward- or the leftward-cocked cord down or away from the housing rotates the output gear 446, the output shaft 448 and the cord pulley(s) (1) in a first direction or (2) in the opposite direction, causing the pulley cord(s) 19—19 to (1) extend the cover or (2) retract the cover, or vice versa.

In short, the pull cord is operatively connected to the pull cord shaft 422 and the transmission output shaft 448 and pulling the pull cord in a first direction or in a second, different direction rotates the transmission output shaft in opposite directions.

The one-way bearing 424 couples the power shaft 422 to the pull cord pulley 418 when that shaft is rotated by the pull cord, then disengages the power shaft from the pull cord pulley when the cord is released, thereby allowing the constant torque spring 416 to retract or rewind the pull cord without rotating the shaft 444 or the output shaft 448 or the cover cord pulley(s) and thus without changing the position of the cover.

During operation, the pull cord 420 is gripped and cocked leftward or rightward to establish the direction of movement of the associated cover or other load, and the cord is pulled out or unwound from the pulley 418 and pull cord shaft 422, thereby rotating the transmission output shaft 448 in the desired direction to move the cover to or toward a selected position; then one's grip on the cord is relaxed so that the cord is rewound by the rewind spring 416 without changing the position of the cover or blind such as 10, 20. This pull and release cycle is repeated as and if required until the cover has been moved to the desired position, then the cord is released and the inherent friction and inertia of the system offset the supported weight of the cover and maintain the cover at the selected position.

e. Pull-Cord Controlled System 405

FIG. 80 depicts an alternative embodiment 405 of a pull cord-controlled system, in accordance with the present invention, which adds the reversible pull cord mechanism 410 to a spring-driven cover system 160. The system 160 is of the type disclosed elsewhere in this document, including but not limited to FIG. 58. The systems 160 and 405 differ from systems 180 and 406, FIG. 71, in that system 160 does not include a band or cord transmission.

The present invention has been described in terms of a preferred and other embodiments. The invention, however, is not limited to the embodiments described and depicted. One familiar with the art to which the present invention pertains will appreciate from the various springs, transmissions, gears, other components, and cover/blind arrangements disclosed here, that the present invention is applicable in general to spring drives, to articles, objects or systems designed for support by and traversal along tracks and, in particular to window covers and other loads which use spring drive(s) or other source(s) of power for assisting the raising and/or lowering of the associated load. Adaptation of the system to loads, articles, objects and systems, including other covers/blinds will be readily done by those of usual skill in the art. The invention is defined by the claims appended hereto.

What is claimed is:

1. A method of using a pull cord operatively connected to a rotatable shaft to reversibly rotate the shaft, the method comprising the steps:

(a) pulling a pull cord in a first direction, thereby rotating a first shaft in a selected direction and converting rotation of the first shaft into rotation of a second shaft in a first direction;

(b) retracting the pull cord; and (c) pulling the pull cord in a second direction different from the first direction of the pull cord, thereby rotating the first shaft in the selected direction and converting rotation of the first shaft into rotation of the second shaft in a second direction opposite the first direction of rotation the second shaft.

2. A method of using a pull cord operatively connected to a rotatable shaft having a load attached thereto to selectively rotate the shaft in opposite directions and thereby position the load, the method comprising the steps: p1 (a) pulling a pull cord in a direction selected from first and second, different pull directions, thereby rotating a first shaft in a selected direction and converting rotation of the first shaft in the selected direction into rotation of a second shaft in a direction selected from first and second, opposite directions of rotation, the first and second directions of rotation being selected by the first and second pull directions, respectively;

(b) returning the pull cord; and (c) repeating steps (a) and (b).

3. A reversible pull cord mechanism, comprising:

first and second rotatable shafts;

pull a cord operatively connected to the first shaft and to the second shaft for rotating the first shaft in a selected direction when the pull cord is pulled;

means operatively connected to the pull cord and responsive to pulling the pull cord in at least two different directions for rotating the first shaft in the selected direction when the pull cord is pulled in either of said two different direction; and means operatively connected to the first shaft and to the second shaft and responsive to pulling the pull cord in said two different directions for converting rotation of the first shaft in the selected direction into rotation of the second shaft in two opposite directions respectively.

4. A reversible pull cord mechanism, comprising:

first and second rotatable shafts;

a pull cord operatively connected to the first shaft for rotating the first shaft in a selected direction when the pull cord is pulled;

means for retracting the pull cord;

means for converting rotation of the first shaft in the selected direction into rotation of the second shaft, said converting means being settable in first and second conditions for converting rotation of the first shaft in the selected direction into rotation of the second shaft in first and second different directions, respectively; and means responsive to pulling movement of the pull cord in first and second different directions for selectively setting the converting means in the first and second conditions, respectively, as the pull cord is pulled.

5. A reversible pull cord mechanism, comprising:

a retractable pull cord mechanism comprising: a first rotatable shaft; a pulley operatively connected to the first rotatable shaft for rotating the first rotatable shaft; a pull cord wrapped around the pulley for rotating the pulley and the first rotatable shaft when the pull cord is pulled away from the pulley; and means operatively connected to the first rotatable shaft for rewinding the pull cord when the pull cord is released;

a second rotatable shaft operatively connected to the first rotatable shaft for rotating the second rotatable shaft when the first rotatable shaft rotates;

shifting means adapted for positioning in first and second positions for converting single direction rotation of the first rotatable shaft into rotation of the second rotatable shaft in first and second different directions; and connecting means connecting the pull cord means to the shifting for setting the shifting means in said first and second positions in response to the pull cord being pulled in first and second different directions.

6. A reversible rotation pull cord mechanism, comprising:

a retractable pull cord mechanism, comprising: a first rotatable shaft; a pulley operatively connected to the first rotatable shaft for rotating the first rotatable shaft; a pull cord wrapped around the pulley for rotating the pulley and the first rotatable shaft when the pull cord is pulled away from the pulley; and rewind means operatively connected to the first rotatable shaft for rewinding the pull cord when the pull cord is released;

a transmission including a second rotatable shaft operatively connected to the first rotatable shaft for rotating the second shaft when the first shaft rotates; the transmission further comprising shifting means adapted for being positioned in at least first and second positions for converting single direction rotation of the first rotatable shaft into rotation of the second rotatable shaft in first and second different directions; and connecting means connecting the pull cord to the shifting means for setting the transmission in said first and second positions in response to the pull cord being pulled in first and second different directions.

7. The reversible pull cord mechanism of claim 6, wherein:

the transmission comprises: a first gear operatively mounted on the first rotatable shaft for rotating therewith in a first direction; a second gear meshed with the first gear for rotating in a second direction, opposite the first direction; and a third, output gear; and wherein the shifting means comprises fourth and fifth gears; a movable shaft mounting the fourth and fifth gears at spaced apart locations along said movable shaft with the fifth gear maintained meshed with the third, output gear; said movable shaft being mounted for arcuate movement between said first position, at which the fourth gear meshes with the first gear for rotating the fifth gear with the first gear and said second position, at which the fourth gear meshes with the second gear for rotating the fifth gear with the second gear; and wherein said connecting means operatively connects the pull cord to said movable shaft for moving said movable shaft to the said first and second positions.

8. The reversible pull cord mechanism of claim 7, said connecting means further comprising: first spring means comprising a first arm or section mounted proximate the shifting means for rotating movement; a second arm or section mounted proximate one end to and extending from the first arm and mounted proximate a second end to the movable shaft of the shifting means for moving the movable shaft between and to said first and second positions upon rotation of the first arm; and a third arm mounted to and extending from the first arm for rotating the first arm, thereby pivoting the second arm and moving the movable shaft between and to said first and second positions.

9. The reversible rotation pull cord mechanism of claim 6, wherein the transmission comprises: a first gear operatively mounted on the first rotatable shaft for rotating therewith in a first direction; a second gear meshed with the first gear for rotating in a second direction, opposite the first direction; and a third, output gear; and wherein the shifting means of the transmission comprises fourth and fifth gears; a movable shaft mounting the fourth and fifth gears at spaced apart locations along said movable shaft with the fifth gear maintained meshed with the third, output gear; said movable shaft being mounted for arcuate movement among and to said first position, in which the fourth gear meshes with the first gear for rotating the fifth gear with the first gear, said second position, in which the fourth gear meshes with the second gear for rotating the fifth gear with the second gear, and a third, neutral position between said first and second positions at which the fourth gear is disengaged from the first and second gears; and wherein said connecting means operatively connects the pull cord to said movable shaft for moving said movable shaft among and to said first, second and third positions.

10. The reversible pull cord mechanism of claim 9, said connecting means further comprising:

first spring means comprising a first arm or section mounted proximate the shifting means for rotating movement; a second arm or section mounted proximate one end to and extending from the first arm and mounted proximate a second end to the movable shaft of the shifting means for moving the movable shaft among and to said three positions upon rotation of the first arm; and a third arm mounted to and extending from the first arm for rotating the first arm, thereby pivoting the second arm and moving the movable shaft among and to said three positions; and the third arm having an aperture therein receiving the pull cord in sliding engagement such that pulling the pull cord in first and second directions moves the movable shaft to said first and second positions; and second spring means mounted proximate the first spring means and having a detent positioned such that when the pull cord is released, the detent releasably engages the first spring means and positions the first spring means in said neutral third position, and disengages from the first spring when the pull cord is pulled in the first or second direction.

11. A pull cord-operated retractable cover system, comprising:
(1) a cover system comprising: a housing; a plurality of rotatable pulleys mounted on or to the housing; a cover; cords wound around the pulleys and connected to the cover for extending the cover from the housing and retracting the cover to the housing; and
(2) a reversible pull cord mechanism, comprising:
   (a) retractable pull cord means comprising: a first rotatable shaft; a pulley operatively connected to the first rotatable shaft for rotating the first rotatable shaft; a pull cord wrapped around the pulley for rotating the pulley and the first rotatable shaft when the pull cord is pulled away from the pulley; and means operatively connected to the first rotatable shaft for rewinding the pull cord when the pull cord is released;
   (b) a transmission including a second rotatable shaft and being operatively connected to the first rotatable shaft for rotating the second rotatable shaft when the first rotatable shaft rotates; the transmission further comprising shifting means adapted for positioning in first and second positions for converting single direction rotation of the first rotatable shaft into rotation of the second rotatable shaft in first and second different directions; and
   (c) means connecting the pull cord means to the shifting means and setting the transmission in said first and second positions in response to the pull cord being pulled in first and second different directions.

12. The cover system of claim 11, wherein:
the transmission comprises: a first gear operatively mounted on the first rotatable shaft for rotating therewith in a first direction; a second gear meshed with the first gear for rotating in a second direction, opposite the first direction; a third, output gear; and wherein:
the shifting means of the transmission comprises fourth and fifth gears; a movable shaft mounting the fourth and fifth gears at spaced apart locations along said movable shaft with the fifth gear maintained meshed with the third, output gear; said movable shaft being mounted for arcuate movement between said first position, in which the fourth gear meshes with the first gear for rotating the fifth gear with the first gear and said second position, in which the fourth gear meshes with the second gear for rotating the fifth gear with the second gear; and wherein:
said connecting means operatively connects the pull cord means to said movable shaft for moving said movable shaft to said first and second positions.

13. The cover system of claim 12, said connecting means further comprising first spring means comprising a first arm or section mounted proximate the shifting means for rotating movement; a second arm or section mounted proximate one end to and extending from the first arm and mounted proximate a second end to said movable shaft of the shifting means for moving said movable shaft between and to said first and second positions upon rotation of the first arm; and a third arm mounted to and extending from the first arm for rotating the first arm, thereby pivoting the second arm and moving the movable shaft between and to said two positions.

14. The cover system of claim 11, wherein:
the transmission comprises: a first gear operatively mounted on the first rotatable shaft for rotating therewith in a first direction; a second gear meshed with the first gear for rotating in a second direction, opposite the first direction; and a third, output gear; and wherein:
the shifting means of the transmission comprises fourth and fifth gears; a movable shaft mounting the fourth and fifth gears at spaced apart locations along said movable shaft with the fifth gear maintained meshed with the third, output gear; said movable shaft being mounted for arcuate movement among and to said first position, in which the fourth gear meshes with the first gear for rotating the fifth gear with the first gear, said second position, in which the fourth gear meshes with the second gear for rotating the fifth gear with the second gear, and a third, neutral position between said first and second 13positions in which the fourth gear is disengaged from the first and second gears; and wherein:
said connecting means operatively connects the pull cord means to said movable shaft for moving the movable shaft among and to said first, second and third positions.

15. The cover system of claim 14, said connecting further comprising:
first spring means comprising a first arm or section mounted proximate the shifting means for rotating movement; a second arm or section mounted proximate one end to and extending from the first arm and mounted proximate a second end to the movable shaft of the shifting means for moving the movable shaft among and to said three positions upon rotation of the first arm; and a third arm mounted to and extending from the first arm for rotating the first arm, thereby pivoting the second arm and moving said movable shaft among and to said three positions; and the third arm having an aperture therein receiving the pull cord in sliding engagement such that pulling the pull cord in first and second directions moves said movable shaft to said first and second positions; and
second spring means mounted proximate the first spring means and having a detent positioned such that when the pull cord is released, the detent releasably engages the first spring means and positions the first spring means in said neutral third position, and disengages from the first spring when the pull cord is pulled in the first or second direction.

* * * * *